US009323322B2

(12) United States Patent
McGibney

(10) Patent No.: US 9,323,322 B2
(45) Date of Patent: Apr. 26, 2016

(54) INTERACTIVE INPUT SYSTEM AND METHOD OF DETECTING OBJECTS

(71) Applicant: SMART Technologies ULC, Calgary (CA)

(72) Inventor: Grant McGibney, Calgary (CA)

(73) Assignee: SMART Technologies ULC, Calgary (CA)

( * ) Notice: Subject to any disclaimer, the term of this patent is extended or adjusted under 35 U.S.C. 154(b) by 265 days.

(21) Appl. No.: 13/758,592

(22) Filed: Feb. 4, 2013

(65) Prior Publication Data

US 2013/0201100 A1    Aug. 8, 2013

Related U.S. Application Data

(60) Provisional application No. 61/594,360, filed on Feb. 2, 2012.

(51) Int. Cl.
  *G06F 3/042*    (2006.01)
  *G06F 3/00*     (2006.01)
  *G06F 3/041*    (2006.01)

(52) U.S. Cl.
  CPC .............. *G06F 3/005* (2013.01); *G06F 3/0416* (2013.01); *G06F 3/0428* (2013.01); *G06F 2203/04104* (2013.01)

(58) Field of Classification Search
  CPC .......... G06F 2203/04104; G06F 2203/041408; G06F 3/005; G06F 3/0416; G06F 3/0421; G06F 3/0425; G06F 3/0428
  See application file for complete search history.

(56) References Cited

U.S. PATENT DOCUMENTS

| | | |
|---|---|---|
| 5,448,263 A | 9/1995 | Martin |
| 5,675,518 A * | 10/1997 | Kuroda et al. ................. 702/97 |
| 6,141,000 A | 10/2000 | Martin |
| 6,337,681 B1 | 1/2002 | Martin |
| 6,747,636 B2 | 6/2004 | Martin |
| 6,803,906 B1 | 10/2004 | Morrison et al. |
| 7,030,861 B1 | 4/2006 | Westerman et al. |
| 7,232,986 B2 | 6/2007 | Worthington et al. |
| 7,236,162 B2 | 6/2007 | Morrison et al. |
| 7,274,356 B2 | 9/2007 | Ung et al. |
| 7,355,593 B2 | 4/2008 | Hill et al. |
| 7,643,006 B2 | 1/2010 | Hill et al. |
| 8,502,789 B2 * | 8/2013 | Tse ...................... G06F 3/0425 345/173 |
| 2004/0179001 A1 | 9/2004 | Morrison et al. |
| 2007/0101564 A1 * | 5/2007 | Nestler et al. .................. 28/287 |
| 2008/0150715 A1 | 6/2008 | Tang et al. |
| 2008/0161086 A1 * | 7/2008 | Decre ...................... A63F 3/02 463/14 |
| 2009/0146972 A1 | 6/2009 | Morrison |
| 2010/0066016 A1 * | 3/2010 | Van De Wijdeven . G06F 3/0421 273/237 |
| 2011/0006981 A1 | 1/2011 | Chtchetinine et al. |

(Continued)

OTHER PUBLICATIONS

Zhou, Chinese Patent Document, CN2824138Y.*

(Continued)

*Primary Examiner* — Kenneth Bukowski
(74) *Attorney, Agent, or Firm* — Katten Muchin Rosenman LLP

(57) ABSTRACT

A method comprises capturing image frames of an input area using a plurality of imaging devices, each having a field of view encompassing at least a portion of the input area; processing captured image frames to identify a plurality of targets therein; analyzing the identified plurality of targets to determine if the targets represent a plurality of projections of an input object; and if so, identifying a pattern of the projections thereby to identify the input object.

32 Claims, 49 Drawing Sheets

(56) References Cited

U.S. PATENT DOCUMENTS

| | | | |
|---|---|---|---|
| 2011/0241832 A1* | 10/2011 | Lipman et al. | 340/6.1 |
| 2011/0261013 A1* | 10/2011 | Lin et al. | 345/175 |
| 2012/0007804 A1 | 1/2012 | Morrison | |
| 2012/0019480 A1 | 1/2012 | Cannon | |
| 2012/0026291 A1* | 2/2012 | Lee | 348/46 |
| 2012/0039509 A1* | 2/2012 | Fujioka | 382/103 |
| 2012/0105364 A1* | 5/2012 | Klinghult | 345/174 |
| 2012/0212441 A1* | 8/2012 | Christiansson et al. | 345/173 |
| 2012/0280904 A1* | 11/2012 | Skurnik et al. | 345/156 |

OTHER PUBLICATIONS

Transmittal; International Search Report; and the Written Opinion of the International Searching Authority for U.S. Patent Application No. PCT/CA2013/000089.

* cited by examiner

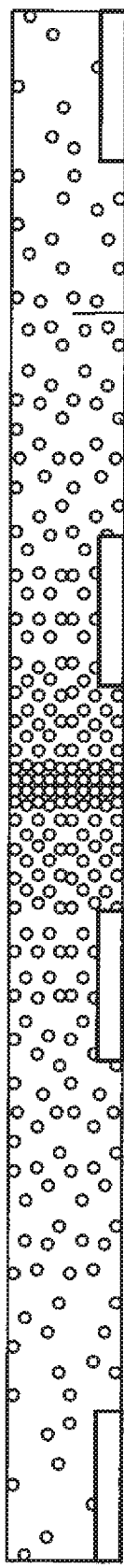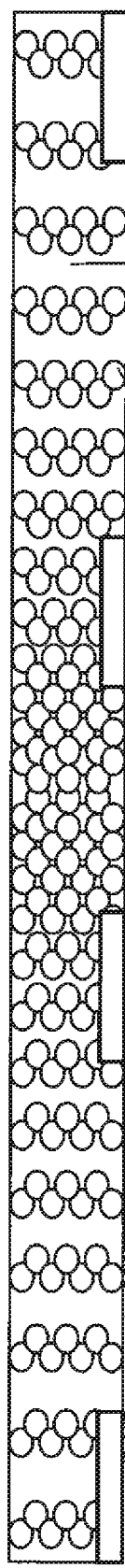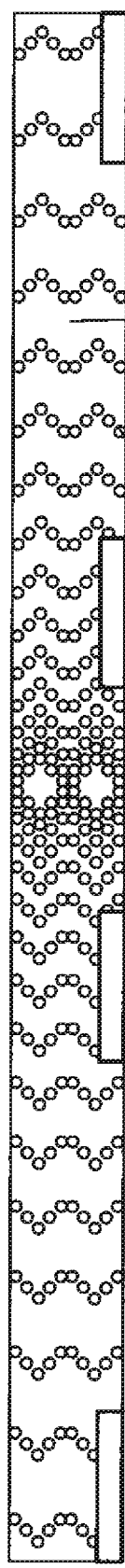

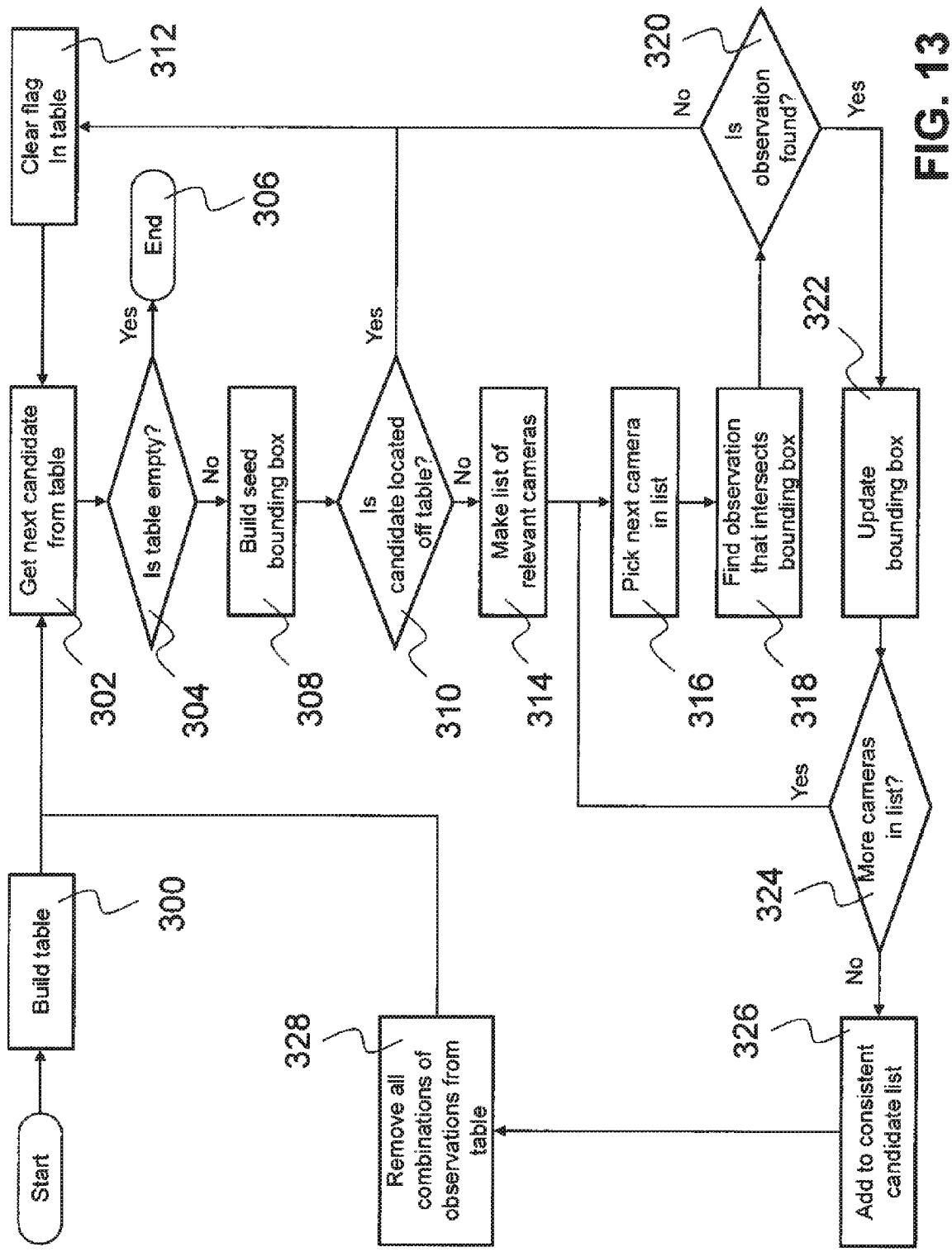

|  |  | Camera 1 | | | Camera 2 | | | Camera 3 | | |
|---|---|---|---|---|---|---|---|---|---|---|
|  |  | Observation 1 | Observation 2 | Observation 3 | Observation 1 | Observation 2 | Observation 3 | Observation 1 | Observation 2 | Observation 3 |
| Camera 1 | Observation 1 | X | X | X | X | X | X | T | T | T |
|  | Observation 2 | X | X | X | X | X | X | T | T | T |
|  | Observation 3 | X | X | X | X | X | X | T | T | T |
| Camera 2 | Observation 1 | X | X | X | T | T | T | T | T | T |
|  | Observation 2 | X | X | X | T | T | T | T | T | T |
|  | Observation 3 | X | X | X | T | T | T | T | T | T |
| Camera 3 | Observation 1 | X | X | X | X | X | X | X | X | X |
|  | Observation 2 | X | X | X | X | X | X | X | X | X |
|  | Observation 3 | X | X | X | X | X | X | X | X | X |

FIG. 14

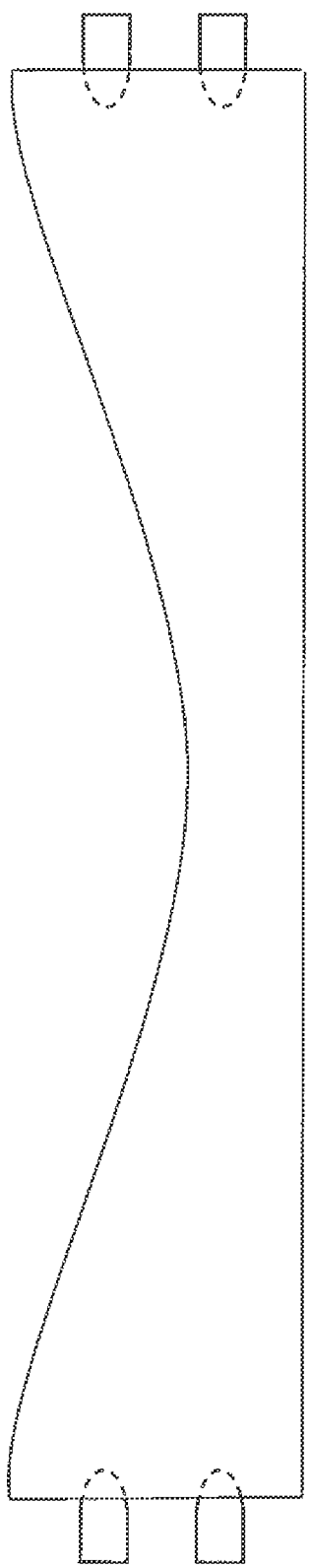

INTERACTIVE INPUT SYSTEM AND METHOD OF DETECTING OBJECTS

CROSS-REFERENCE TO RELATED APPLICATIONS

This application claims the benefit of U.S. Provisional Application No. 61/594,360 to McGibney filed on Feb. 2, 2012, the entire disclosure of which is incorporated herein by reference. This application is also related to U.S. patent application Ser. No. 12/501,088 to Chtchetinine et al. filed on Jul. 10, 2009 and to U.S. patent application Ser. No. 12/834,734 to McReynolds et al. filed on Jul. 12, 2010, the entire disclosures of which are incorporated herein by reference.

FIELD OF THE INVENTION

The present invention relates generally to input systems and in particular to an interactive input system and method of detecting objects.

BACKGROUND OF THE INVENTION

Interactive input systems that allow users to inject input such as for example digital ink, mouse events etc. into an application program using an active pointer (eg. a pointer that emits light, sound or other signal), a passive pointer (eg. a finger, cylinder or other object) or other suitable input device such as for example, a mouse or trackball, are well known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001 assigned to SMART Technologies ULC of Calgary, Alberta, Canada, assignee of the subject application, the disclosures of which are incorporated by reference in their entireties; touch systems comprising touch panels employing electromagnetic, capacitive, acoustic or other technologies to register pointer input; tablet and laptop personal computers (PCs); smartphones, personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are then conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

In environments where the touch surface is small, more often than not, users interact with the touch surface one at a time, typically using a single pointer. In situations where the touch surface is large, as described in U.S. Pat. No. 7,355,593 to Hill et al., issued on Apr. 8, 2008, assigned to SMART Technologies ULC, the disclosure of which is incorporated by reference in its entirety, multiple users may interact with the touch surface simultaneously.

As will be appreciated, in machine vision touch systems, when a single pointer is in the fields of view of multiple imaging devices, the position of the pointer in (x,y) coordinates relative to the touch surface typically can be readily computed using triangulation. Difficulties are however encountered when multiple pointers are in the fields of view of multiple imaging devices as a result of pointer ambiguity and occlusion. Ambiguity arises when multiple pointers in the images captured by the imaging devices cannot be differentiated. In such cases, during triangulation a number of possible positions for the pointers can be computed but no information is available to allow the correct pointer positions to be selected. Occlusion occurs when one pointer occludes another pointer in the field of view of an imaging device. In these instances, the image captured by the imaging device includes fewer pointers than the actual number of pointers. As a result, the correct positions of the pointers relative to the touch surface cannot be disambiguated from false pointer positions. As will be appreciated, improvements in multiple input interactive input systems are desired.

It is therefore an object of the present invention to provide a novel interactive input system and method of detecting objects.

SUMMARY OF THE INVENTION

Accordingly, in one aspect there is provided a method comprising capturing image frames of an input area using a plurality of imaging devices, each having a field of view encompassing at least a portion of the input area; processing captured image frames to identify a plurality of targets therein; analyzing the identified plurality of targets to determine if the targets represent a plurality of projections of an input object; and if so, identifying a pattern of the projections thereby to identify the input object.

According to another aspect there is provided an interactive input system comprising a plurality of imaging devices having at least partially overlapping fields of view encompassing an input area and configured to capture image frames; and processing structure configured to process image by the imaging devices to identify a plurality of targets, analyze the identified plurality of targets to determine if the targets represent a plurality of projections of an input object and if so, identify a pattern of the projections thereby to identify the input object.

According to another aspect there is provided a non-transitory computer readable medium embodying a computer program for execution by a computing device to perform a method of identifying at least one input object, the computer program comprising program code for processing image data from captured image frames to identify a plurality of targets; program code for analyzing the plurality of targets to determine if the targets represent a plurality of projections of an input object; and program code for identifying a pattern of the projections thereby to identify the input object.

According to another aspect there is provided an input object for an interactive input system comprising a body; and a plurality of spaced pins extending from said body in a pattern that is representative of said input object.

BRIEF DESCRIPTION OF THE DRAWINGS

Embodiments will now be described more fully with reference to the accompanying drawings in which:

FIG. 11a is another front elevational view of the bezel segment of FIGS. 10a to 10c better illustrating the dimple pattern on the diffusive front surface thereof;

FIGS. 11b and 11c are front elevational views of alternative bezel segments showing dimple patterns on the diffusive front surfaces thereof;

FIG. 13 is a flowchart showing steps performed during a candidate generation procedure;

FIG. 14 is an observation table built by the candidate generation procedure of FIG. 13;

FIGS. 35 to 40 show alternative embodiments of bezel segments for the illuminated bezel;

DETAILED DESCRIPTION OF THE EMBODIMENTS

Figure 1:
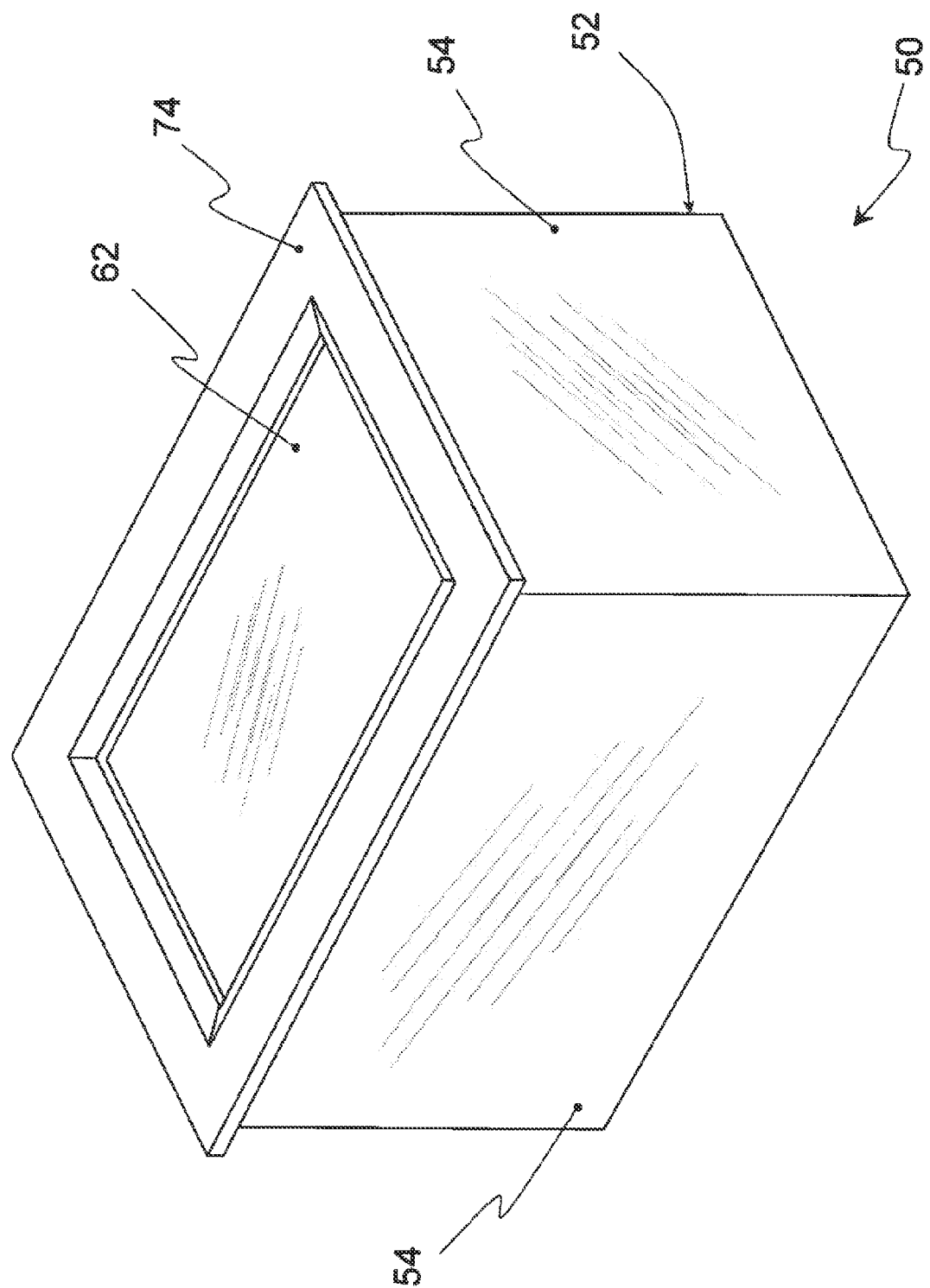
FIG. 1 is a perspective view of an interactive input system.
Figure 2:
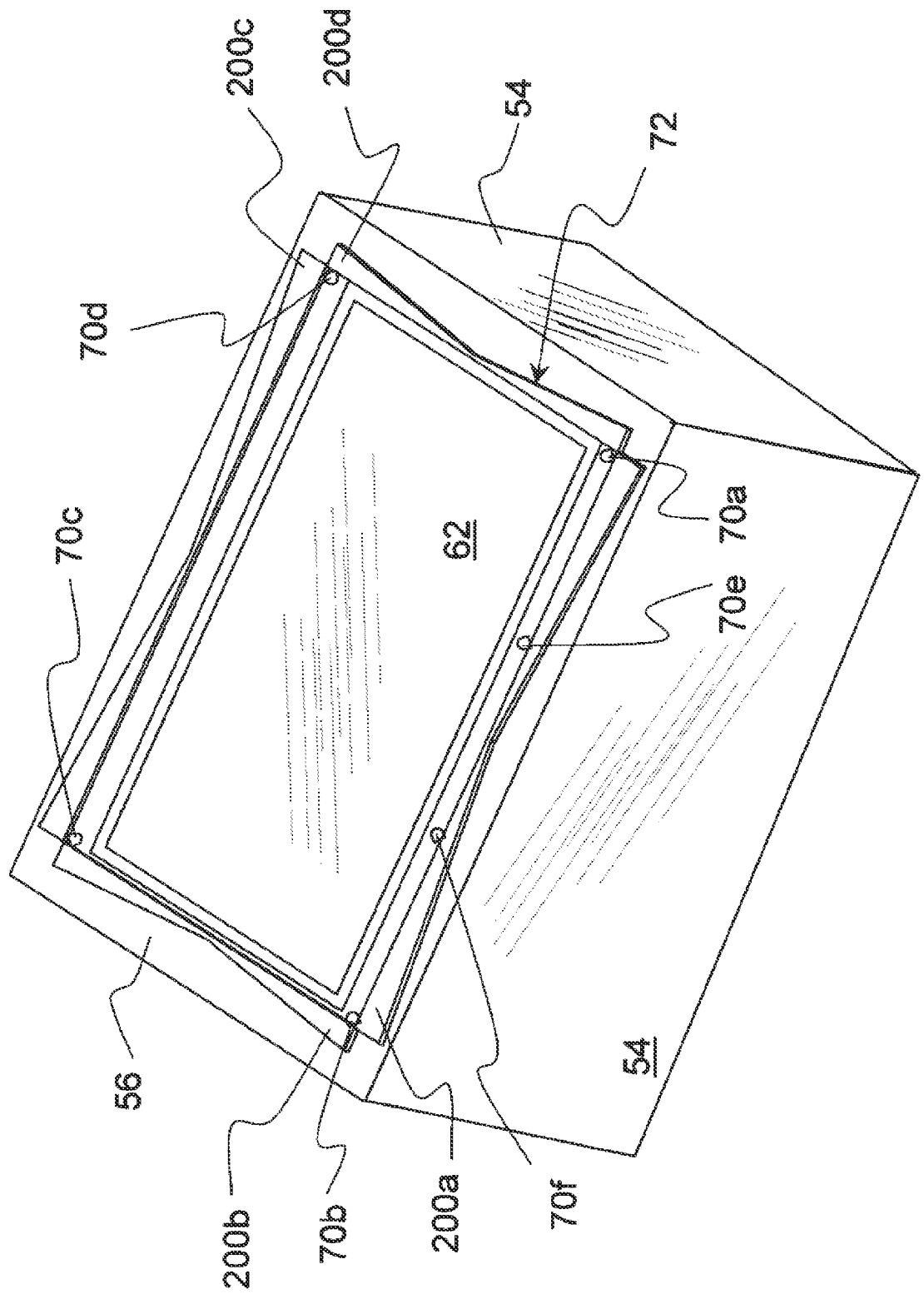
FIG. 2 is another perspective view of the interactive input system of FIG. 1 with its cover removed to expose imaging devices and an illuminated bezel that surround an input area.
Figure 3:
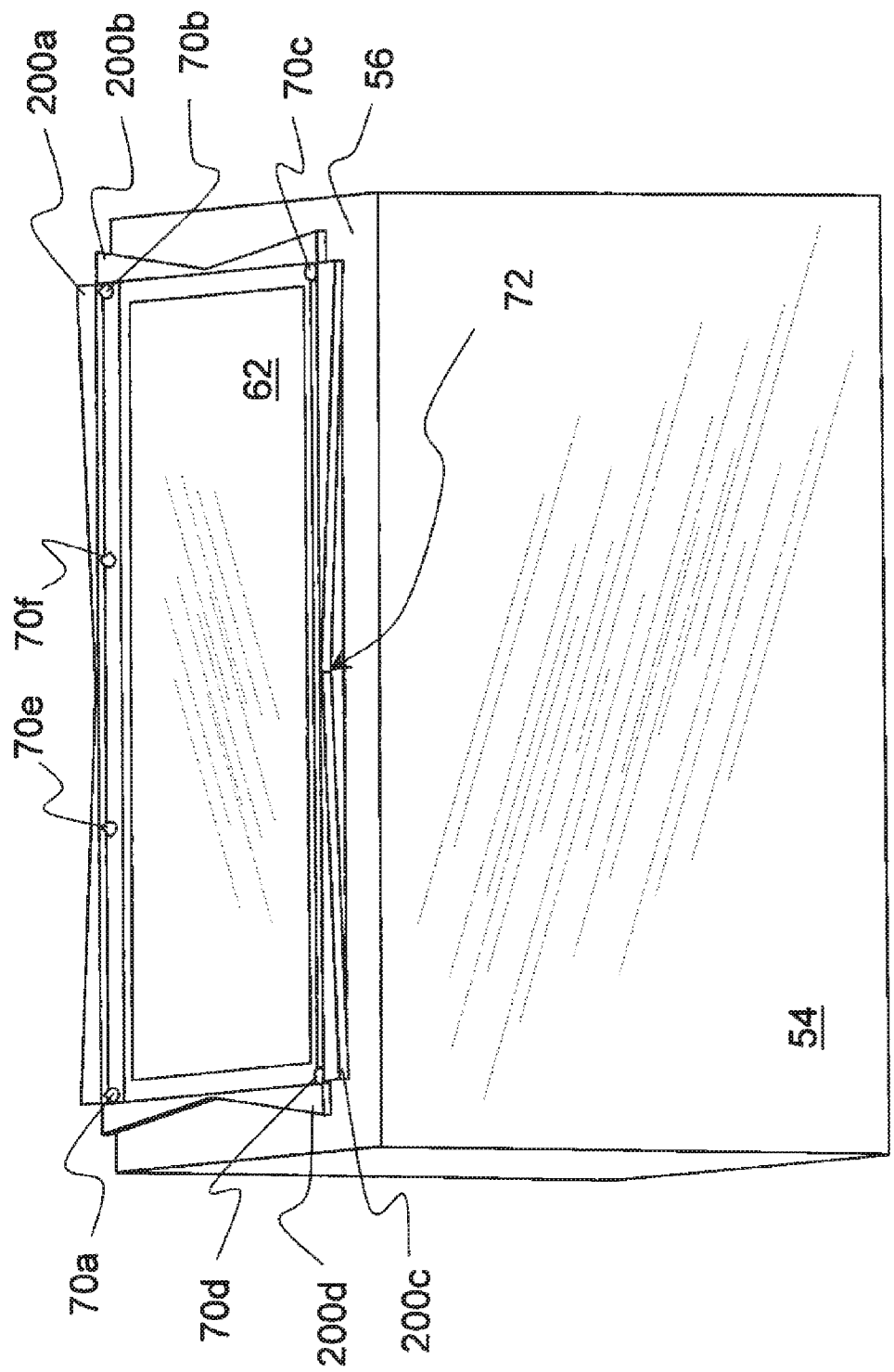
FIG. 3 is yet another perspective view of the interactive input system of FIG. 1 with the cover removed.
Figure 4:
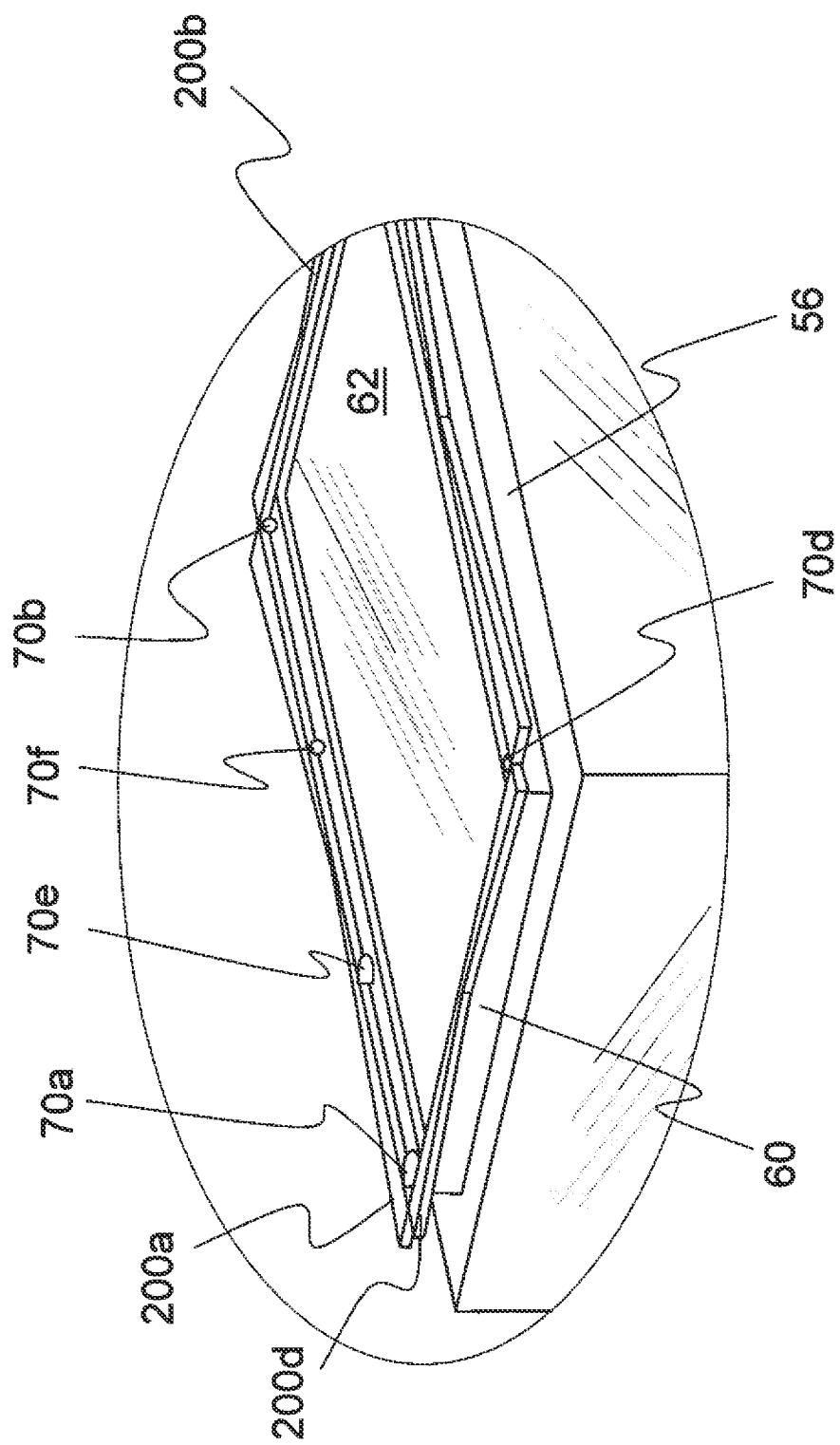
FIG. 4 is an enlarged perspective view of a portion of the interactive input system of FIG. 1 with the cover removed.

Turning now to FIGS. 1 to 6, an interactive input system is shown and is generally identified by reference numeral 50. In this embodiment, the interactive input system 50 is in the form of a touch table that is capable of detecting and tracking individually a plurality of different pointers or targets, in this example eight (8) pointers or targets, brought into proximity with the touch table. As can be seen touch table 50 comprises a generally rectangular box-like housing 52 having upright sidewalls 54 and a top wall 56. A liquid crystal display (LCD) or plasma display panel 60 is centrally positioned on the top wall 56 and has a display surface over which a region of interest or input area 62 is defined. Imaging devices 70a to 70f are mounted on or adjacent the LCD panel 60 about the input area 62 and look generally across the input area from different vantages. An illuminated bezel 72 generally surrounds the periphery of the input area 62 and overlies the imaging devices 70a to 70f. The illuminated bezel 72 provides backlight illumination into the input area 62. A cover 74 overlies the illuminated bezel 72.

Figure 5:
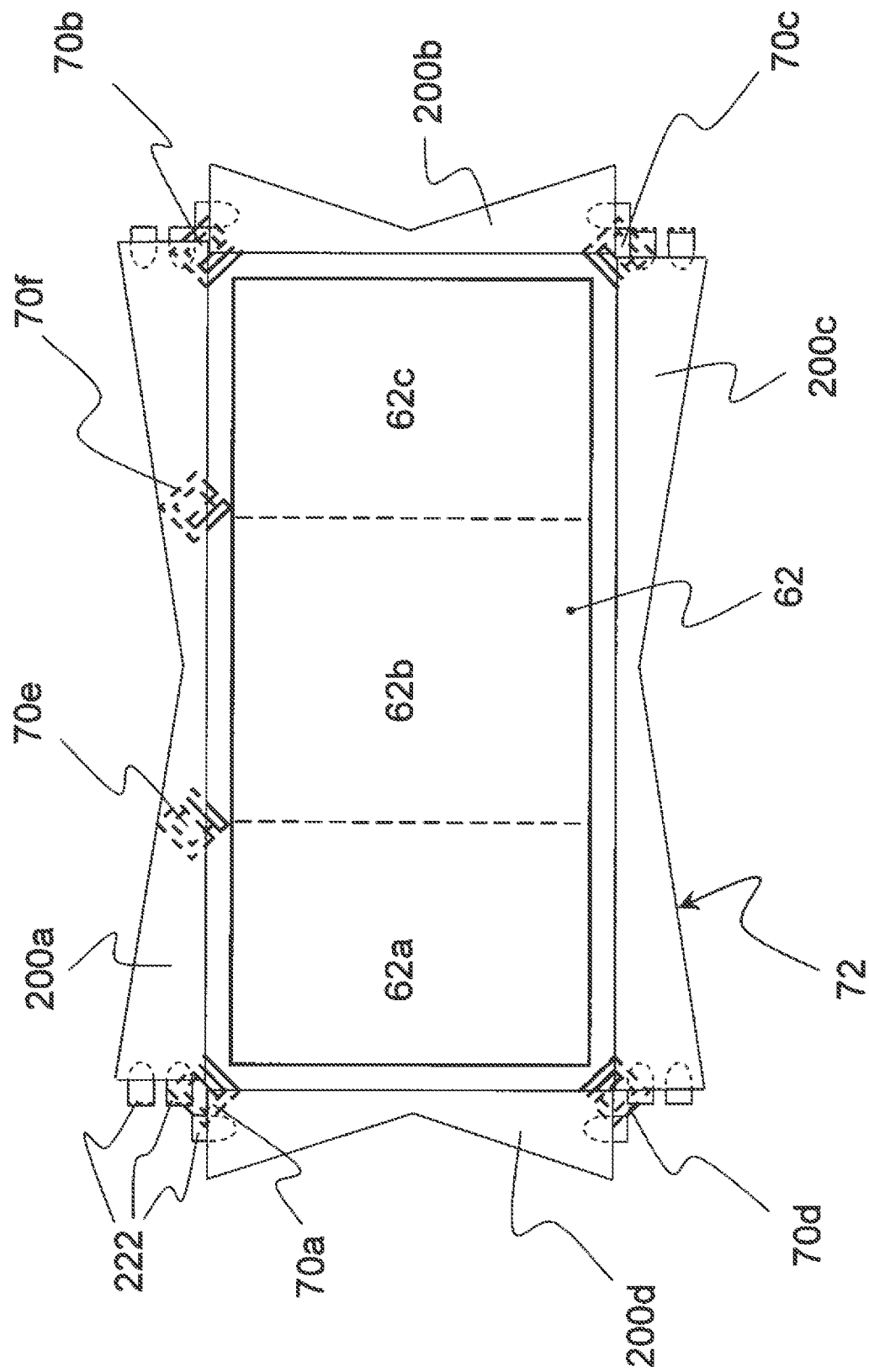
FIG. 5 is a top plan view showing the imaging devices and illuminated bezel that surround the input area.
Figure 6:
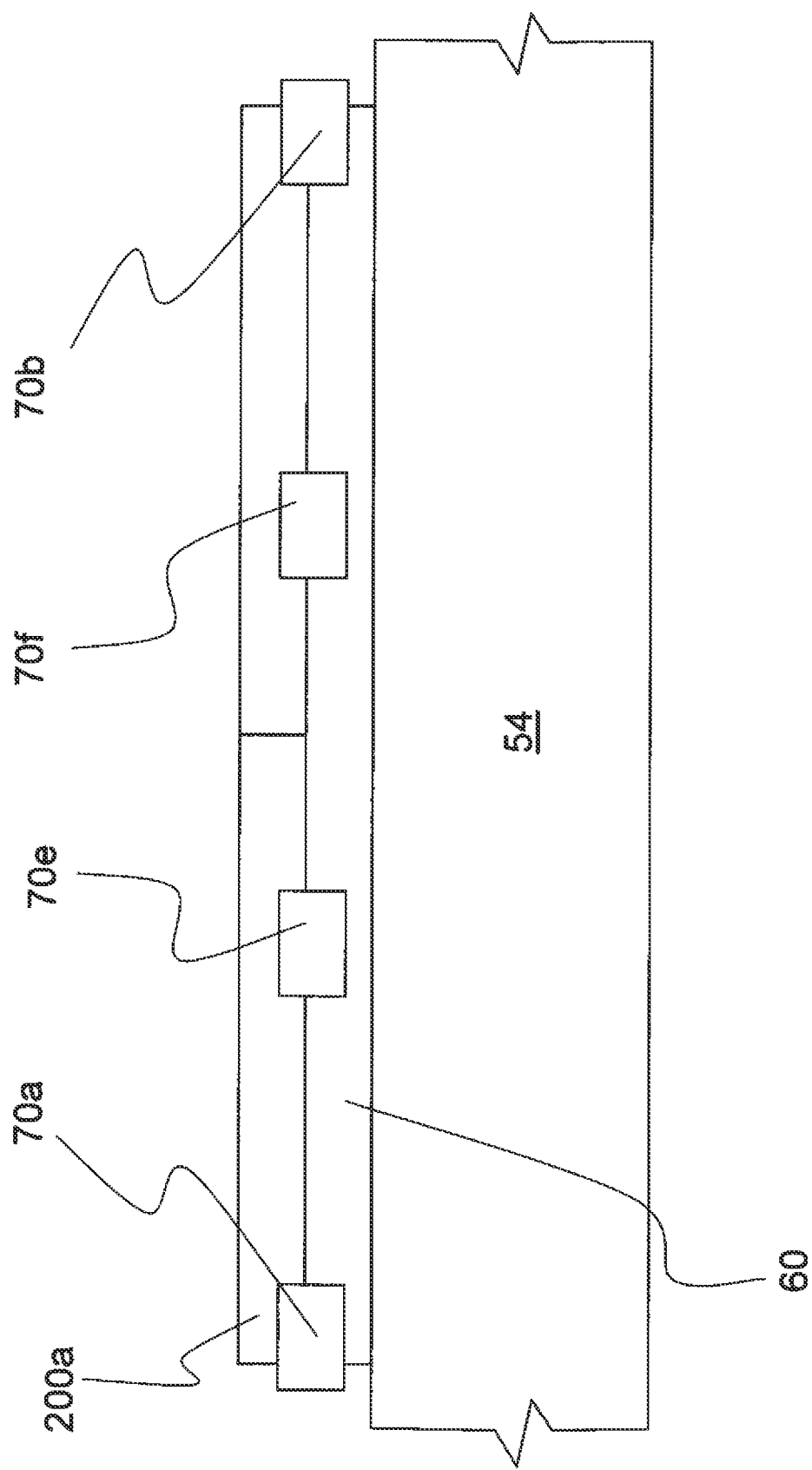
FIG. 6 is a side elevational view of a portion of the interactive input system of FIG. 1 with the cover removed.
Figure 7:
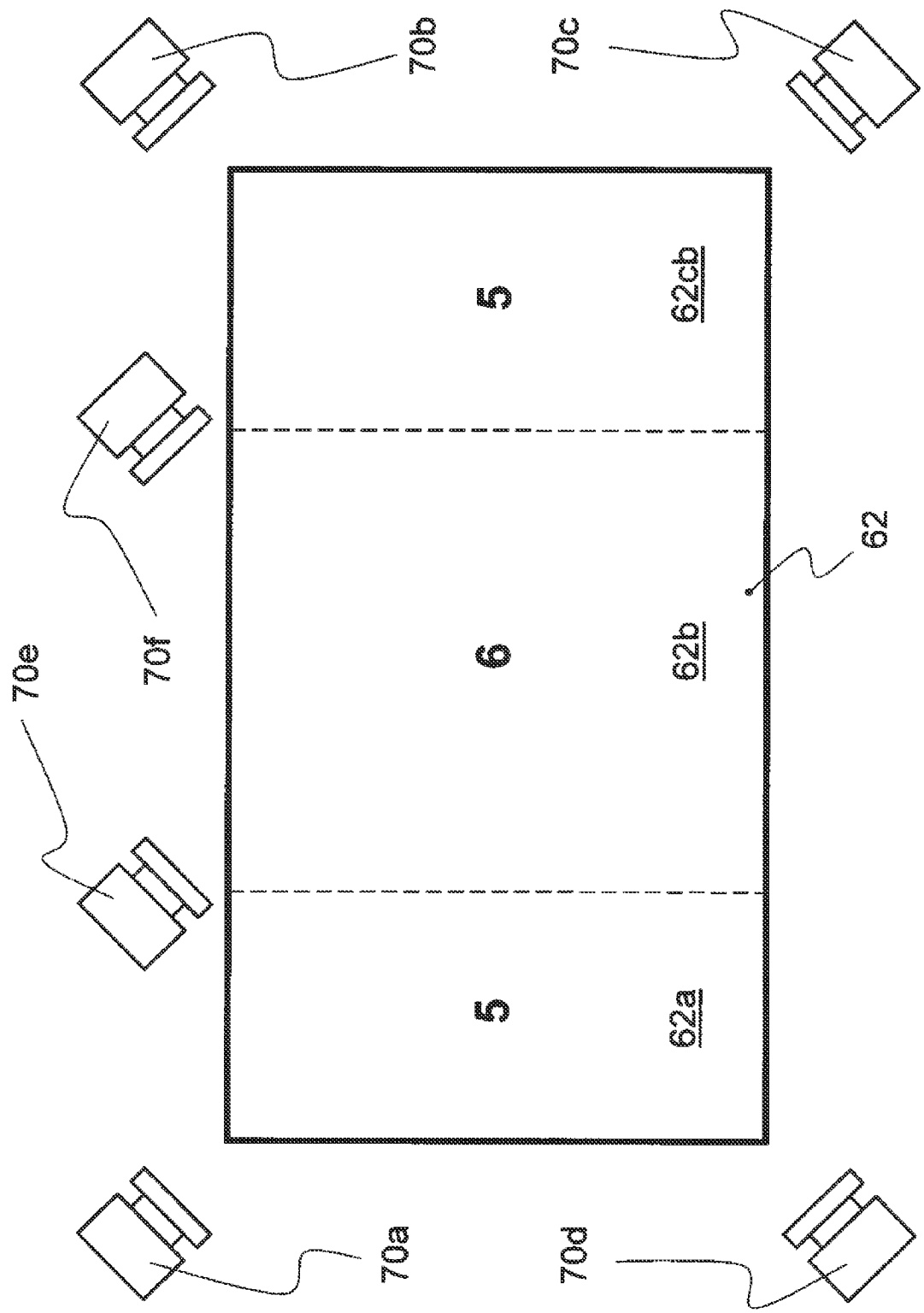
FIG. 7 is a top plan view showing the imaging devices and input regions of the input area.

In this embodiment, each of the imaging devices 70a to 70f is in the form of a digital camera device that has a field of view of approximately 90 degrees. The imaging devices 70a to 70d are positioned adjacent the four corners of the input area 62 and look generally across the entire input area 62. Two laterally spaced imaging devices 70e and 70f are also positioned along one major side of the input area 62 intermediate the imaging devices 70a and 70b. The imaging devices 70e and 70f are angled in opposite directions and look towards the center of the input area 62 so that each imaging device 70e and 70f looks generally across two-thirds of the input area 62. This arrangement of imaging devices divides the input area 62 into three (3) zones or input regions, namely a left input region 62a, a central input region 62b and a right input region 62c as shown in FIGS. 5 and 7. The left input region 62a is within the fields of view of five (5) imaging devices, namely imaging devices 70a, 70b, 70c, 70d and 70f. The right input region 62c is also within the fields of view of five (5) imaging devices, namely imaging devices 70a, 70b, 70c, 70d and 70e. The central input region 62b is within the fields of view of all six (6) imaging devices 70a to 70f.

Figure 8:
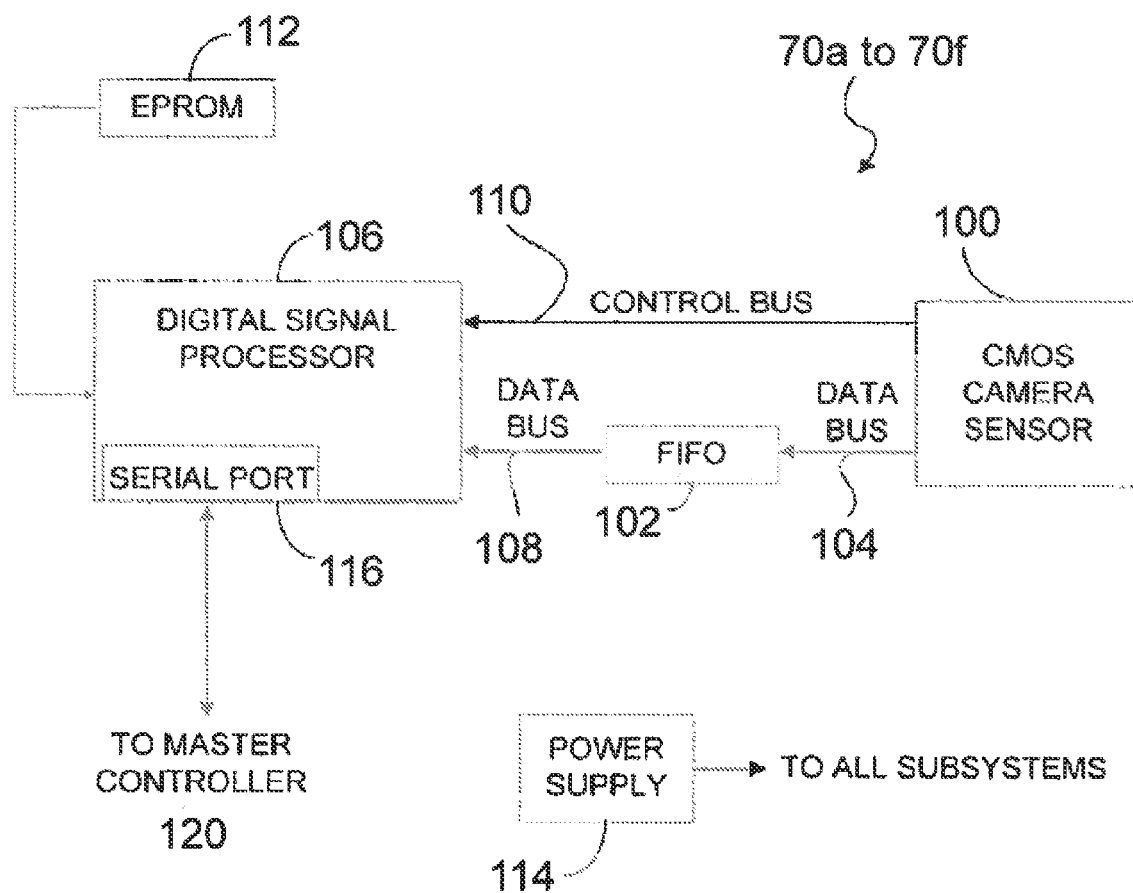
FIG. 8 is a schematic block diagram of one of the imaging devices.

FIG. 8 is a schematic block diagram of one of the imaging devices. As can be seen, the imaging device comprises a two-dimensional CMOS image sensor 100 having an associated lens assembly that provides the image sensor 100 with a field of view of the desired width. The image sensor 100 communicates with and outputs image frame data to a digital signal processor (DSP) 106 via its parallel port 107 over a data bus 108. The image sensor 100 and DSP 106 also communicate over a bi-directional control bus 110 allowing the DSP 106 to control the frame rate of the image sensor 100. A boot electronically programmable read only memory (EPROM) 112, which stores image sensor calibration parameters, is connected to the DSP 106 thereby to allow the DSP to control image sensor exposure, gain, array configuration, reset and initialization. The imaging device components receive power from a power supply 114. The DSP 106 processes the image frame data received from the image sensor 100 and provides target data to a master controller 120 via its serial port 116 when one or more pointers appear in image frames captured by the image sensor 100.

The CMOS image sensor 100 in this embodiment is an Aptina MT9V022 image sensor configured for a 30×752 pixel sub-array that can be operated to capture image frames at high frame rates including those in excess of 960 frames per second. The DSP 106 is manufactured by Analog Devices under part number ADSP-BF524.

Figure 9:
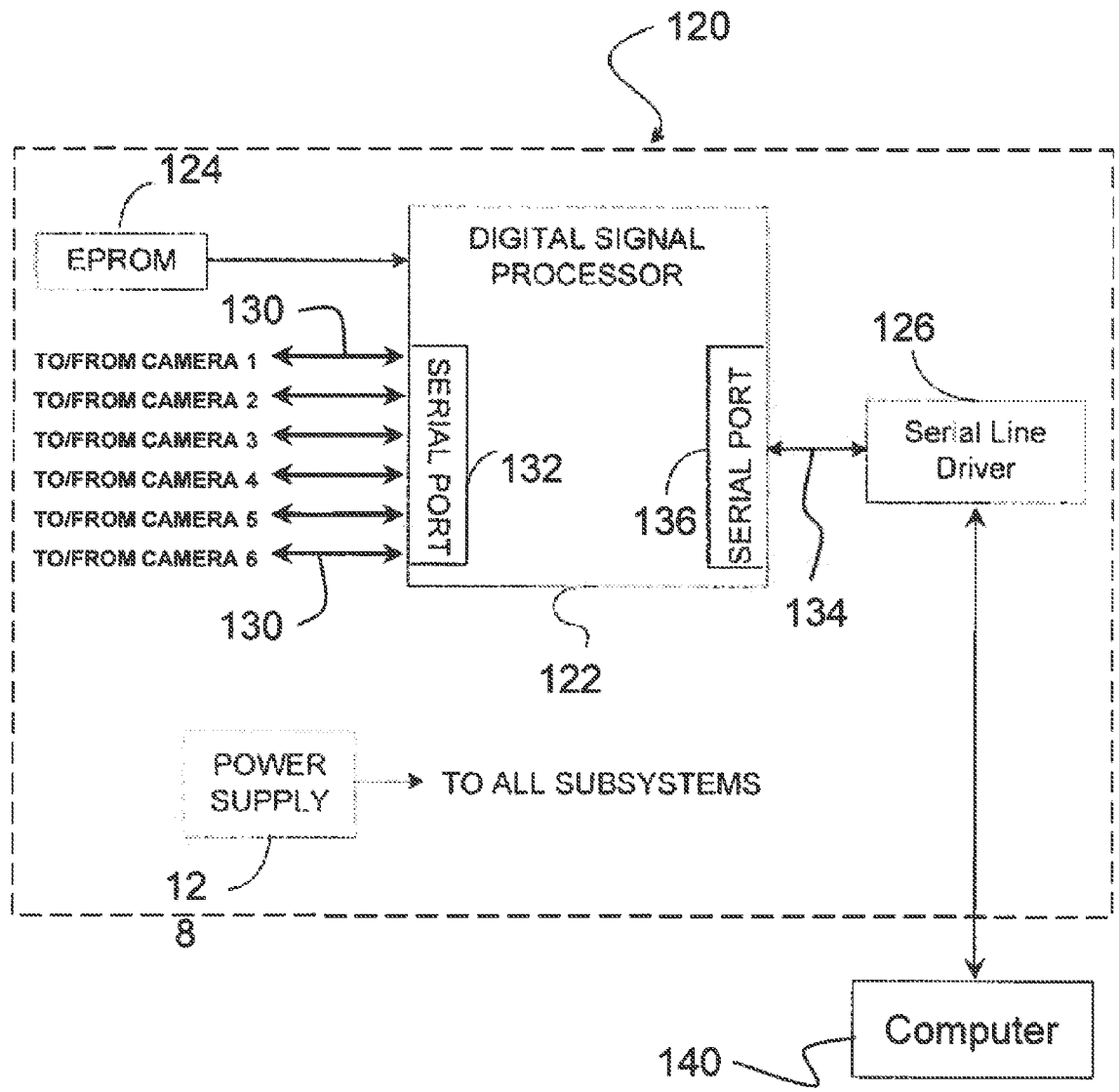
FIG. 9 is a schematic block diagram of a master controller forming part of the interactive input system of FIG. 1.

Each of the imaging devices 70a to 70f communicates with the master processor 120 which is best shown in FIG. 9. Master controller 120 is accommodated by the housing 52 and comprises a DSP 122 having a first serial input/output port 132 and a second serial input/output port 136. The master controller 120 communicates with the imaging devices 70a to 70f via first serial input/output port over communication lines 130. Target data received by the DSP 122 from the imaging devices 70a to 70f is processed by the DSP 122 as will be described. DSP 122 communicates with a general purpose computing device 140 via the second serial input/output port 136 and a serial line driver 126 over communication lines 134. Master controller 120 further comprises a boot EPROM 124 storing interactive input system parameters that are accessed by the DSP 122. The master controller components received power from a power supply 128. In this embodiment, the DSP 122 is also manufactured by Analog Devices under part number ADM222. The serial line driver 138 is manufactured by Analog Devices under part number ADM222.

The master controller 120 and each imaging device follow a communication protocol that enables bi-directional communications via a common serial cable similar to a universal serial bus (USB). The transmission bandwidth is divided into thirty-two (32) 16-bit channels. Of the thirty-two channels, four (4) channels are assigned to each of the DSPs 106 in the imaging devices 70a to 70f and to the DSP 122 in the master controller 120. The remaining channels are unused and may be reserved for further expansion of control and image processing functionality (e.g., use of additional imaging devices). The master controller 120 monitors the channels assigned to the DSPs 106 while the DSP 106 in each of the imaging devices monitors the five (5) channels assigned to the master controller DSP 122. Communications between the master controller 120 and each of the imaging devices 70a to 70f are performed as background processes in response to interrupts.

In this embodiment, the general purpose computing device 140 is a computer or other suitable processing device and comprises for example, a processing unit, system memory (volatile and/or non-volatile memory), other removable or non-removable memory (hard drive, RAM, ROM, EEPROM, CD-ROM, DVD, flash memory, etc.), and a system bus coupling various components to the processing unit. The general purpose computing device 140 may also comprise a network connection to access shared or remote drives, one or more networked computers, or other networked devices. The processing unit runs a host software application/operating system and provides display output to the display panel 60. During execution of the host software application/operating system, a graphical user interface is presented on the display surface of the display panel 60 allowing one or more users to interact with the graphical user interface via pointer input within the input area 62. In this manner, freeform or handwritten ink objects as well as other objects can be input and manipulated via pointer interaction with the display surface of the display panel 60.

Figure 10A:
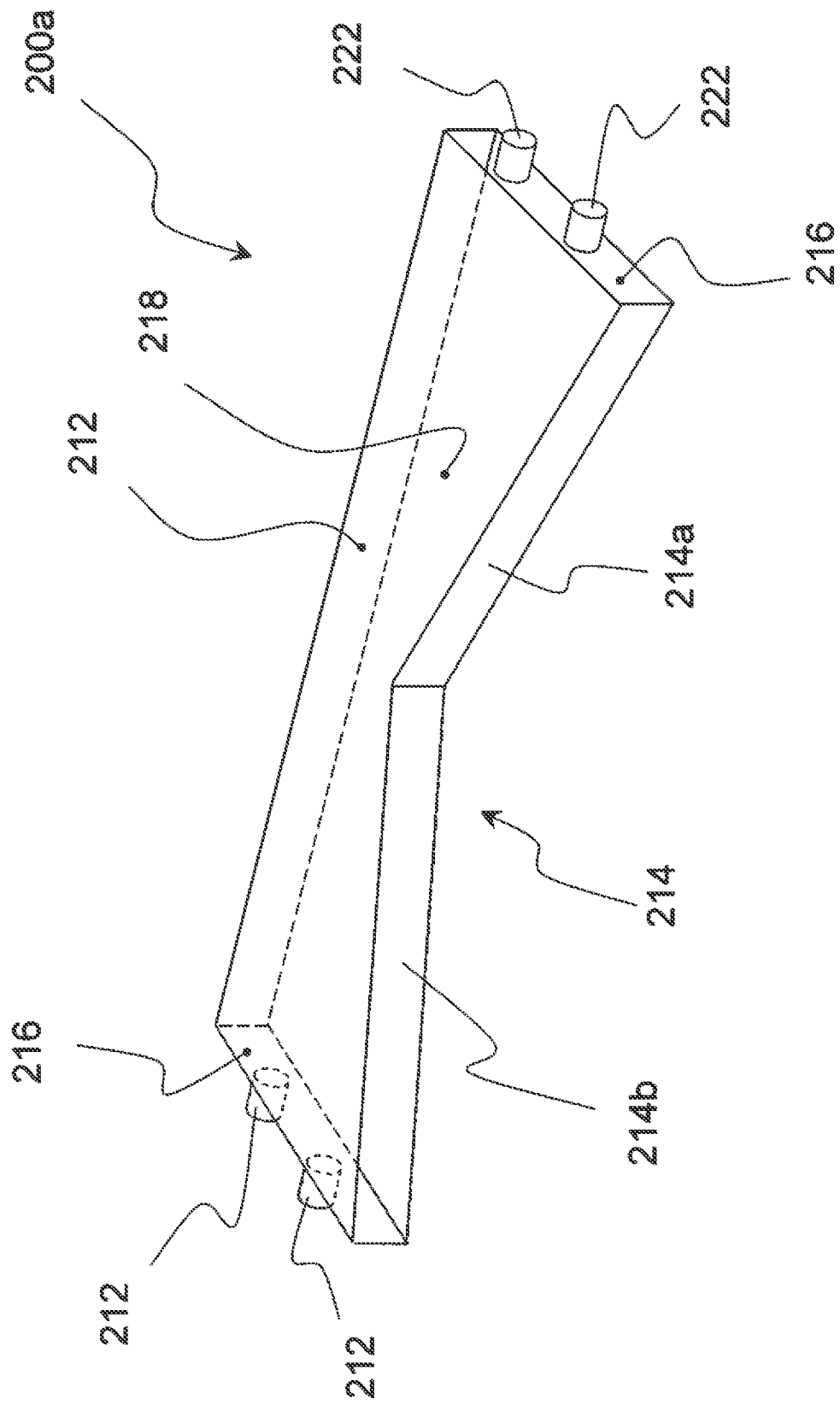
FIGS. 10a, 10b and 10c are perspective, top plan and front elevational views, respectively, of a bezel segment forming part of the illuminated bezel.
Figure 10B:
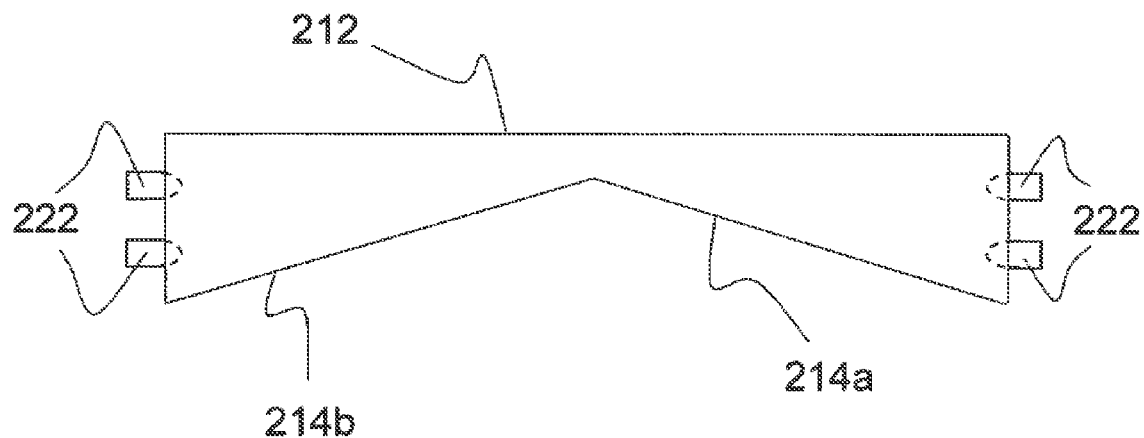
Figure 10C:
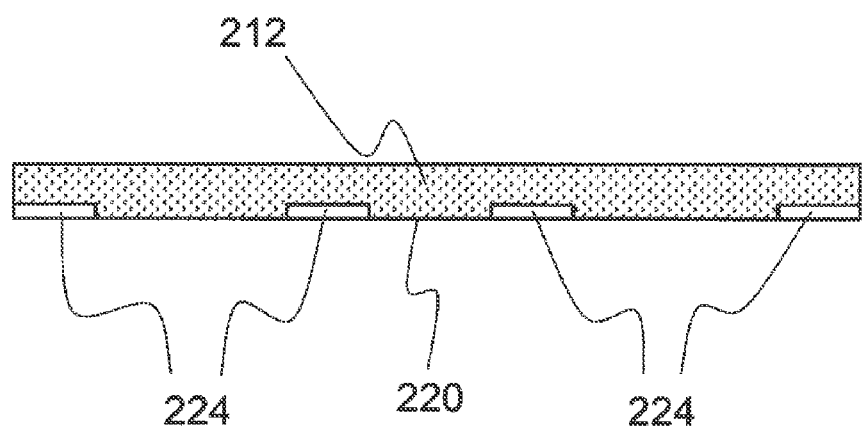

The illuminated bezel 72 comprises four bezel segments 200a to 200d with each bezel segment extending substantially along the entire length of a respective side of the input area 62. FIGS. 10a to 10c better illustrate the bezel segment 200a. In this embodiment, the bezel segment 200a is formed of a homogeneous piece of clear, light transmissive material such as for example Lexan®, Plexiglas, acrylic or other suitable material. The bezel segment 200a comprises a front surface 212 that extends substantially along the entire length of the respective major side of the input area 62, a back surface 214, two side surfaces 216, a top surface 218 and a bottom surface 220. The front, back and side surfaces of the bezel segment 200a are generally normal to the plane of the display surface of display panel 60. Each side surface 216 has a pair of laterally spaced bores formed therein that accommodate light sources. In this particular embodiment, the light sources are infrared (IR) light emitting diodes (LEDs) 222 although LEDs or other suitable light sources that emit light at different wavelengths may be used. The top, bottom, side and back surfaces of the bezel segment 200a are coated with a reflective material to reduce the amount of light that leaks from the bezel segment via these surfaces. The front surface 212 of the bezel segment 200a is textured or covered with a diffusive material to produce a diffusive surface that allows light to escape from the bezel segment into the input area 62. In particular, in this embodiment, the front surface 212 of the bezel segment is textured to form a dimple pattern with the density of the dimples 226 increasing towards the center of the bezel segment 200a to allow more light to escape from the center of the bezel segment as compared to the ends of the bezel segment as shown in FIG. 11a.

The geometry of the bezel segment 200a is such that the reflective back surface 214 is v-shaped with the bezel segment being most narrow at its midpoint. As a result, the reflective back surface 214 defines a pair of angled reflective surface panels 214a and 214b with the ends of the panels that are positioned adjacent the center of the bezel segment 200a being closer to the front surface 212 than the opposite ends of the reflective surface panels. This bezel segment configuration compensates for the attenuation of light emitted by the IR LEDs 222 that propagates through the body of the bezel segment 200a by tapering towards the midpoint of the bezel segment 200a. The luminous emittance of the bezel segment 200a is maintained generally at a constant across the front surface 212 of the bezel segment by reducing the volume of the bezel segment 200a further away from the IR LEDs 222 where the attenuation has diminished the light flux. By maintaining the luminous emittance generally constant across the bezel segment, the amount of backlighting exiting the front surface 212 of the bezel segment 200a is a generally uniform density. This helps to make the bezel segment backlight illumination appear uniform to the imaging devices 70a to 70f.

Shallow notches 224 are provided in the bottom surface 220 of the bezel segment 200a to accommodate the imaging devices 70a, 70e, 70f and 70b. In this manner, the imaging devices are kept low relative to the front surface 212 so that the imaging devices block as little of the backlight illumination escaping the bezel segment 200a via the diffusive front surface 212 as possible while still being able to view the input area 62, and thus, the height of the bezel segment can be reduced.

Figure 12:
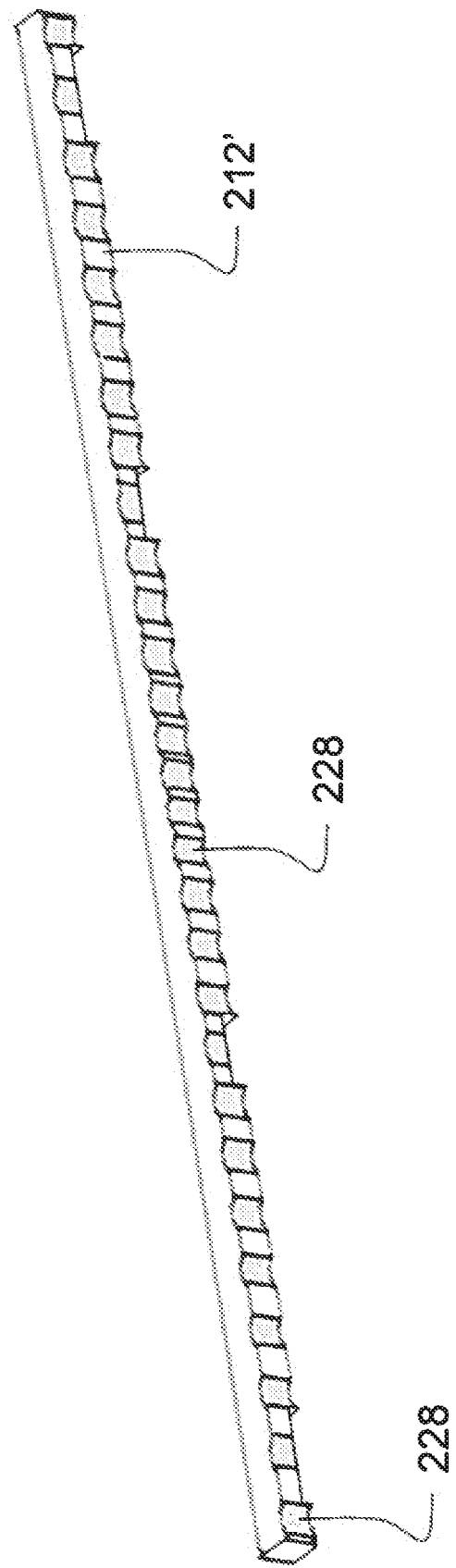
FIG. 12 is a perspective view of a portion of another alternative bezel segment showing the diffusive front surface thereof.

FIGS. 11b and 11c show alternative dimple patterns provided on the front surface 212 of the bezel segment with the density of the dimples 226' and 226" increasing towards the center of the bezel segment to allow more light to escape from the center of the bezel segment as compared to the ends of the bezel segment. FIG. 12 shows yet another alternative bezel segment having a front surface 212' configured to allow more light to escape from the center of the bezel segment as compared to the ends of the bezel segment. As can be seen, in this embodiment spaced vertical grooves or slits 228 are formed in the front surface 212' with the density of the grooves or slits 228 increasing towards the center of the bezel segment.

The bezel segment 200c extending along the opposite major side of the input area 62 has a similar configuration to that described above with the exception that the number and positioning of the notches 224 is varied to accommodate the imaging devices 70c and 70d that are covered by the bezel segment 200c. The bezel segments 200b and 200d extending along the shorter sides of the input area 62 also have a similar configuration to that described above with the exceptions that the side surfaces of the bezel segments only accommodate a single IR LED 222 (as the lighting requirements are reduced due to the decreased length of the bezel segments) and the number and the positioning of the notches 224 are varied to accommodate the imaging devices that are covered by the bezel segments 200b and 200d.

During general operation of the interactive input system 50, the IR LEDs 222 of the bezel segments 200a to 200d are illuminated resulting in infrared backlighting escaping from the bezel segments via their front surfaces 212 and flooding the input area 62. As mentioned above, the design of the bezel segments 200a to 200d is such that the backlight illumination escaping each bezel segment is generally even along the length of the bezel segment. Each imaging device which looks across the input area 62 is conditioned by its associated DSP 106 to acquire image frames. When no pointer is in the field of view of an imaging device, the imaging device sees the infrared backlighting emitted by the bezel segments and thus, generates a bright or "white" image frame. When a pointer is positioned within the input area 62, the pointer occludes infrared backlighting emitted by at least one of the bezel segments. As a result, the pointer, referred to as a target, appears in captured image frames as a "dark" region on a "white" background. For each imaging device, image data acquired by its image sensor 100 is processed by the DSP 106 to determine if one or more targets (e.g. pointers) is/are believed to exist in each captured image frame. When one or more targets is/are determined to exist in a captured image frame, pointer characteristic data is derived from that captured image frame identifying the target position(s) in the captured image frame.

The pointer characteristic data derived by each imaging device is then conveyed to the master controller 120. The DSP 122 of the master controller in turn processes the pointer characteristic data to allow the location(s) of the target(s) in (x,y) coordinates relative to the input area 62 to be calculated using well known triangulation.

The calculated target coordinate data is then reported to the general purpose computing device 140, which in turn records the target coordinate data as writing or drawing if the target contact(s) is/are write events or injects the target coordinate data into the active application program being run by the general purpose computing device 140 if the target contact(s) is/are mouse events. As mentioned above, the general purpose computing device 140 also updates the image data conveyed to the display panel 60, if required, so that the image presented on the display surface of the display panel 60 reflects the pointer activity.

When a single pointer exists in the image frames captured by the imaging devices 70a to 70f, the location of the pointer in (x,y) coordinates relative to the input area 62 can be readily computed using triangulation. When multiple pointers exist in the image frames captured by the imaging devices 70a to 70f, computing the positions of the pointers in (x,y) coordinates relative to the input area 62 is more challenging as a result of pointer ambiguity and occlusion issues.

As mentioned above, pointer ambiguity arises when multiple targets are positioned within the input area 62 at different locations and are within the fields of view of multiple imaging devices. If the targets do not have distinctive markings to allow them to be differentiated, the observations of the targets in each image frame produce real and false target results that cannot be readily differentiated.

Pointer occlusion arises when a target in the field of view of an imaging device occludes another target in the field of view of the same imaging device, resulting in observation merges as will be described.

Depending on the position of an imaging device relative to the input area 62 and the position of a target within the field of view of the imaging device, an imaging device may or may not see a target brought into its field of view adequately to enable image frames acquired by the imaging device to be used to determine the position of the target relative to the input area 62. Accordingly, for each imaging device, an active zone within the field of view of the imaging device is defined. The active zone is an area that extends to a distance of radius 'r' away from the imaging device. This distance is pre-defined and based on how well an imaging device can measure an object at a certain distance. When one or more targets appear in the active zone of the imaging device, image frames acquired by the imaging device are deemed to observe the targets sufficiently such that the observation for each target within the image frame captured by the imaging device is processed. When a target is within the field of view of an imaging device but is beyond the active zone of the imaging device, the observation of the target is ignored. When a target is within the radius 'r' but outside of the field of view of the imaging device, it will not be seen and that imaging device is not used during target position determination.

When each DSP 106 receives an image frame, the DSP 106 processes the image frame to detect the existence of one or more targets. If one or more targets exist in the active zone, the DSP 106 creates an observation for each target in the active zone. Each observation is defined by the area formed between two straight lines, namely one line that extends from the focal point of the imaging device and crosses the left edge of the target, and another line that extends from the imaging device and crosses the right edge of the target. The DSP 90 then coveys the observation(s) to the master controller 120.

The master controller 120 in response to received observations from the imaging devices 70a to 70f examines the observations to determine observations that overlap. When multiple imaging devices see the target resulting in observations that overlap, the overlapping observations are referred to as a candidate. The intersecting lines forming the overlapping observations define the perimeter of the candidate and delineate a bounding box. The center of the bounding box in (x,y) coordinates is computed by the master controller 120 using triangulation thereby to locate the target within the input area.

When a target is in an input region of the input area 62 and all imaging devices whose fields of view encompass the input region and whose active zones include at least part of the target, create observations that overlap, the resulting candidate is deemed to be a consistent candidate. The consistent candidate may represent a real target or a phantom target.

The master controller 120 executes a candidate generation procedure to determine if any consistent candidates exist in captured image frames. FIG. 13 illustrates steps performed during the candidate generation procedure. During the candidate generation procedure, a table is initially generated, or "built", that lists all imaging device observations so that the observations generated by each imaging device can be cross-referenced with all other observations to see if one or more observations overlap and result in a candidate (step 300).

As the interactive input system 50 includes six (6) imaging devices 70a to 70f and is capable of simultaneously tracking eight (8) targets, the maximum number of candidates that is possible is equal to nine-hundred and sixty (960). For ease of illustration, FIG. 14 shows an exemplary table identifying three imaging devices with each imaging device generating three (3) observations. Cells of the table with an "X" indicate observations that are not cross-referenced with other observations. For example, imaging device observations cannot be cross-referenced with any of their own observations. Cells of the table that are redundant are also not cross-referenced. In FIG. 14, cells of the table designated with a "T" are processed. In this example of three imaging devices and three targets, the maximum number of candidates to examine is twenty-seven (27). Once the table has been created at step 300, the table is examined from left to right and starting at the top row and moving downwards to determine if the table includes a candidate (step 302). If the table is determined to be empty (step 304), and therefore does not include any candidates, the candidate generation procedure ends (step 306).

At step 304, if the table is not empty and a candidate is located, a flag is set in the table for the candidate and the intersecting lines that make up the bounding box for the candidate resulting from the two imaging device observations are defined (step 308). A check is then made to determine if the position of the candidate is completely beyond the input area 62 (step 310). If the candidate is determined to be completely beyond the input area 62, the flag that was set in the table for the candidate is cleared (step 312) and the procedure reverts back to step 302 to determine if the table includes another candidate.

At step 310, if the candidate is determined to be partially or completely within the input area 62, a list of the imaging devices that have active zones encompassing at least part of the candidate is created excluding the imaging devices whose observations were used to create the bounding box at step 308 (step 314). Once the list of imaging devices has been created, the first imaging device in the list is selected (step 316). For the selected imaging device, each observation created for that imaging device is examined to see if it intersects with the bounding box created at step 308 (steps 318 and 320). If no observation intersects the bounding box, the candidate is determined not to be a consistent candidate. As a result, the candidate generation procedure reverts back to step 312 and the flag that was set in the table for the candidate is cleared. At step 320, if an observation that intersects the bounding box is located, the bounding box is updated using the lines that make up the observation (step 322). A check is then made to determine if another non-selected imaging device exists in the list (step 324). If so, the candidate generation procedure reverts back to step 316 and the next imaging device in the list is selected.

At step 324, if all of the imaging devices have been selected, the candidate is deemed to be a consistent candidate and is added to a consistent candidate list (step 326). Once the candidate has been added to the consistent candidate list, the center of the bounding box delineated by the intersecting lines of the overlapping observations forming the consistent candidate in (x,y) coordinates is computed and the combinations of observations that are related to the consistent candidate are removed from the table (step 328). Following this, the candidate generation procedure reverts back to step 302 to determine if another candidate exists in the table. As will be appreciated, the candidate generation procedure generates a list of consistent candidates representing targets that are seen by all of the imaging devices whose fields of view encompass the target locations. For example, a consistent candidate resulting from a target in the central input region 62b is seen by all six imaging devices 70a to 70f whereas a consistent candidate resulting from a target in the left or right input region 62a or 62c is only seen by five imaging devices.

Figure 15:
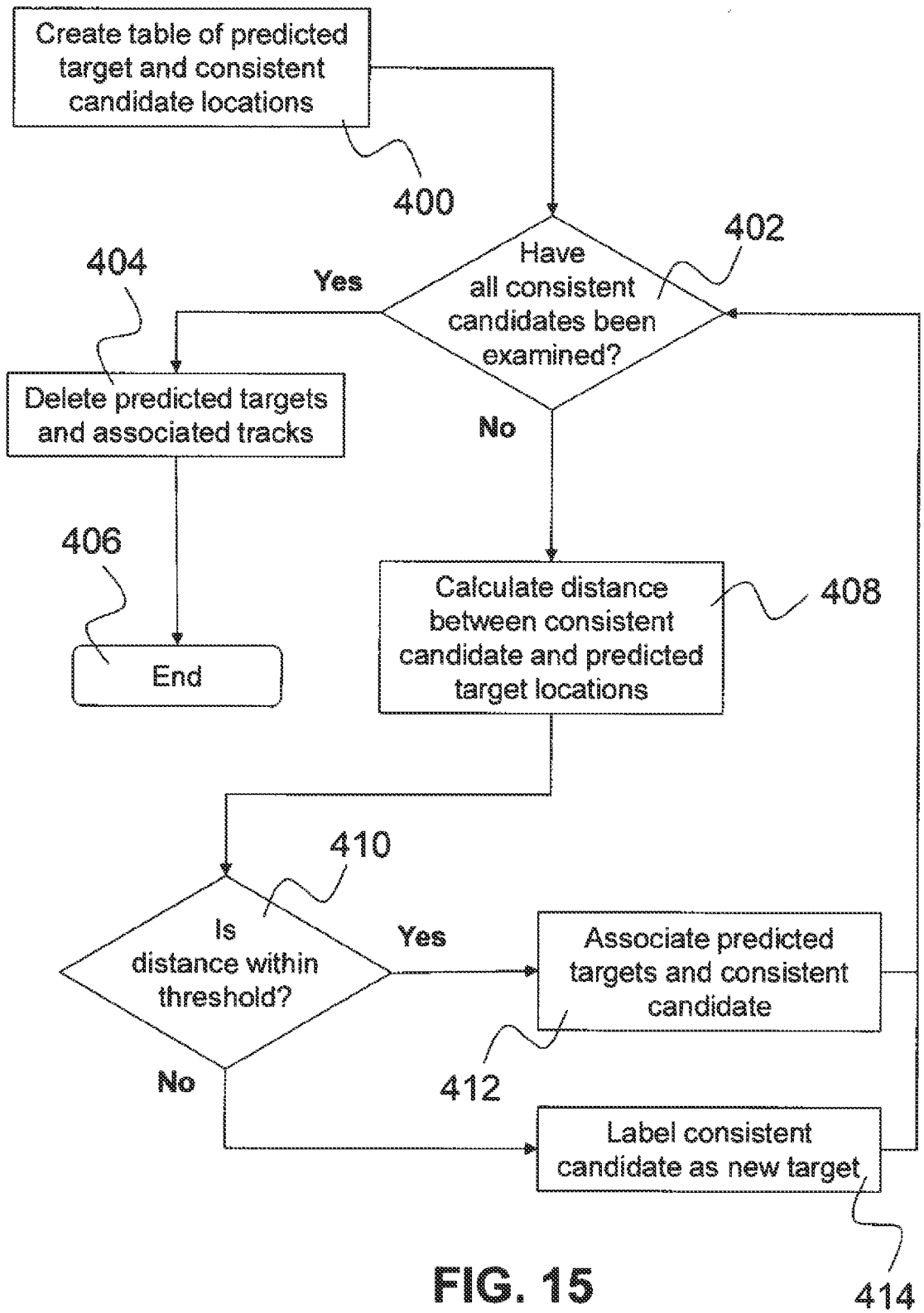
FIG. 15 is a flowchart showing the steps performed during an association procedure.

The master controller 120 also executes an association procedure as best shown in FIG. 15 to associate candidates with existing targets. During the association procedure, a table is created that contains the coordinates of predicted target locations generated by a tracking procedure as will be described, and the location of the consistent candidates in the consistent candidate list created during the candidate generation procedure (step 400). A check is then made to determine if all of the consistent candidates have been examined (step 402). If it is determined that all of the consistent candidates have been examined, any predicted target locations that are not associated with a consistent candidate are deemed to be associated with a dead path. As a result, these predicted target locations and previous tracks associated with these predicted targets are deleted (step 404) and the association procedure is terminated (step 406).

At step 402, if it is determined that one or more of the consistent candidates have not been examined, the next unexamined consistent candidate in the list is selected and the distance between the selected consistent candidate and all of the predicted target locations is calculated (step 408). A check is then made to determine whether the distance between the selected consistent candidate and a predicted target location falls within a threshold (step 410). If the distance falls within the threshold, the consistent candidate is associated with the predicted target location (step 412). Alternatively, if the distance is beyond the threshold, the selected consistent candidate is labelled as a new target (step 414). Following either of steps 412 and 414, the association procedure reverts back to step 402 to determine if all of the consistent candidates in the selected consistent candidate list have been selected. As a result, the association procedure identifies each consistent candidate as either a new target within the input area 62 or an existing target.

Figure 16:
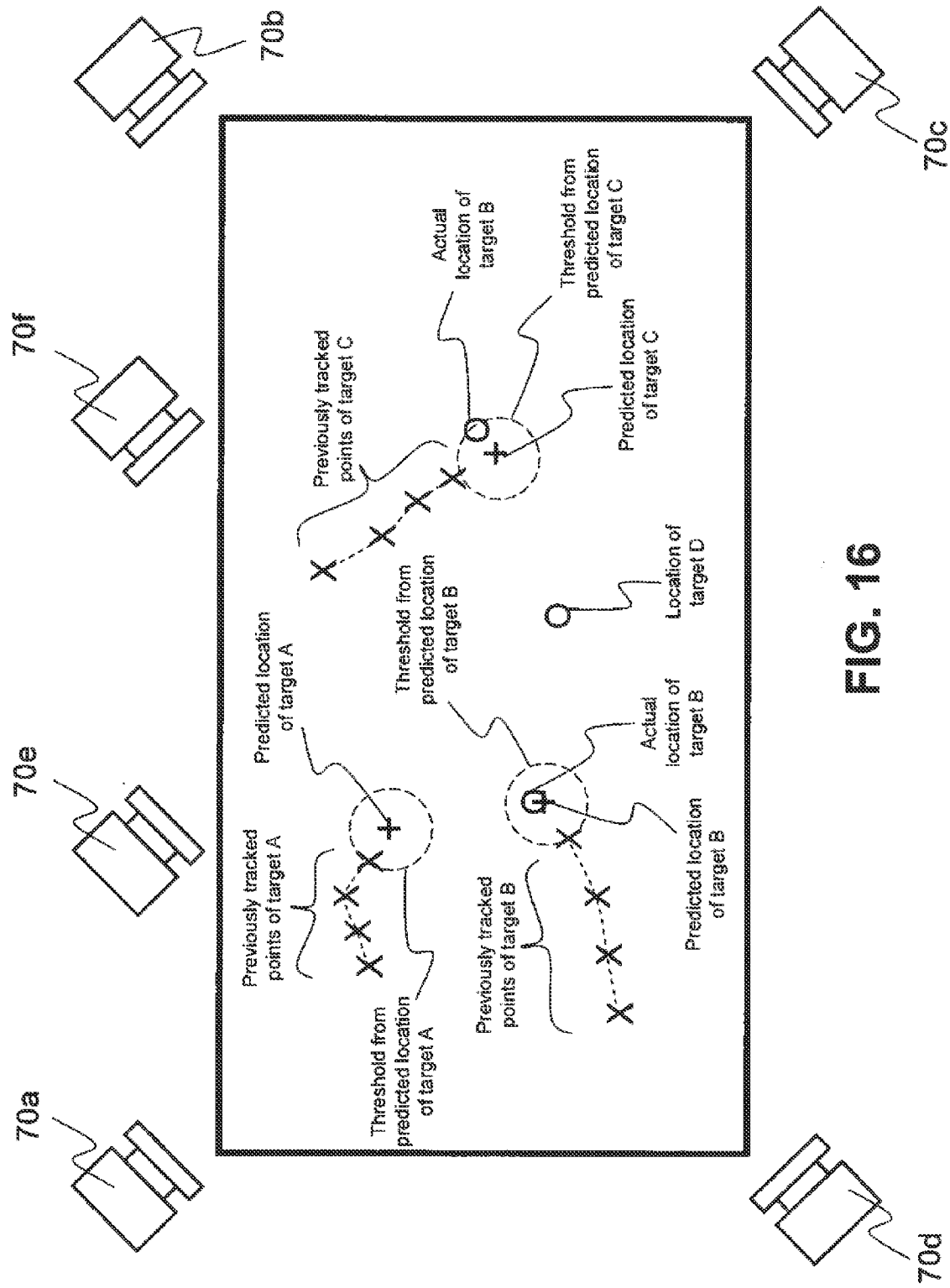
FIG. 16 shows an example of multiple target tracking.

FIG. 16 shows an example of the interactive input system 50 tracking three pointers A, B and C. The locations of four previously triangulated targets for pointers A, B and C are represented by an "X". From these previously tracked target locations, an estimate (e.g. predicted target location) is made for where the location of the pointer should appear in the current image frame, and is represented by a "+". Since a user can manipulate a pointer within the input area 62 at an approximate maximum velocity of 4 m/s, and if the interactive input system 50 is running at 100 frames per second, then the actual location of the pointer should appear within [400 cm/s/100 frames/s×1 frame=4 cm] four (4) centimeters of the predicted target location. This threshold is represented by a broken circle surrounding the predicted target locations. Pointers B and C are both located within the threshold of their predicted target locations and are thus associated with those respective previously tracked target locations. The threshold around the predicted target location of pointer A does not contain pointer A, and is therefore considered to be a dead track and no longer used in subsequent image processing. Pointer D is seen at a position outside all of the calculated thresholds and is thus considered a new target and will continue to be tracked in subsequent image frames.

The master controller 120 executes a state estimation procedure to determine the status of each candidate, namely whether each candidate is clear, merged or irrelevant. If a candidate is determined to be merged, a disentanglement process is initiated. During the disentanglement process, the state metrics of the targets are computed to determine the positions of partially and completely occluded targets. Initially, during the state estimation procedure, the consistent candidate list generated by the candidate generation procedure, the candidates that have been associated with existing targets by the association procedure, and the observation table are analyzed to determine whether each imaging device had a clear view of each candidate in its field of view or whether a merged view of candidates within its field of view existed. Candidates that are outside of the active areas of the imaging devices are flagged as being irrelevant.

Figure 41:
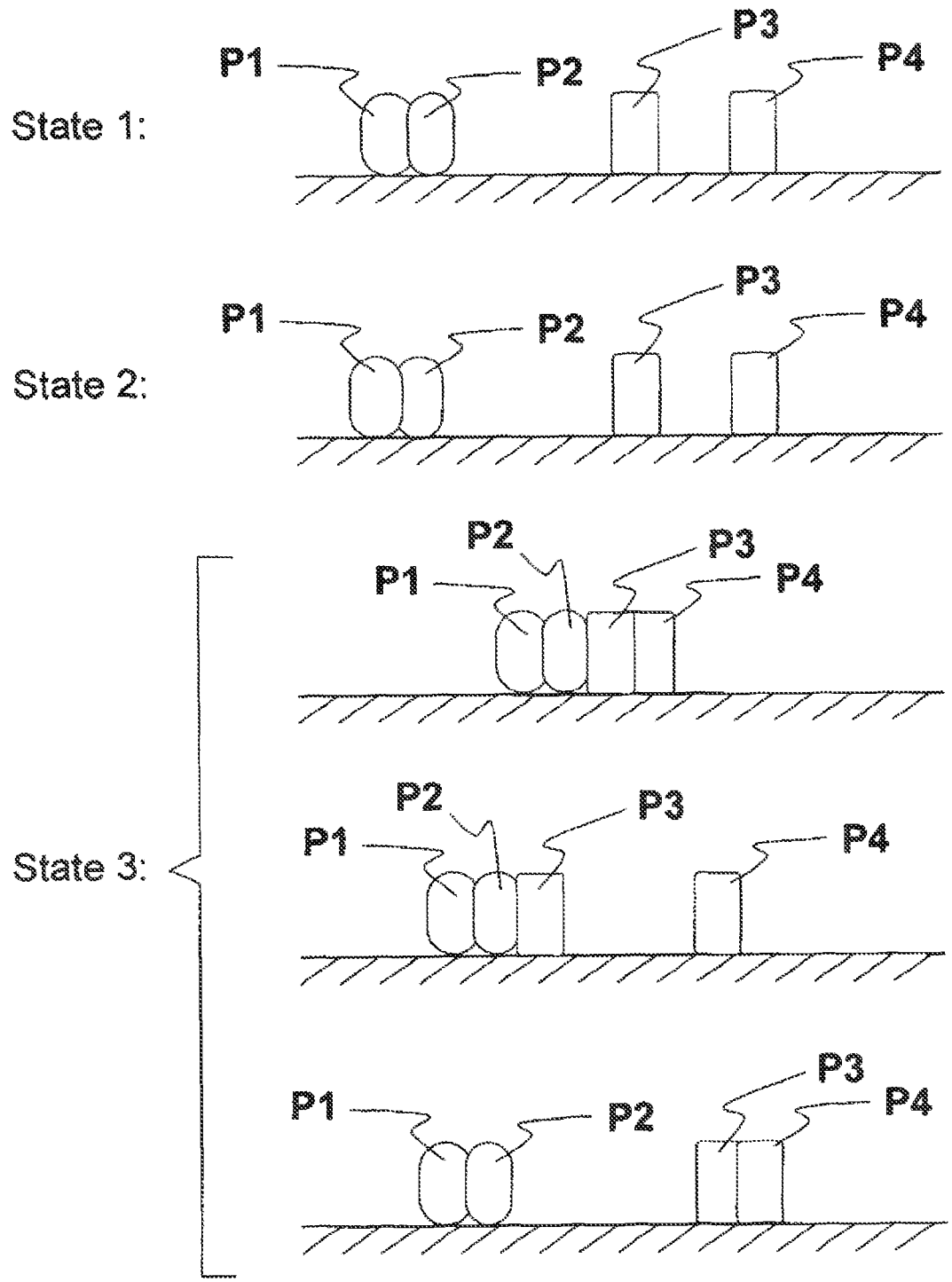
FIG. 41 shows three possible states for multiple targets as seen by an imaging device.

The target and phantom track identifications from the previous image frames are used as a reference to identify true target merges. When a target merge for an imaging device is deemed to exist, the disentanglement process for that imaging device is initiated. The disentanglement process makes use of the Viterbi algorithm. Depending on the number of true merges, the Viterbi algorithm assumes a certain state distinguishing between a merge of only two targets and a merge of more than two targets. In this particular embodiment, the disentanglement process is able to occupy one of the three states as shown in FIG. 41, which depicts a four-input situation.

A Viterbi state transition method computes a metric for each of the three states. In this embodiment, the metrics are computed over five (5) image frames including the current image frame and the best estimate on the current state is given to the branch with the lowest level. The metrics are based on the combination of one dimensional predicted target locations and target widths with one dimensional merged observations. The state with the lowest branch is selected and is used to associate targets within a merge. For states 1 and 2, the disentanglement process yields the left and right edges for the merged targets. Only the center position for all the merges in state 3 is reported by the disentanglement process.

Once the disentanglement process has been completed, the states flag indicating a merge is cleared and a copy of the merged status before being cleared is maintained. To reduce triangulation inaccuracies due to disentanglement observations, a weighting scheme is used on the disentangled targets. Targets associated with clear observations are assigned a weighting of one (1). Targets associated with merged observations are assigned a weighting in the range from 0.5 to 0.1 depending on how far apart the state metrics are from each other. The greater the distance between state metrics, the higher the confidence of disentangled observations and hence, the higher the weighting selected from the above range.

Figure 17:
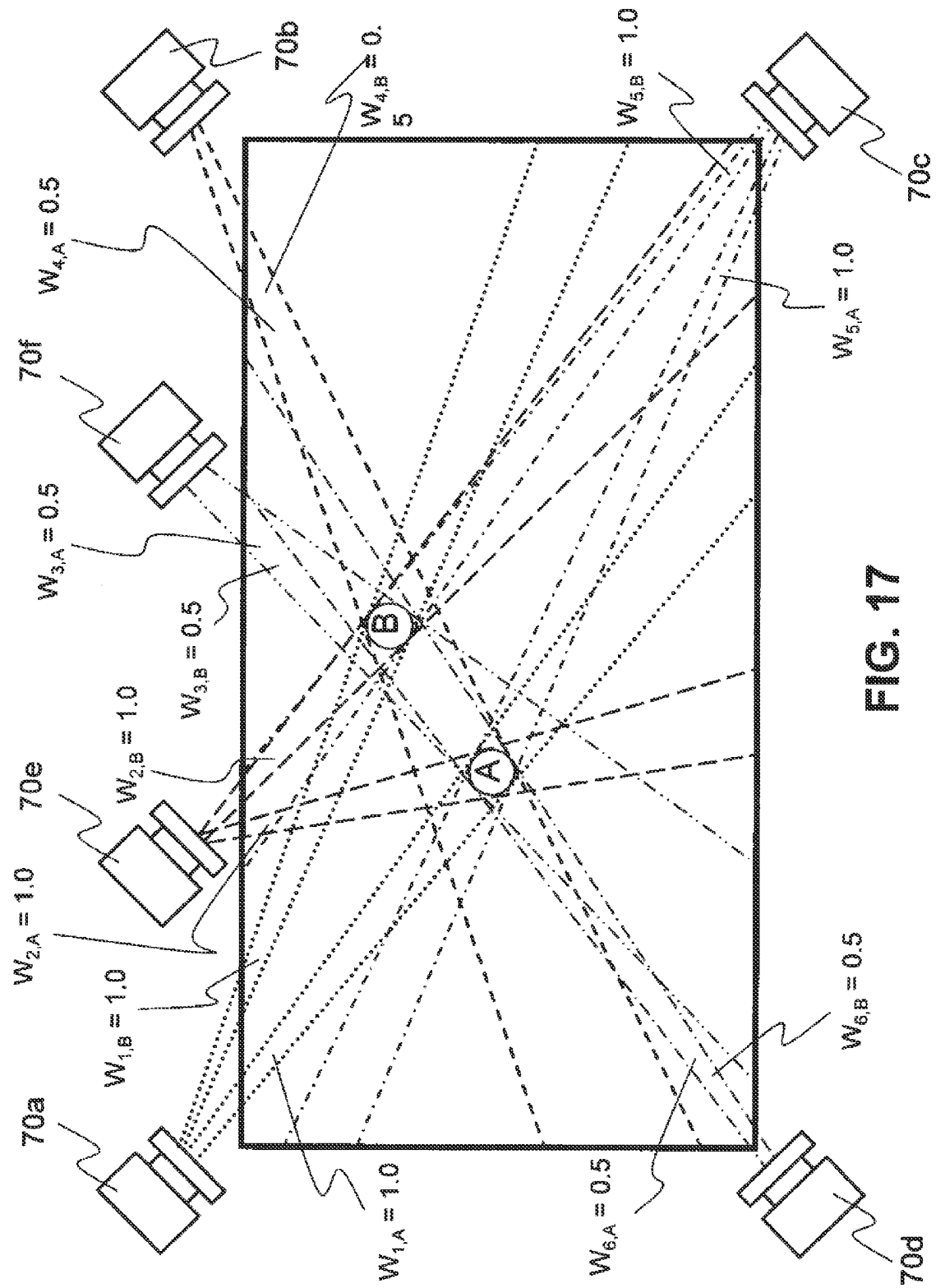
FIGS. 17 and 18 show two targets within the input area and the weights assigned to observations associated with the targets.

FIG. 17 shows an example of two pointers, A and B, positioned within the input area 62 and being viewed by imaging devices 70*a* to 70*f*. Image frames captured by imaging devices 70*a*, 70*e* and 70*c* all have two observations, one of pointer A and the other of pointer B. Image frames captured by imaging devices 70*f*, 70*b*, and 70*d* all have one observation. Since at least one imaging device captured image frames comprising two observations, the state estimation module determines that there must be two pointers within the input area 62. Imaging devices 70*a*, 70*e* and 70*c* each see pointers A and B clearly and so each observation derived from image frames captured by these imaging devices is assigned a weight of 1.0. Imaging devices 70*f*, 70*b* and 70*d* observe only one pointer. As a result it is determined that the two pointers must appear merged to these imaging devices, and therefore a weight of 0.5 is assigned to each observation derived from image frames captured by these imaging devices.

Figure 18:
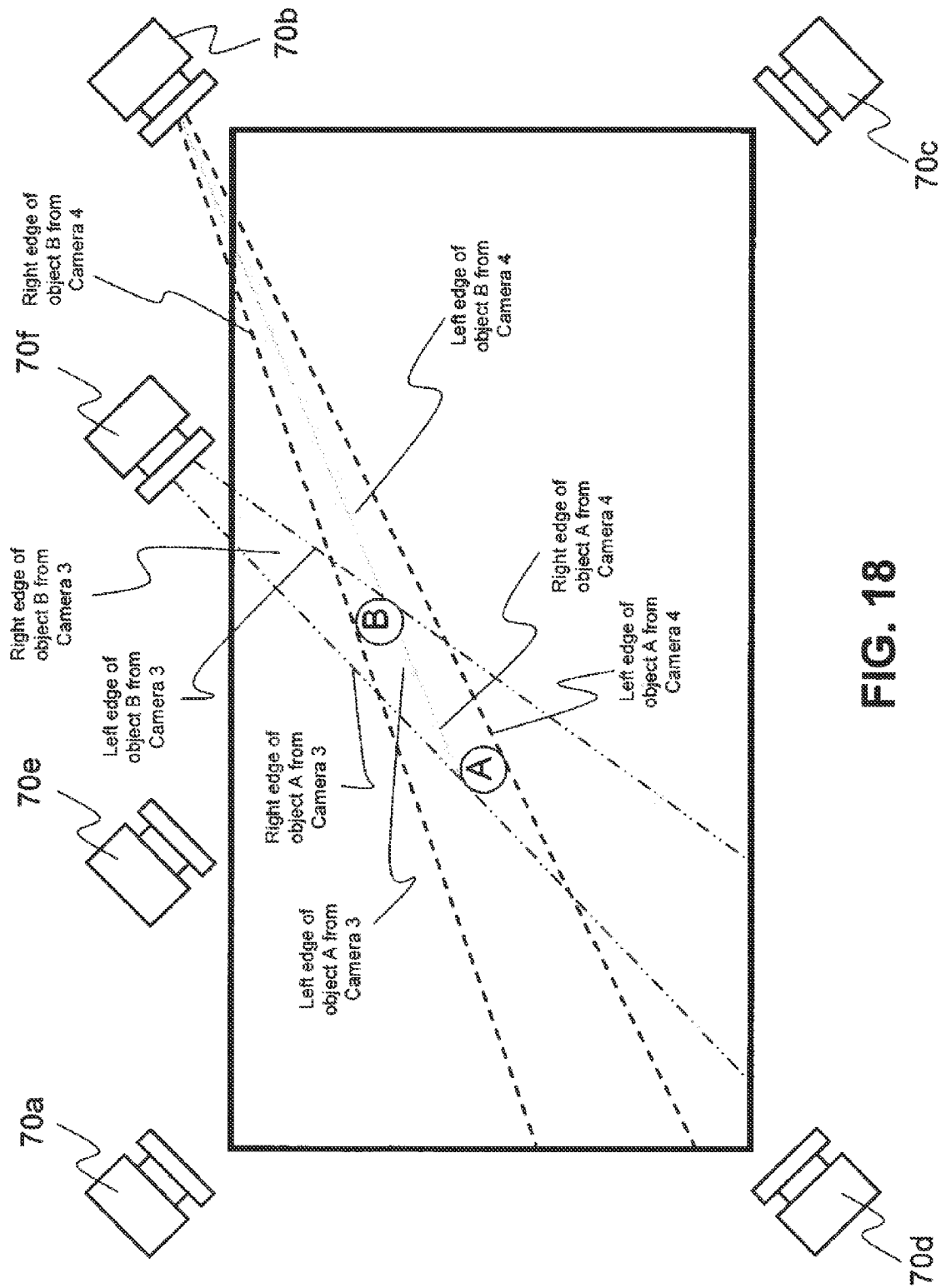

FIG. 18 shows pointers A and B as viewed by imaging devices 70*f* and 70*b*. Since the pointers A and B appear merged to these imaging devices, the state estimation procedure approximates the actual position of the pointers based on earlier data. From previous tracking information, the approximate widths of the pointers are known. Since the imaging devices 70*f* and 70*b* are still able to view one edge of each of the pointers, the other edge is determined based on the previously stored width of the pointers. The state estimation module calculates the edges of both pointers for both imaging devices 70*f* and 70*b*. Once both edges of each pointer are known, the center line for each pointer from each imaging device is calculated.

As mentioned previously, the master controller 120 also executes a tracking procedure to track existing targets. During the tracking procedure, each target seen by each imaging device is examined to determine its center point and a set of radii. The set of radii comprises a radius corresponding to each imaging device that sees the target represented by a line extending from the focal pointer of the imaging device to the center point of the bounding box representing the target. If a target is associated with a pointer, a Kalman filter is used to estimate the current state of the target and to predict its next state. This information is then used to backwardly triangulate the location of the target at the next time step which approximates an observation of the target if the target observation overlaps another target observation seen by the imaging device. If the target is not associated with a candidate, the target is considered dead and the target tracks are deleted from the track list. If the candidate is not associated with a target, and the number of targets is less than the maximum number of permitted targets, in this case eight (8), the candidate is considered to be a new target.

Figure 19:
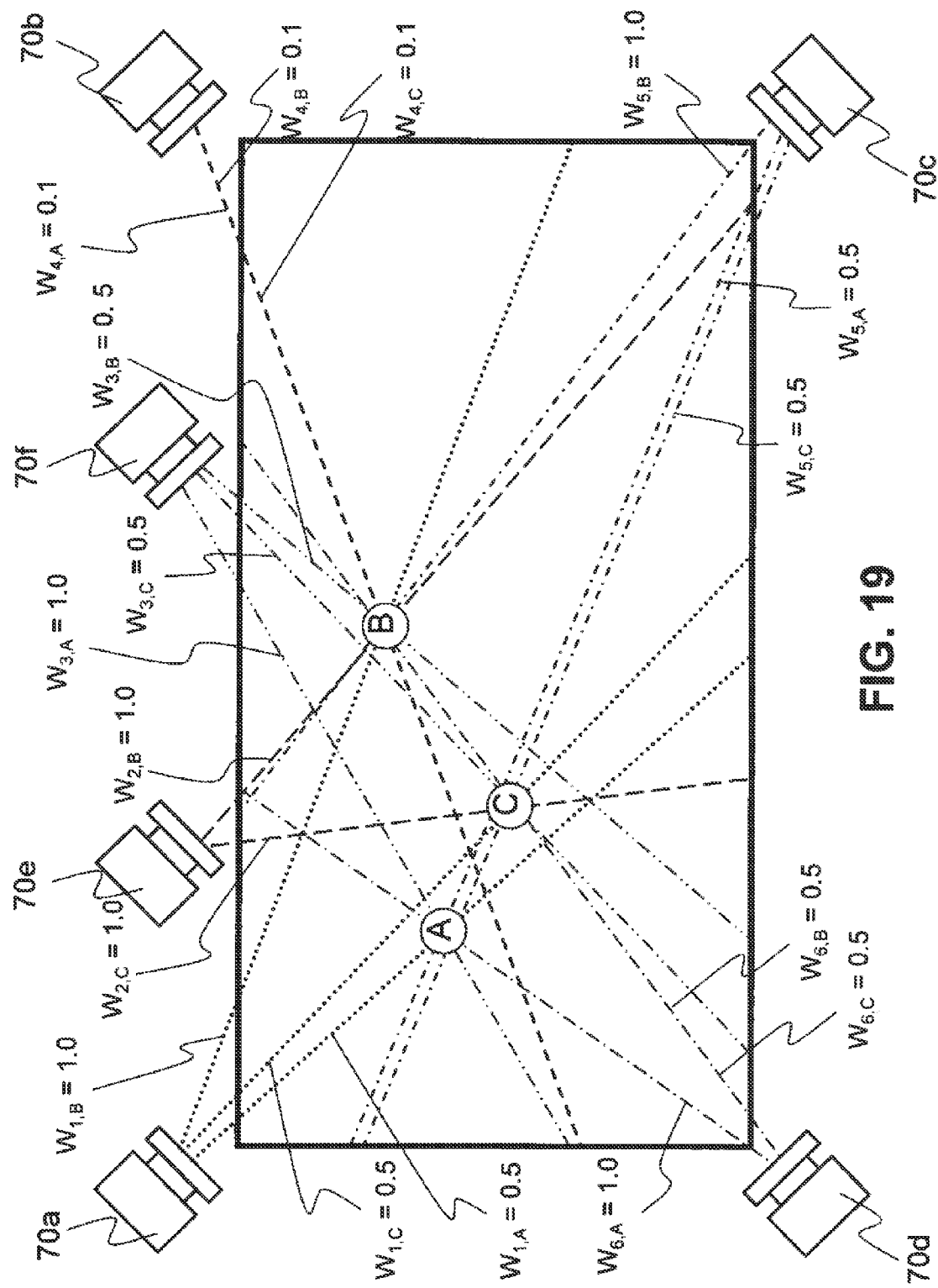
FIGS. 19 to 24 show multiple target scenarios, determined centerlines for each target observation and the weights assigned to the target observations.

FIG. 19 shows an input situation, similar to that of FIGS. 16 to 18. The centerline for each imaging device observation of each target is shown along with the corresponding assigned weight. Note that the centerlines of pointers A and C as seen from imaging device 70*a* can be determined, along with the centerline of pointers B and C as seen from imaging device 70*f*. The centerline of pointers A, B and C as seen from imaging device 70*b* could not be determined and as a result, the center of the merged observation is used for the centerline. The value of the weight assigned to these observations is low.

Figure 20:
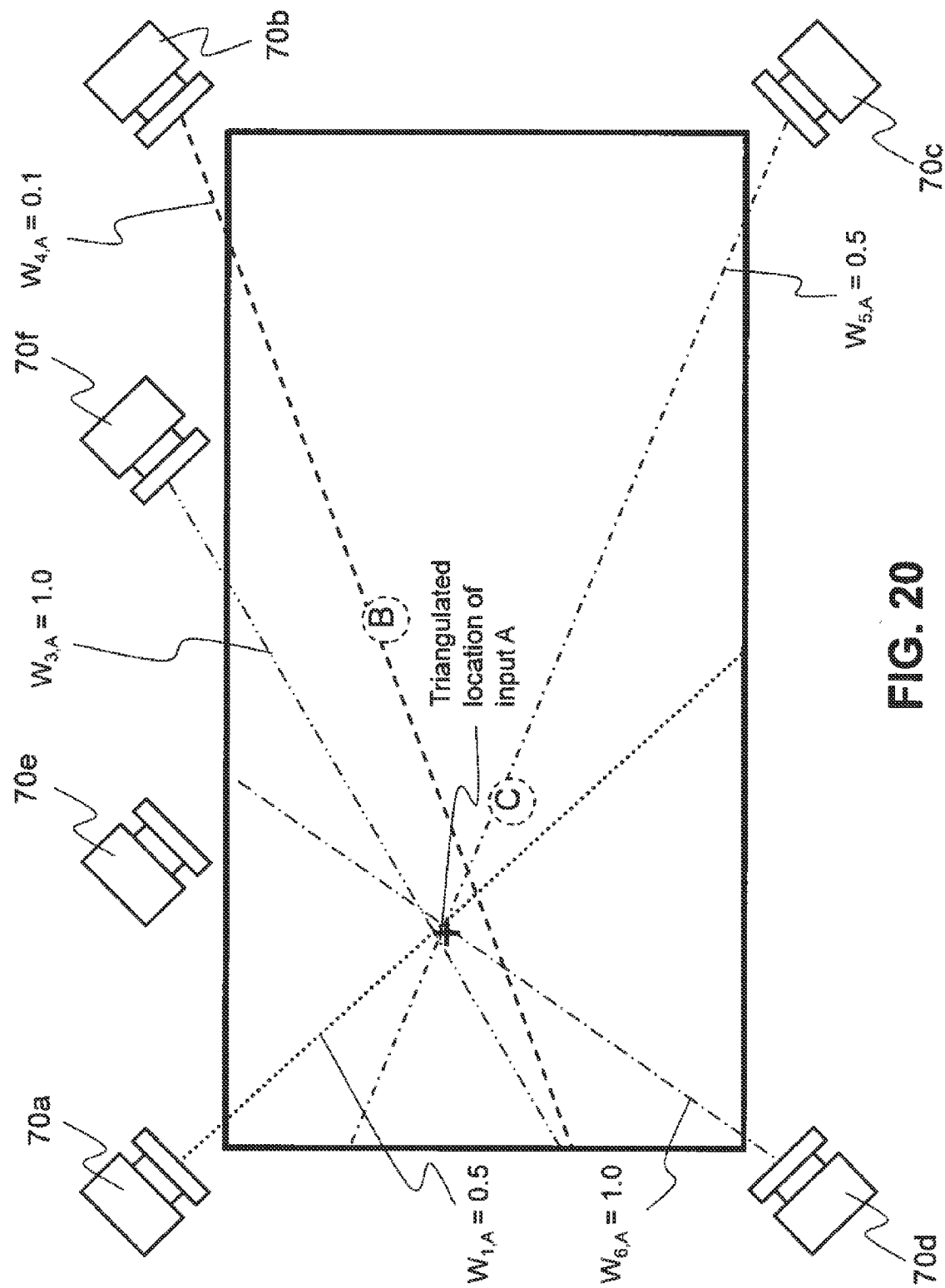

FIG. 20 shows the triangulated location of pointer A from the centerlines of the observations from imaging devices 70*a*, 70*f* and 70*b*. Imaging device 70*f* has a clear view of the pointer A and has an observation with a high weight. The observation of imaging device 70*a* has a medium weight, and the observation of imaging device 70*b* has a low weight. The triangulated location as a result is located closer to the intersection of the two lines with the higher weight since those observations are more reliable.

Figure 21:
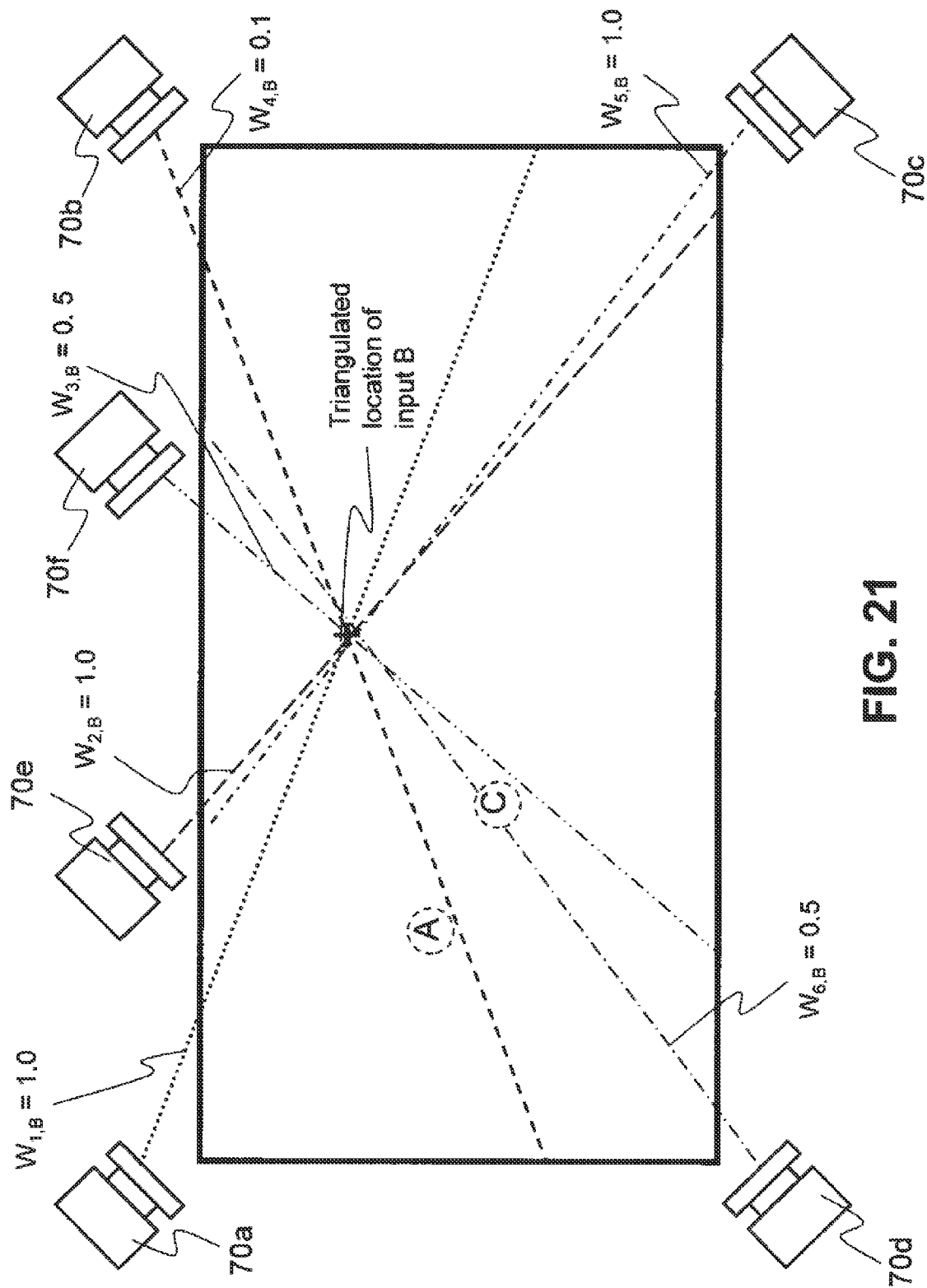

Similar to FIG. 20, FIG. 21 shows the centerline and triangulated position for pointer B. The triangulation is dominated by the highly weighted observations from imaging devices 70*a* and 70*e*.

Figure 22:
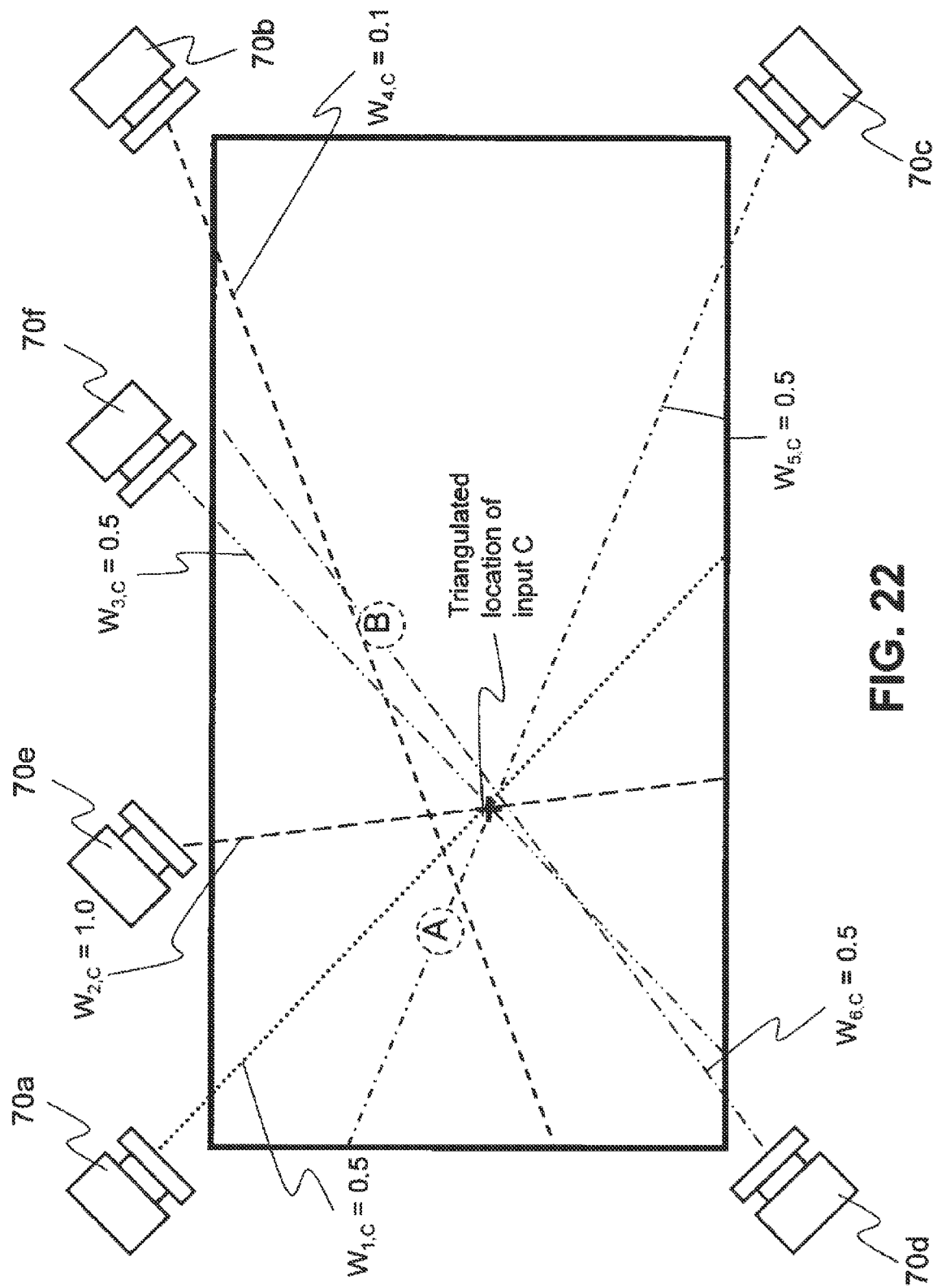

FIG. 22 shows the centerline and triangulated position for pointer C. It is clearly shown that the triangulated position was insignificantly influenced by the low weighted observation of imaging device 70b.

Figure 23:
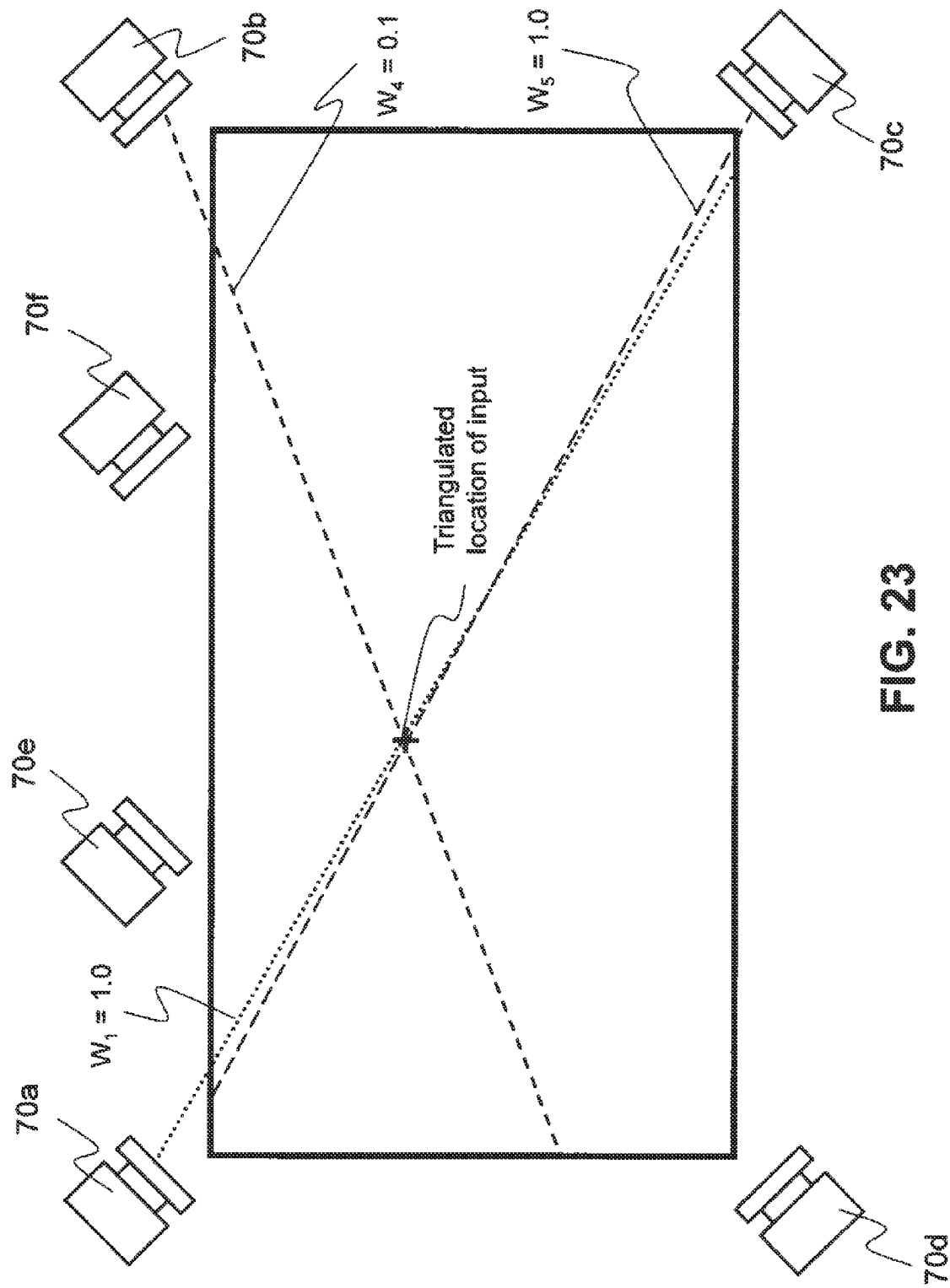

FIG. 23 shows an example of when a low weighted observation becomes important. In this scenario, the pointer is located almost directly between imaging devices 70a and 70c, which both have a clear view of the pointer and corresponding highly weighted observations. Imaging device 70b has a low weighted observation due to an ambiguity such as that situation presented in FIG. 19. The triangulation result from two imaging devices, in this case imaging devices 70a and 70c, yields a point directly or nearly directly between the two imaging devices that is unreliable. In this case where one observation is lowly weighted, the observation is important because it provides an additional view of the target needed for triangulation. Even though the observation is low weighted, it is still better than no other observation at all.

Figure 24:
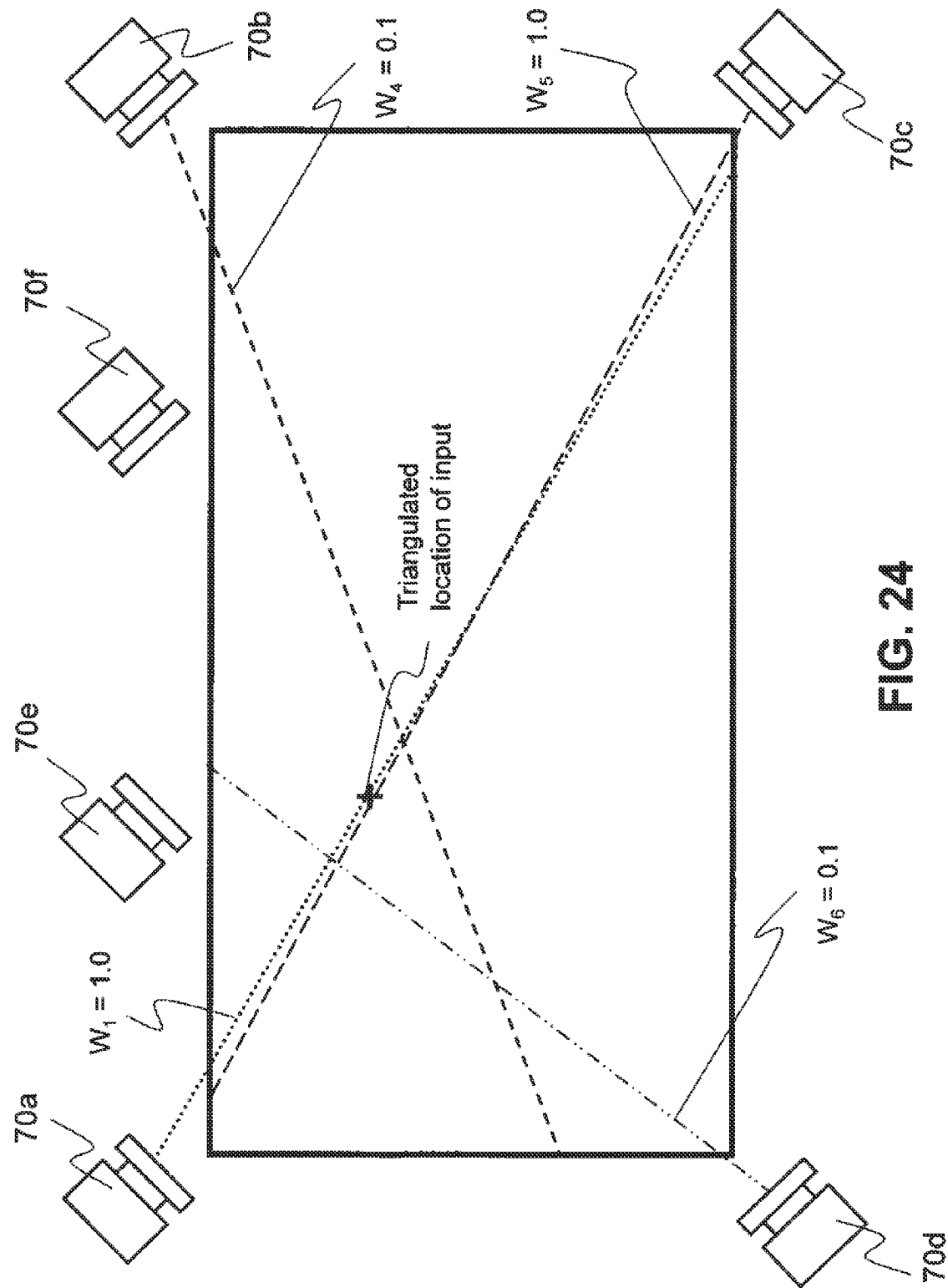

FIG. 24 depicts a similar scenario to that of FIG. 19 but shows two imaging devices with low weighted observations (imaging devices 70b and 70d) and one imaging device with a high weighted observation (imaging device 70c). The observations from imaging devices 70b and 70d are averaged resulting in a triangulated point between the two observations and along the observation from imaging device 70c. In this case the triangulated location uses both low weighted observations to better locate the target.

Figure 25:
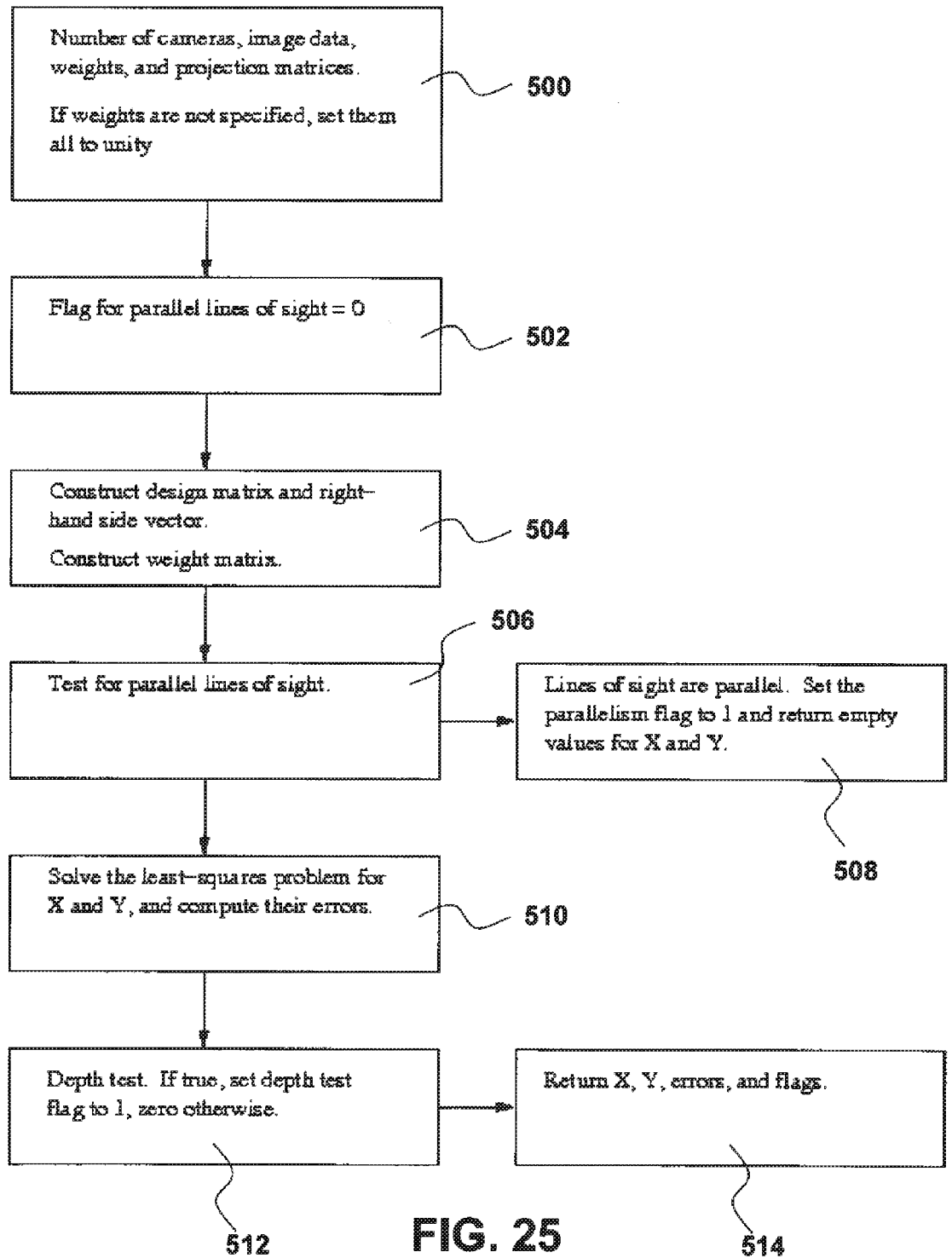
FIG. 25 is a flowchart showing steps performed during triangulation of real and phantom targets.

FIG. 25 shows the steps performed during triangulation of real and phantom targets. During triangulation, the number N of imaging devices being used to triangulate the (x,y) coordinates of a target, a vector x of length N containing image frame x-positions from each imaging device, a 2N×3 matrix Q containing the projection matrices P for each imaging device expressed as $Q=[P_1|P_2|\ldots|P_N]^T$, where the superscript "T" represents a matrix transpose, and a vector w of length N containing the weights assigned to each observation in vector x are used (step 500). If weights for observations are not specified, the weights are set to a value of one (1). A binary flag for each parallel line of sight is then set to zero (0) (step 502). A tolerance for the parallel lines of sight is set to $2\epsilon$, where $\epsilon$ is the difference between one (1) and the smallest exactly representable number greater than one (1). This tolerance gives an upper bound on the relative error due to rounding of floating point numbers and is hardware dependent. A least-squares design matrix A(N×2) and right-hand side vector b are constructed by looping over the N available imaging device views (step 504). During this process, a 2×3 projection matrix P is extracted for the current image frame. A row is added to the design matrix A containing $[P_{11}-x \cdot P_{21}, P_{12}-x \cdot P_{22}]$. An element is added to side vector b containing $[x \cdot P_{23}-P_{10}]$. An N×N diagonal matrix W containing the weights of vector w is then created. The determinant (typically constructed using the method outlined in http://mathwold.wolfram.com/determinant.html) of the weighted normal equations is computed and a check is made to determine whether or not it is less than the tolerance for parallelism according to $\det (W \cdot A)^T \cdot (W \cdot A)) \le 2 \cdot \epsilon$ (step 506). This test determines whether matrix A has linearly dependent rows. If the determinant is less than the tolerance, the parallelism flag is set to one (1) and the (x, y) coordinates are set to empty matrices (step 508). Otherwise, the linear least-squares problem for the (x, y) coordinates are solved according to $(W A)^T (W A) X = (W A)^T b$ (step 510), where $X=[X,Y]^T$ and b is also a two-element vector. The errors $\sigma_x$ and $\sigma_y$ for the (x, y) coordinates are computed from the square roots of the diagonal elements Cii of the covariance matrix C defined by $C=\sigma^2 \cdot$ $((W \cdot A)^T \cdot (W \cdot A))^{-1}$, where $\sigma_1$ is the RMS error of the fit (i.e. the square root of chi-squared).

If N=2, no errors are computed as the problem is exactly determined. A check is then made to determine if the triangulated point is behind any of the imaging devices (step 512). Using the triangulated position, the expected target position for each imaging device is computed according to $x_{cal}=P \cdot X$, where x contains the image position x and the depth $\lambda$. The second element of $x_{cal}$ is the depth $\lambda$ from the imaging device to the triangulated point. If $\lambda=0$, the depth test flag is set to one (1) and zero (0) otherwise. If all components of $x_{cal}$ are negative, the double negative case is ignored. The computed (x, y) coordinates, error values and test flags are then returned (step 514).

Figure 26:
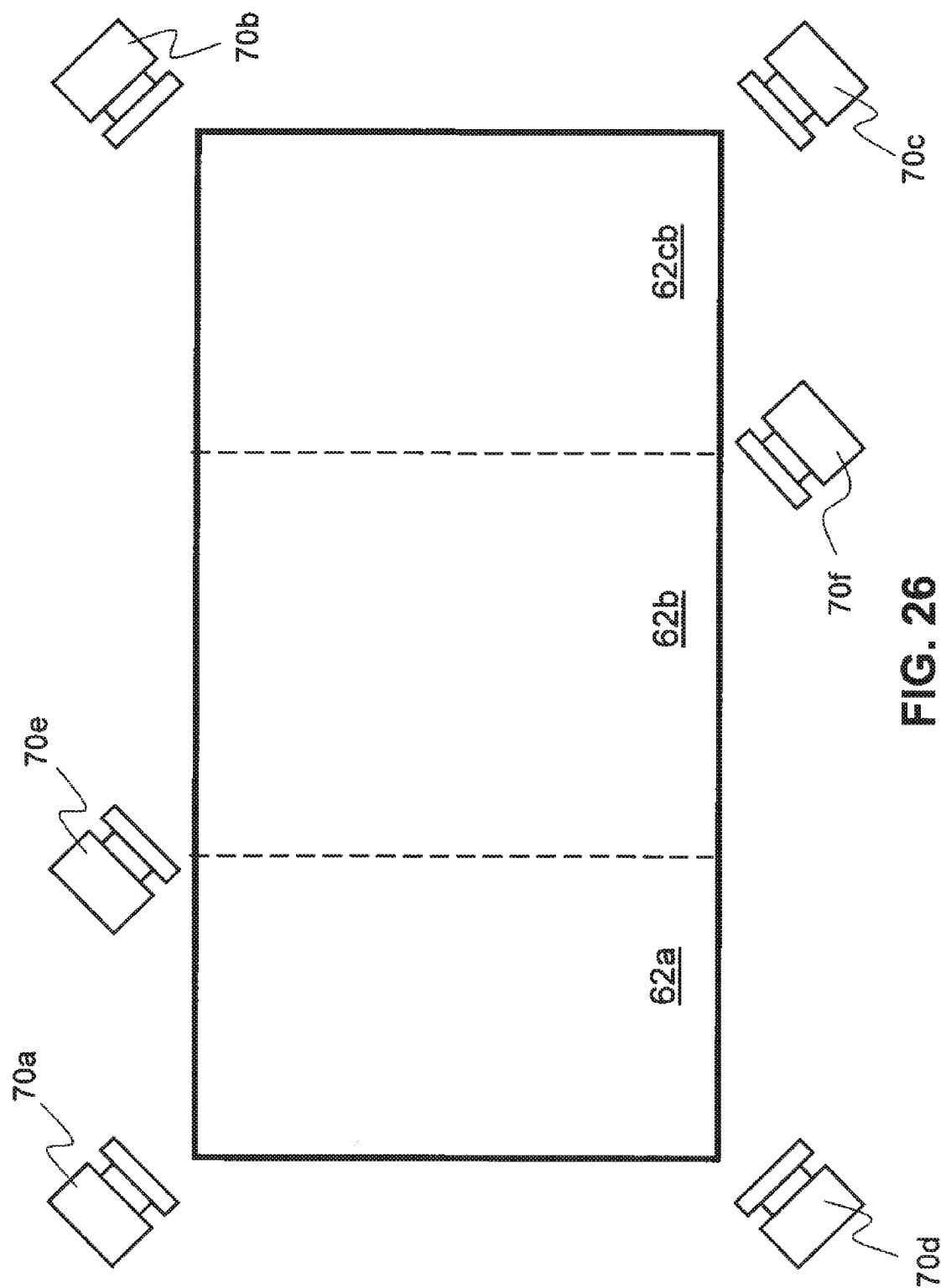
FIGS. 26 to 34 show alternative imaging device configurations for the interactive input system of FIG. 1.

In the embodiment shown and described above, the interactive input system comprises six (6) imaging devices arranged about the input area 62 with four (4) imaging devices being positioned adjacent the corners of the input area and two imaging devices 70e and 70f being positioned at spaced locations along the same side of the input area. Those of skill in the art will appreciate that the configuration and/or number of imaging devices employed in the interactive input system may vary to suit the particular environment in which the interactive input system is to be employed. For example, the imaging devices 70e and 70f do not need to be positioned along the same side of the input area. Rather, as shown in FIG. 26, imaging device 70e can be positioned along one side of the input area 62 and imaging device 70f can be positioned along the opposite side of the input area 62.

Figure 27:
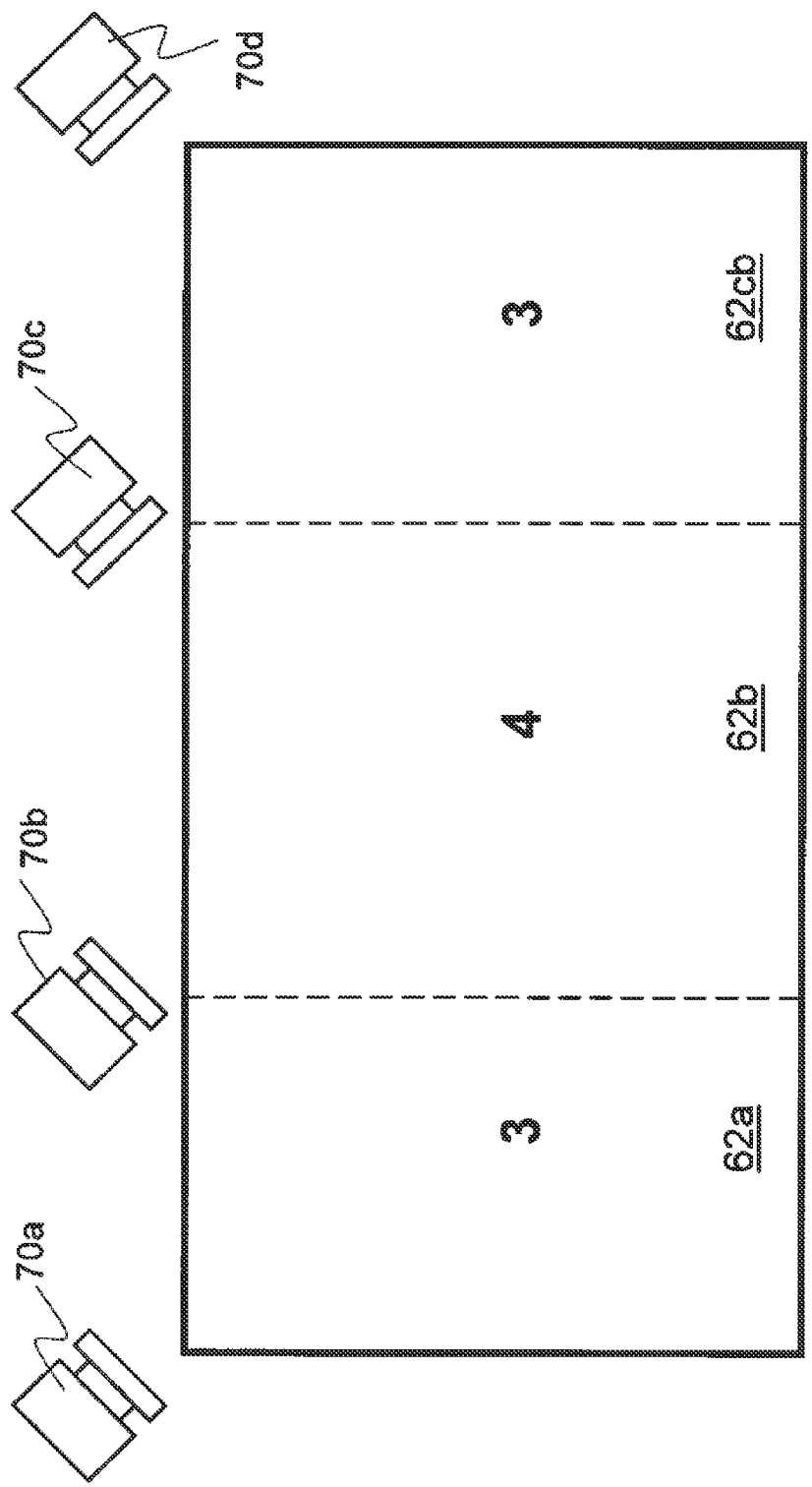

Turning now to FIG. 27, an alternative imaging device configuration for the interactive input system is shown. In this configuration, the interactive input system employs four (4) imaging devices 70a, 70e, 70f, and 70b arranged along one side of the input area 62. Imaging devices 70a, 70b are positioned adjacent opposite corners of the input area 62 and look generally across the entire input area 62. The intermediate imaging devices 70e, 70f are angled in opposite directions towards the center of the input area 62 so that the imaging devices 70a, 70e, 70f and 70b look generally across two-thirds of input area 62. This arrangement of imaging devices divides the input area 62 into three input regions, namely a left input region 62a, a central input region 62b and a right input region 62c as shown. The left input region 62a is within the fields of view of three (3) imaging devices, namely imaging devices 70a, 70e, and 70b. The right input region 62c is also within the fields of view of three (3) imaging devices, namely imaging devices 70a, 70f, and 70b. The central input region 62b is within the fields of view of all four (4) imaging devices 70a, 70e, 70f and 70b.

Figure 28:
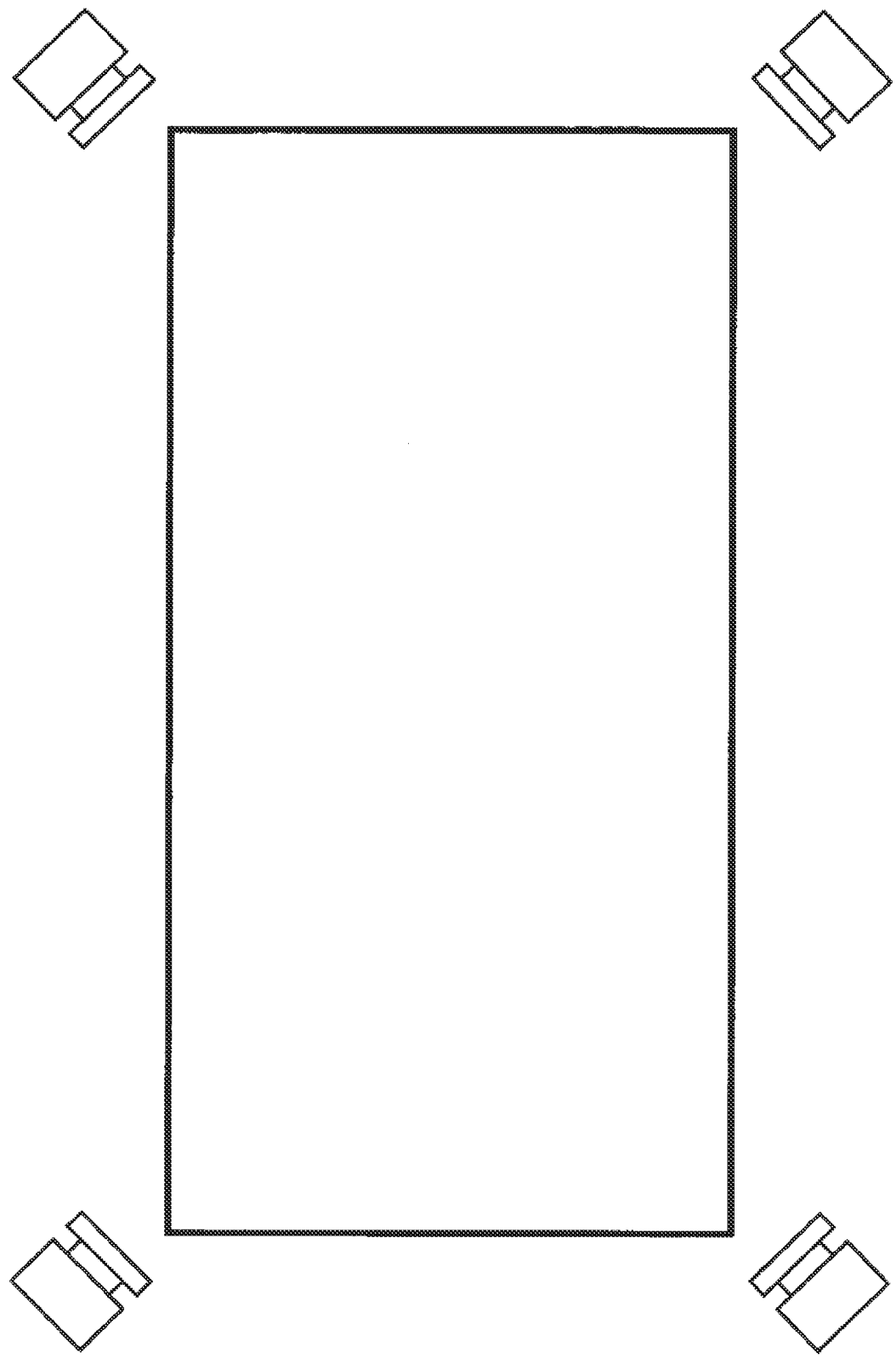

FIG. 28 shows another alternative imaging device configuration for the interactive input system. In this configuration, the interactive input system employs four (4) imaging devices 70a, 70b, 70c, 70d with each imaging device being positioned adjacent a different corner of the input area 62 and looking generally across the entire input area 62. With this imaging device arrangement, the entire input area 62 is within the fields of view of all four imaging devices.

Figure 29:
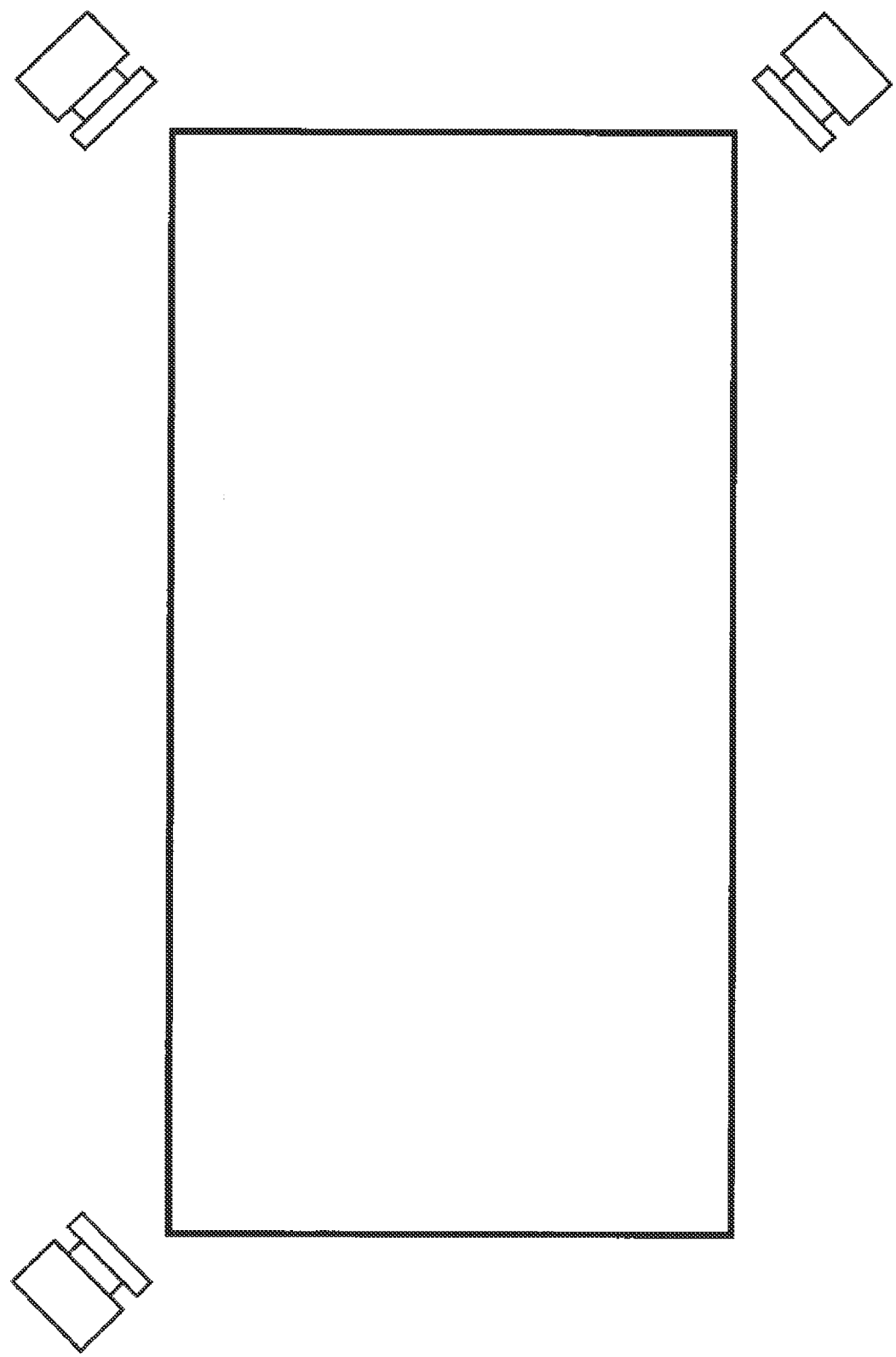

FIG. 29 shows yet another alternative imaging device configuration for the interactive input system. In this configuration, the interactive input system employs three (3) imaging devices 70a, 70b, 70c with each imaging device being positioned adjacent a different corner of the input area 62 and looking generally across the entire input area 62. With this imaging device arrangement, the entire input area is within the fields of view of all three imaging devices.

Figure 30:
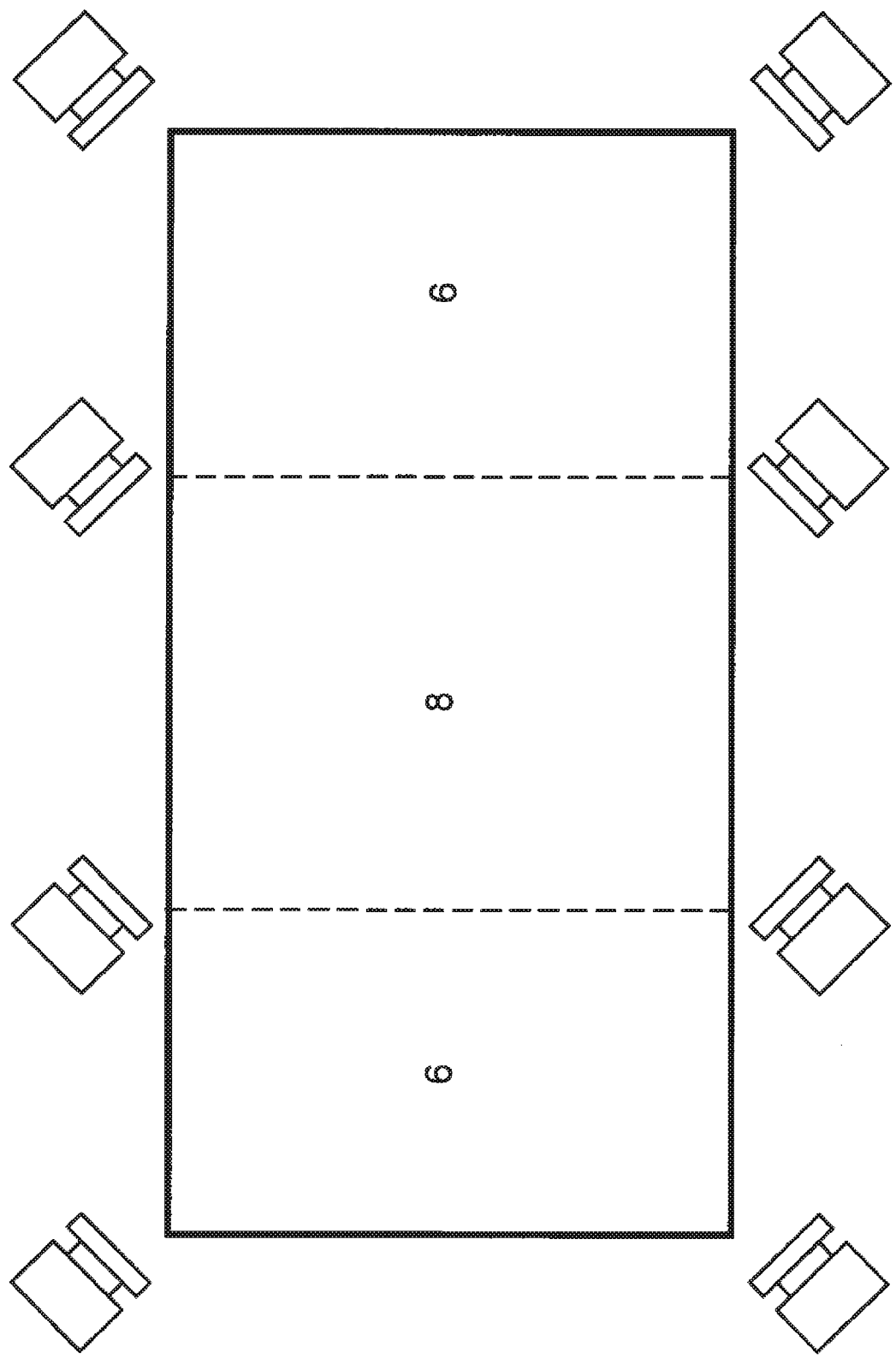

In FIG. 30, yet another alternative imaging device configuration for the interactive input system is shown. In this configuration, the interactive input system employs eight (8) imaging devices, with four imaging devices 70a, 70e, 70f, 70b being arranged along one major side of the input area 62 and with four imaging devices 70d, 70g, 70h, 70c being arranged along the opposite major side of the input area 62. Imaging devices 70a, 70b, 70c, 70d are positioned adjacent the corners of the input area and look generally across the entire input area 62. The intermediate imaging devices 70e, 70f, 70g, 70h along each major side of the input area are angled in opposite directions towards the center of the input area 62. This arrangement of imaging devices divides the input area into three (3) input regions. The number in each input region appearing in FIG. 30 identifies the number of imaging devices whose fields of view see the input region.

Figure 31:
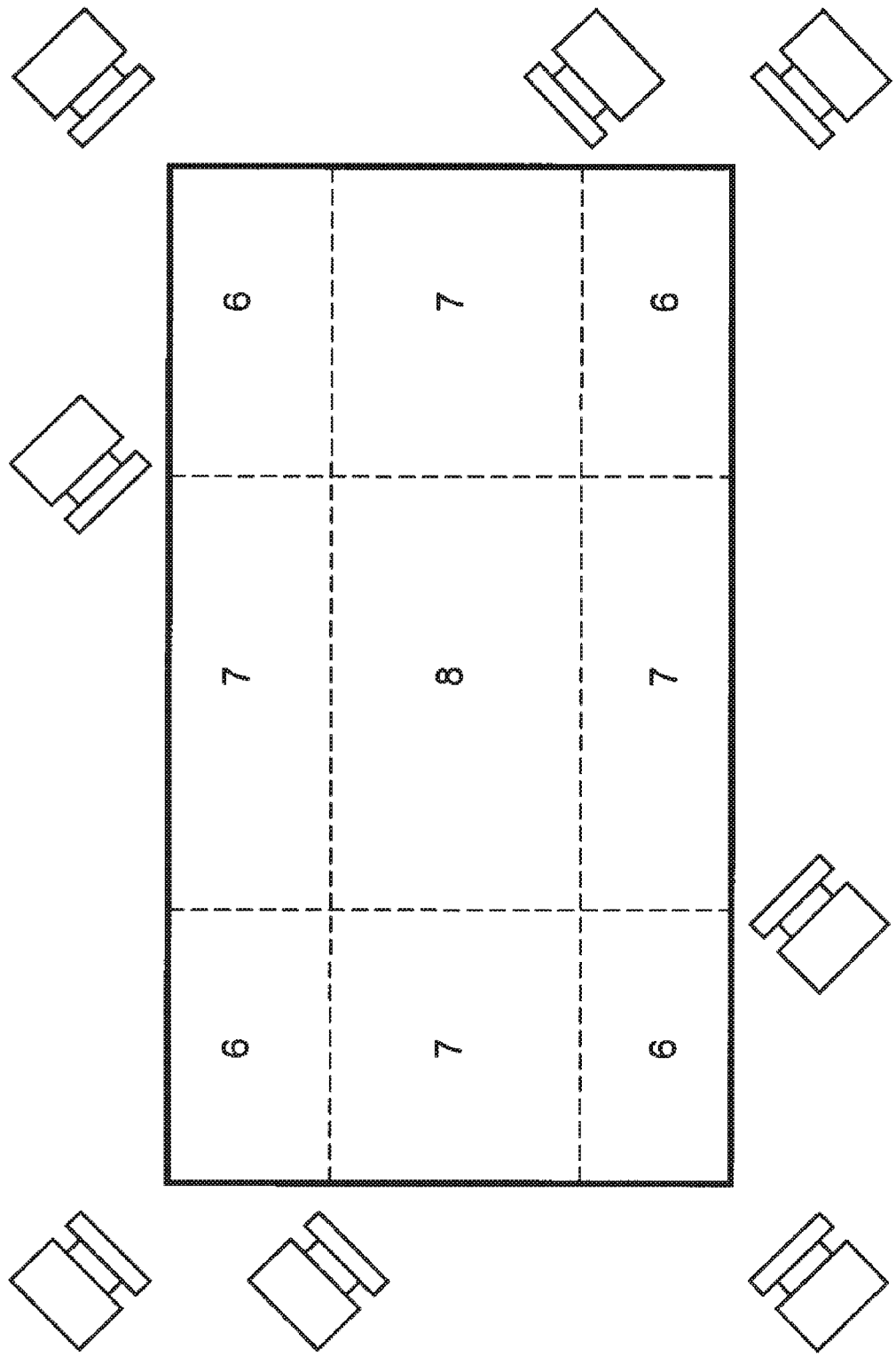

FIG. 31 shows yet another alternative imaging device configuration for the interactive input system. In this configuration, the interactive input system employs eight (8) imaging devices 70. Imaging devices 70a, 70b, 70c, 70d are positioned adjacent the corners of the input area 62 and look generally across the entire input area 62. Intermediate imaging devices 70f, 70g are positioned on opposite major sides of the input area and are angled in opposite directions towards the center of the input area 62. Intermediate imaging devices 70i, 70j are positioned on opposite minor sides of the input area 62 and are angled in opposite directions towards the center of the input area 62. This arrangement of imaging devices divides the input area into nine (9) input regions as shown. The number in each input region appearing in FIG. 31 identifies the number of imaging devices whose fields of view see the input region.

Figure 32:
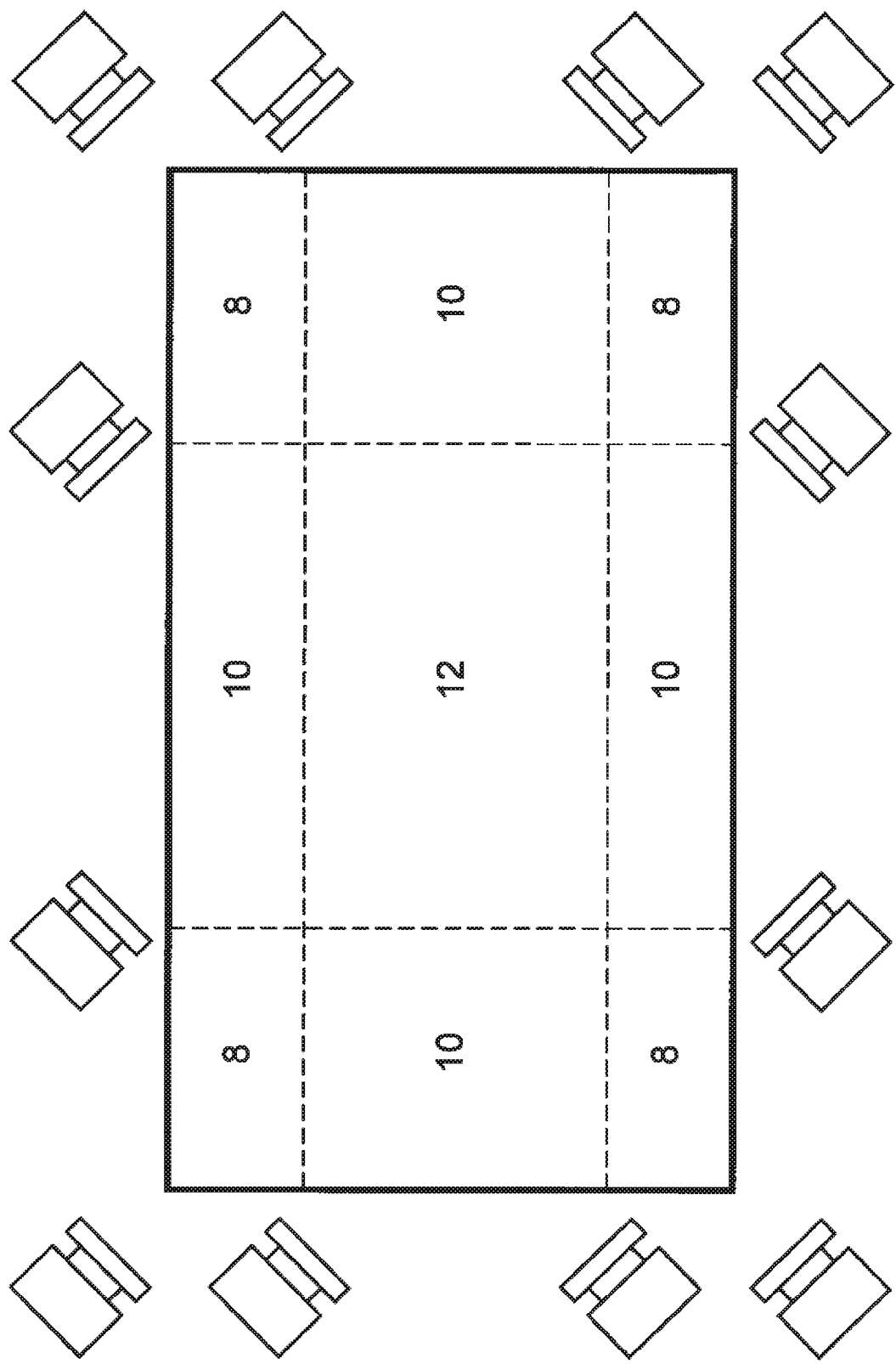

In FIG. 32, yet another alternative imaging device configuration for the interactive input system is shown. In this configuration, the interactive input system employs twelve (12) imaging devices. Imaging devices 70a, 70b, 70c, 70d are positioned adjacent the corners of the input area 62 and look generally across the entire input area 62. Pairs of intermediate imaging devices 70e and 70f, 70g and 70h, 70i and 70k, 70j and 70l are positioned along each side of the input area and are angled in opposite directions towards the center of the input area 62. This arrangement of imaging devices divides the input area 62 into nine (9) input regions as shown. The number in each input region appearing in FIG. 32 identifies the number of imaging devices whose fields of view see the input region.

Figure 33:
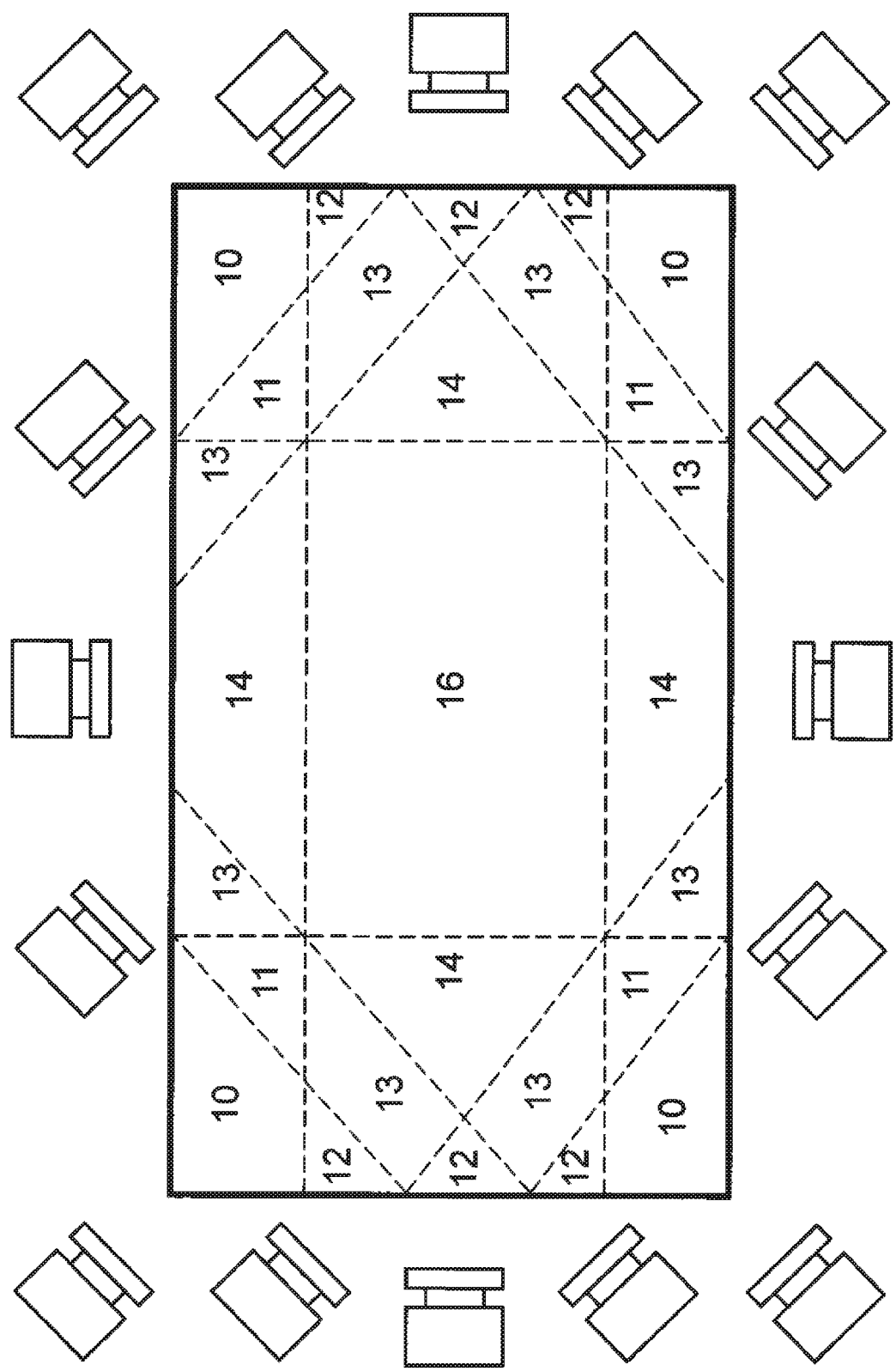

FIG. 33 shows yet another alternative imaging device configuration for the interactive input system. In this configuration, the interactive input system employs sixteen (16) imaging devices 70. Imaging devices 70a, 70b, 70c, 70d are positioned adjacent the corners of the input area and look generally across the entire input area 62. Pairs of intermediate imaging devices 70e and 70f, 70g and 70h, 70i and 70k, 70j and 70l are positioned along each side of the input area and are angled in opposite directions towards the center of the input area 62. Four midpoint imaging devices 70m, 70n, 70o, 70p are positioned at the midpoint of each side of the input area 62 and generally look across the center of the input area 62. This arrangement of imaging devices divides the input area 62 into twenty-seven (27) input regions as shown. The number in each input region appearing in FIG. 33 identifies the number of imaging devices whose fields of view see the input region.

Figure 34:
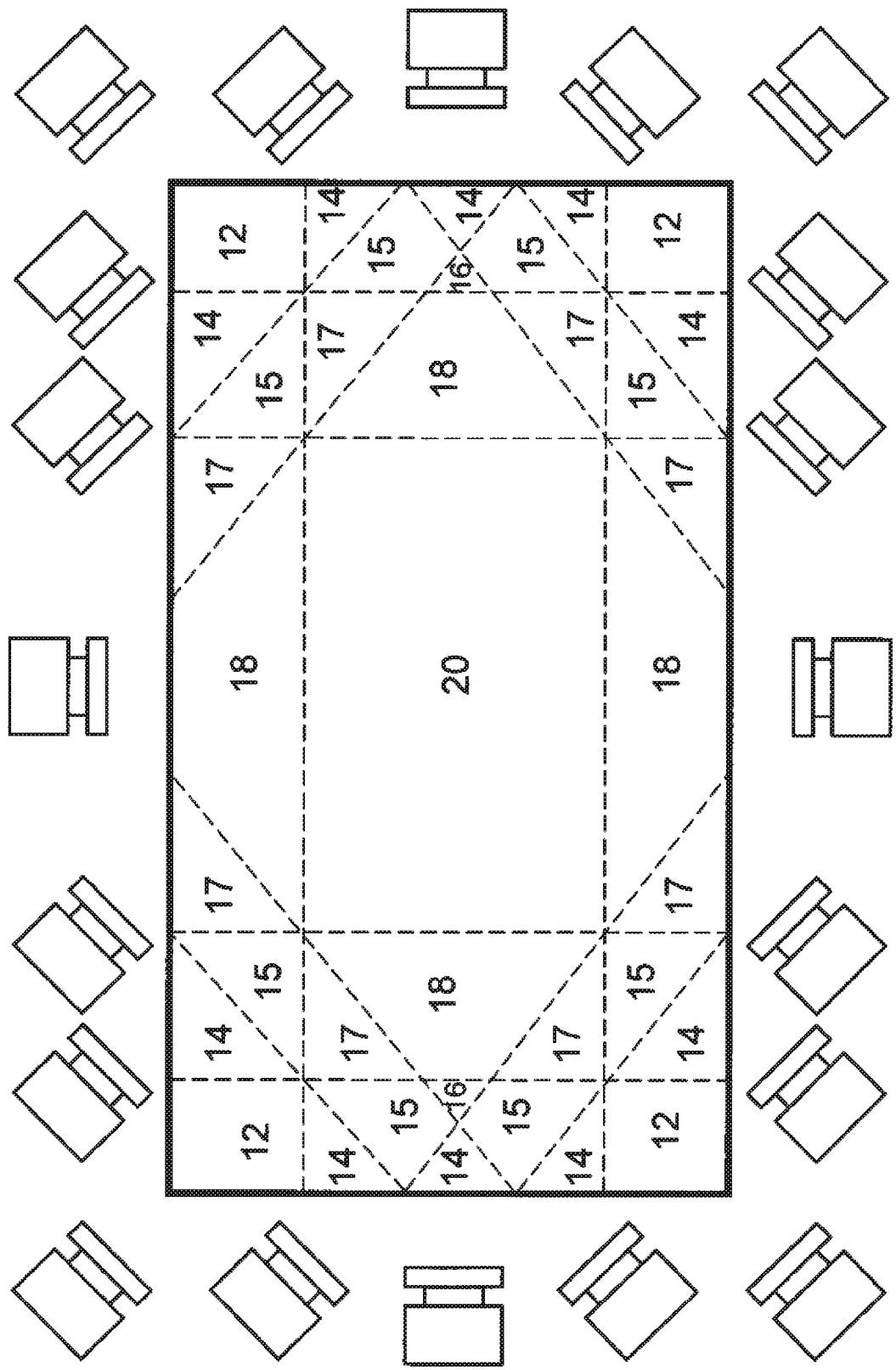

FIG. 34 shows yet another alternative imaging device configuration for the interactive input system. In this configuration, the interactive input system employs twenty (20) imaging devices 70. Imaging devices 70a, 70b, 70c, 70d are positioned adjacent the corners of the input area and look generally across the entire input area 62. Pairs of intermediate imaging devices 70e and 70f, 70g and 70h, 70i and 70k, 70j and 70l are positioned along each side of the input area and are angled in opposite directions towards the center of the input area 62. Two further intermediate imaging devices 70q, 70r, 70s, 70t are positioned along each major side of the input area 62 and are angled in opposite directions towards the center of the input area 62. Four midpoint imaging devices 70m, 70n, 70o, 70p are positioned at the midpoint of each side of the input area 62 and generally look across the center of the input area 62. This arrangement of imaging devices divides the input area into thirty-seven (37) input regions as shown. The number in each input region appearing in FIG. 34 identifies the number of imaging devices whose fields of view see the input region.

Figure 35:
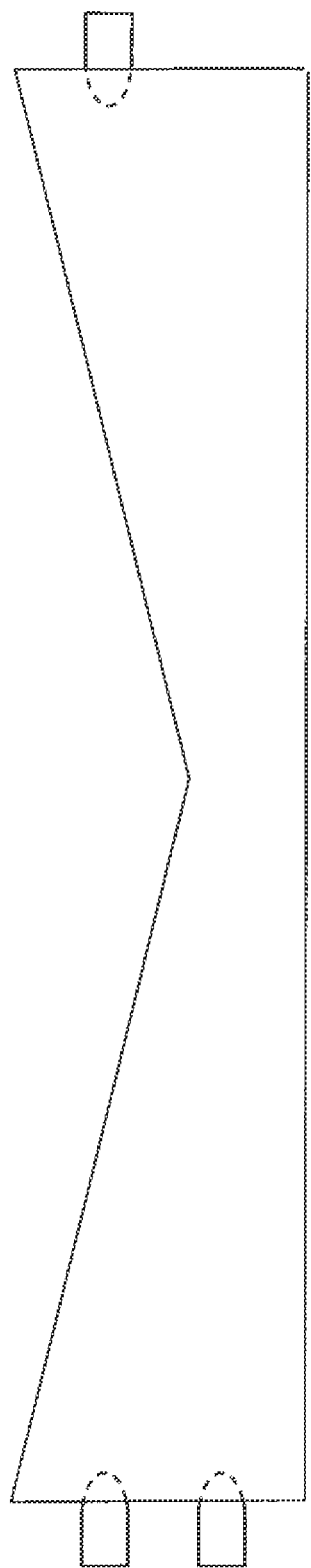
Figure 36:
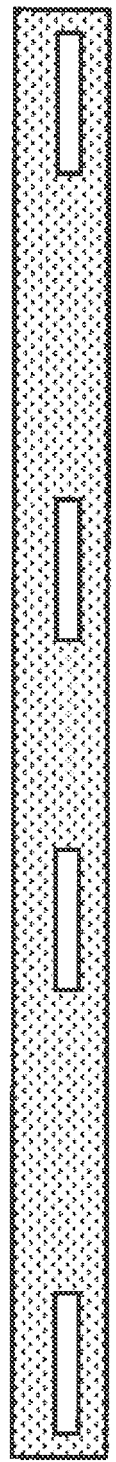

Although particular embodiments of the bezel segments have been described above, those of skill in the art will appreciate that many alternatives are available. For example, more or fewer IR LEDs may be provided in one or more of the bezel surfaces. For example, FIG. 35 shows an embodiment of the bezel segment generally identified by numeral 600 where one side surface accommodates a pair of IR LEDs 222a, 222b and the opposite side surface accommodates a single IR LED 222c. If desired, rather than providing notches in the undersurface of the bezel segments, recesses 602 may be provided in the body of the bezel segments to accommodate the imaging devices as shown in FIG. 36. Of course a combination of notches and recesses may be employed.

Figure 37:
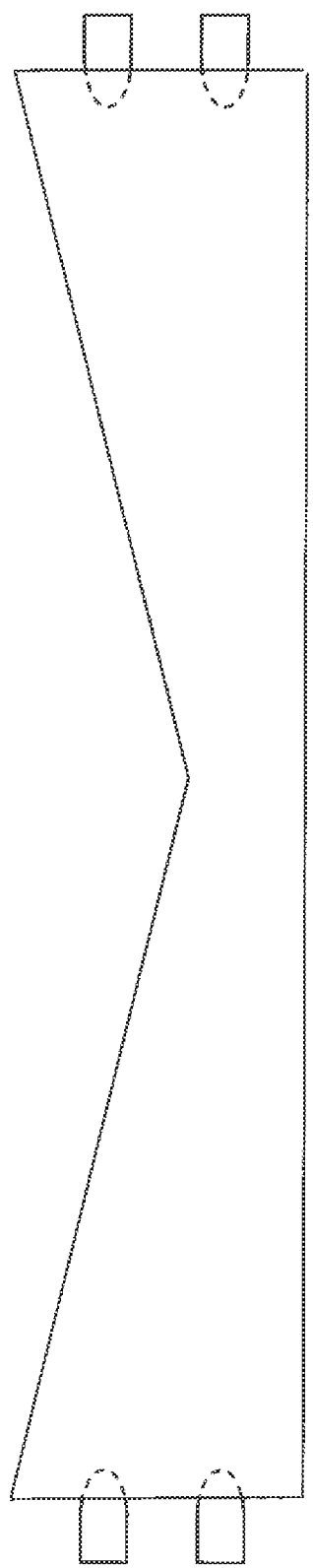
Figure 39:
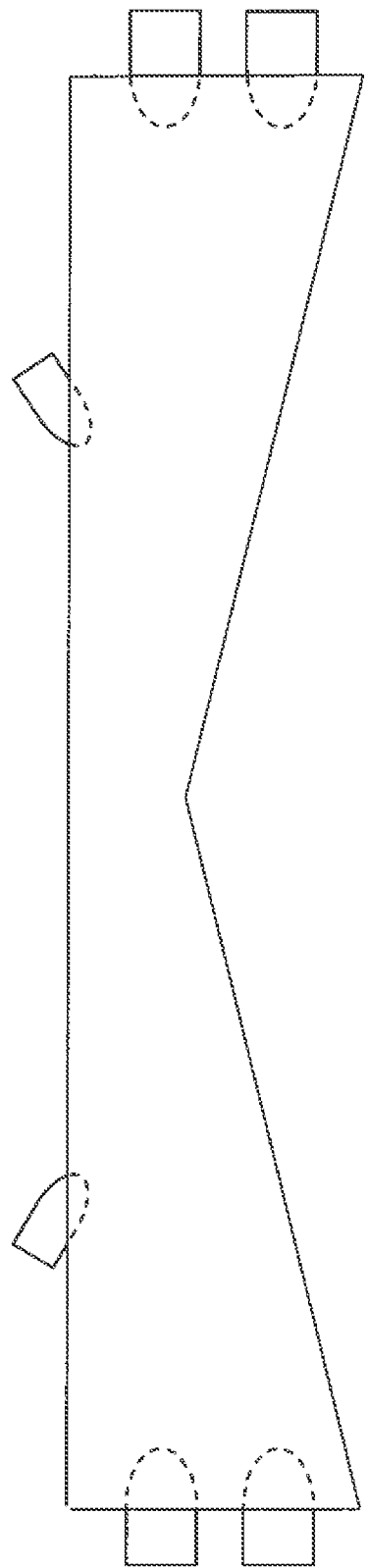
Figure 38:
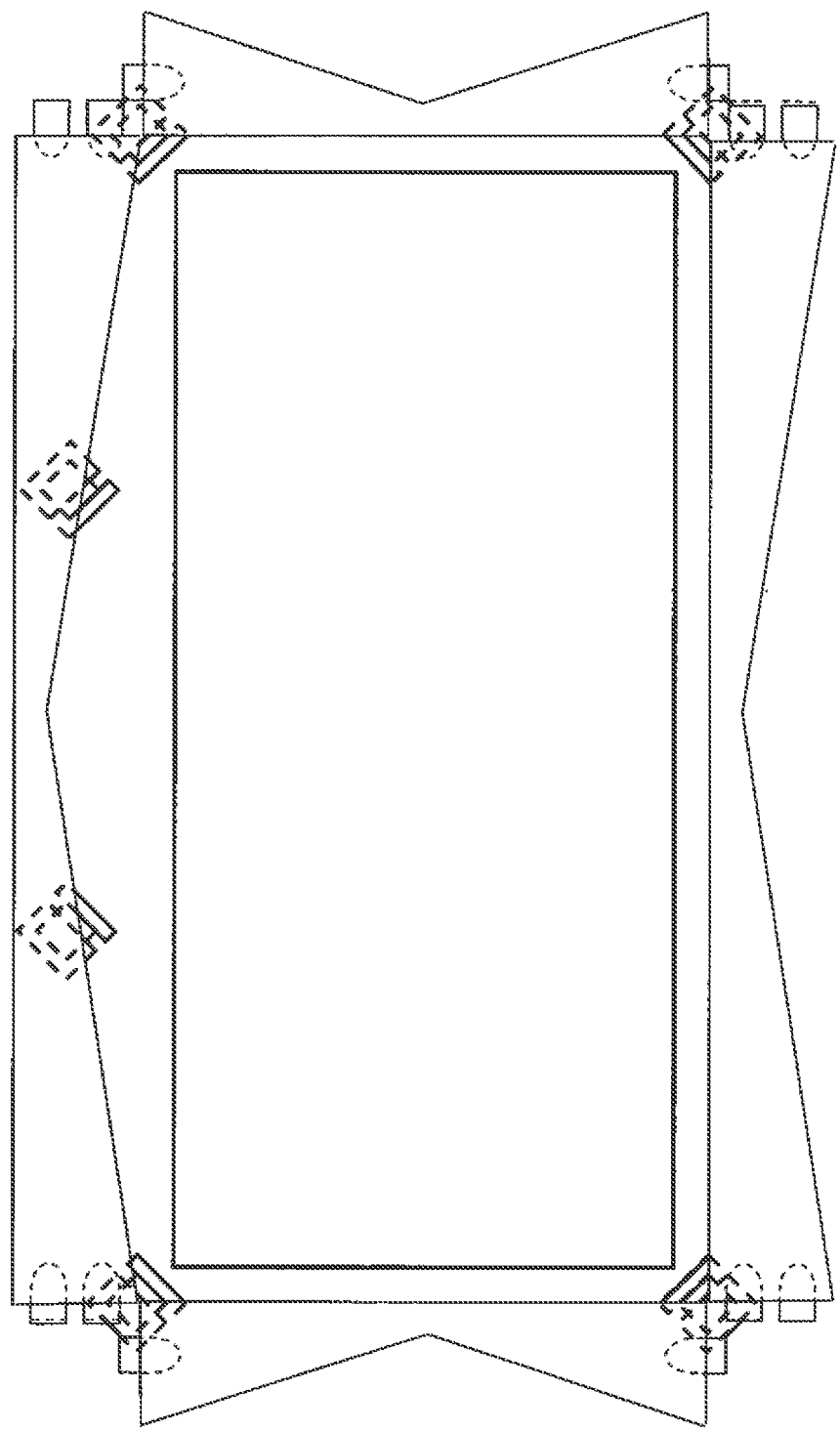

In the above embodiments, each bezel segment has a planar front surface and a v-shaped back reflective surface. If desired, the configuration of one or more of the bezel segments can be reversed as shown in FIG. 37 so that the bezel segment 700 comprises a planar reflective back surface 204 and a v-shaped front surface 702. Optionally, the v-shaped front surface could be diffusive. Alternatively, the v-shaped back surface could be diffusive and the planar front surface could be transparent. In a further alternative embodiment, instead of using a v-shaped back reflective surface, the bezel segments 800 may employ a parabolic-shaped back reflective surface 802 as shown in FIG. 40 or other suitably shaped back reflective surface. FIG. 38 shows the interactive input system employing an illuminated bezel formed of a combination of bezel segments. In particular, bezel segment 700 is of the type shown in FIG. 37 while bezel segments 200b to 200d are of the type shown in FIGS. 1 to 6. If desired, supplementary IR LEDs 222a, 222b may be accommodated by bores formed in the planar reflective back surface as shown in FIG. 39. In this case, the supplementary IR LEDs 222a, 222b are angled towards the center of the bezel segment.

Although embodiments of bezel segment front surface diffusion patterns are shown and described, other diffusion patterns can be employed by applying lenses, a film, paint, paper or other material to the front surface of the bezel segments to achieve the desired result. Also, rather than including notches to accommodate the imaging devices, the bezel segments may include slots or other suitably shaped formations to accommodate the imaging devices.

Figure 42:
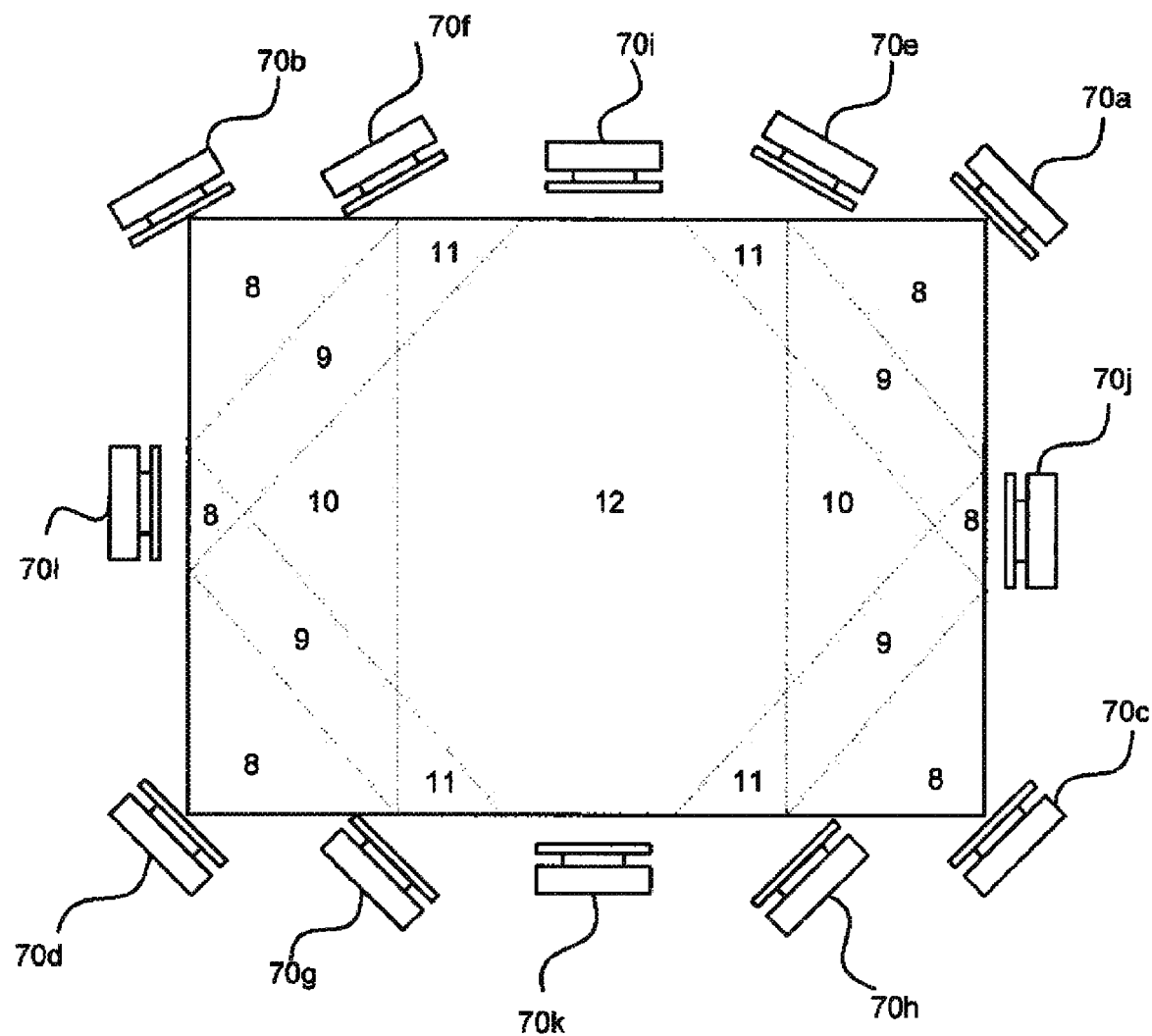
FIG. 42 shows another alternative imaging device configuration for the interactive input system of FIG. 1.

FIG. 42 shows yet another alternative imaging device configuration for the interactive input system. In this configuration, the interactive input system employs twelve (12) imaging devices. Imaging devices 70a, 70b, 70c, 70d are positioned adjacent the corners of the input area and look generally across the entire input area. Pairs of intermediate imaging devices 70e and 70f, 70g and 70h are positioned along opposite sides of the input area and are angled in opposite directions towards the center of the input area 62. Four midpoint imaging devices 70i, 70j, 70k, 70l are positioned at the midpoint of each side of the input area 62 and generally look across the center of the input area 62. This arrangement of imaging devices divides the input area into seventeen (17) input regions as shown. The number in each input region appearing in FIG. 42 identifies the number of imaging devices whose fields of view see the input region.

As will be appreciated, when the interactive input system employs an imaging device configuration that employs a significant number of imaging devices, such as the imaging device configurations shown in FIGS. 30 to 34 and 42, the number of different pointers or targets brought into proximity with the area input that can be readily and accurately tracked increases.

As described above, interactive input system 50 is able to detect and track individually, multiple different pointers or targets brought into proximity with the input area. It will however be appreciated that the interactive input system 50 is also able to detect and identify one or more input objects, tools or targets etc. brought into proximity with the input area that have multiple projections, extensions, protrusions, bumps, pins etc. thereon. As will be appreciated, when such an input object is brought into proximaty with the input area and is moved across the input area 62, the relative position of each projection with respect to the other projections remains fixed. For example, an input object such as those shown in FIG. 44 having a number of pins (hereinafter referred to as a "pin set") connected thereto, that is brought into proximity with the input area 62 can be identified by the interactive input system 50. The resulting input can then be treated differently than finger or pen tool input and used by the interactive input system 50 to perform a specific function.

Figure 43:
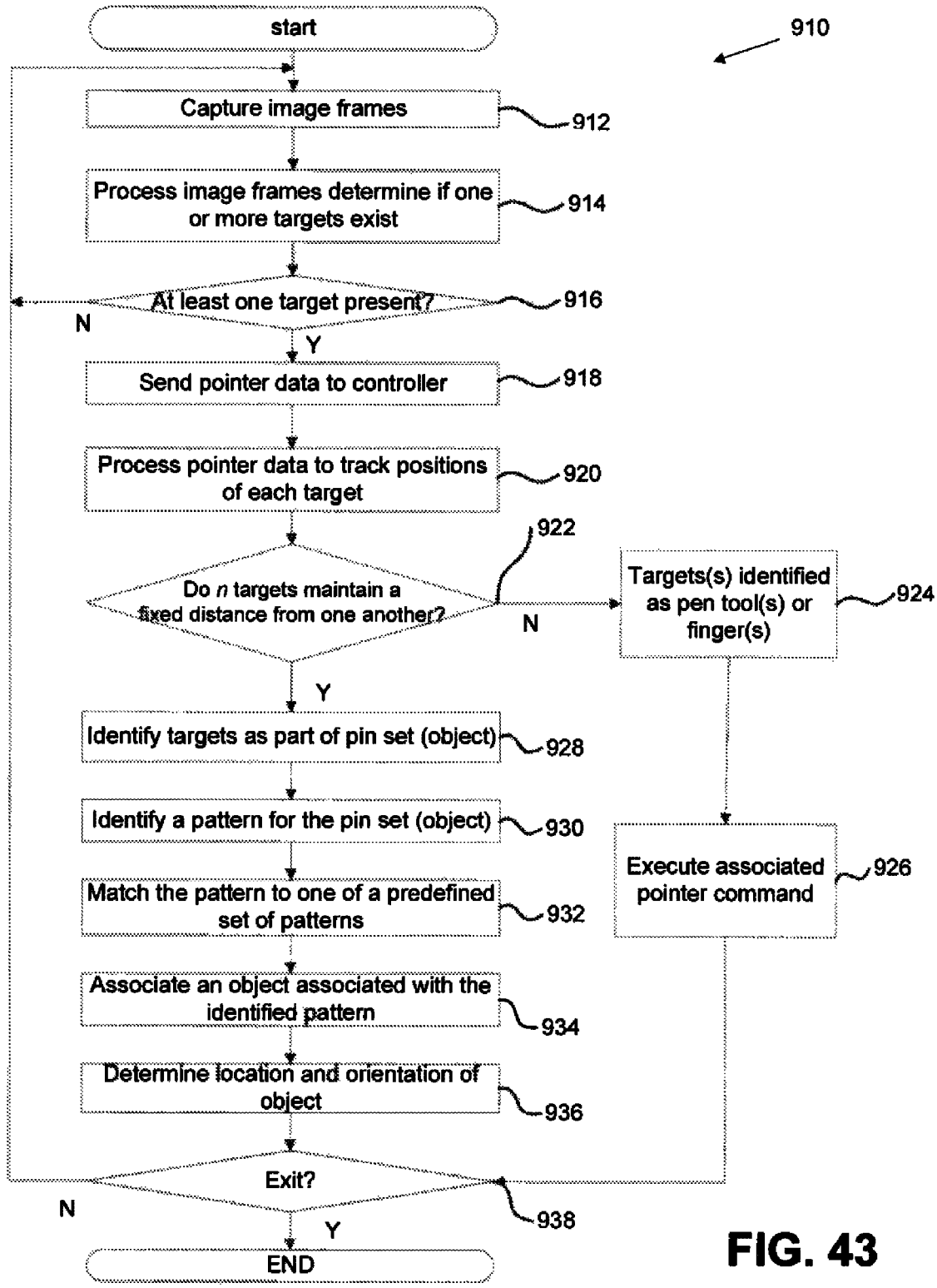
FIG. 43 is flowchart showing steps performing during a method of identifying one or more objects.

Turning to FIG. 43, steps of a method 910 for identifying one or more such input objects is shown and is generally identified by reference numeral 910. As described previously, when the imaging devices capture image frames of the input area 62 (step 912), for each imaging device, image data acquired by its image sensor 100 is processed by the DSP 106 to determine if one or more targets (e.g. pointers) is/are believed to exist in each captured image frame (step 914). If no targets are believed to exist in any of the captured image frames, the method returns to step 912. When one or more targets is/are determined to exist in a captured image frame, pointer characteristic data is derived from that captured image frame and communicated to the master controller 120 (step 918).

The master controller 120 processes the pointer characteristic data received from each imaging device to track the position of the one or more targets, as described above with reference to FIGS. 13 to 15 (step 920). The master controller 120 then checks to determine if n targets maintain a fixed distance from one another, wherein n is an integer, which in this embodiment is set to a value of six (6) (step 922). If n targets do not maintain fixed distances from one another, the targets are identified as one or more pen tools or fingers (step 924) and the associated pointer command(s) is/are executed (step 926).

If the n targets maintain fixed distances from one another, the targets are identified as being associated with an input object and thus, part of a pin set (step 928). The position of each target (pin) with respect to the input area 62 is determined using the pointer characteristic data, in the manner as described above. In the event target (pin) occlusion occurs, that is, if a target (pin) in the field of view of an imaging device occludes another target (pin) within the field of view of the imaging device, the target (pin) occlusion is resolved in the manner as described above.

Using the position of each target (pin), the pattern(s) of the targets (pins) is/are identified using known pattern identification techniques (step 930) and matched with at least one of a set of predefined patterns (step 932). An input object associated with each identified pattern is then identified (step 932). The location and orientation of each identified input object with respect to the input area 62 is then calculated (step 932). A check is performed to determine if an exit condition has been received (step 936). If an exit condition has not been received, the method returns to step 912. If an exit condition has been received, the method ends. The location and orientation of each input object with respect to the input area 62 is then reported to the computing device 140. The computing device 140 in turn records the location and orientation of each input object and injects the location and orientation of each input object into the active application program being run by the computing device 140 so that the function associated with each identified input object can be performed. As mentioned above, the computing device 140 also updates the image data conveyed to the LCD panel 60, if required, so that the image presented on the display surface of the LCD panel 60 reflects input object activity.

Figure 44:
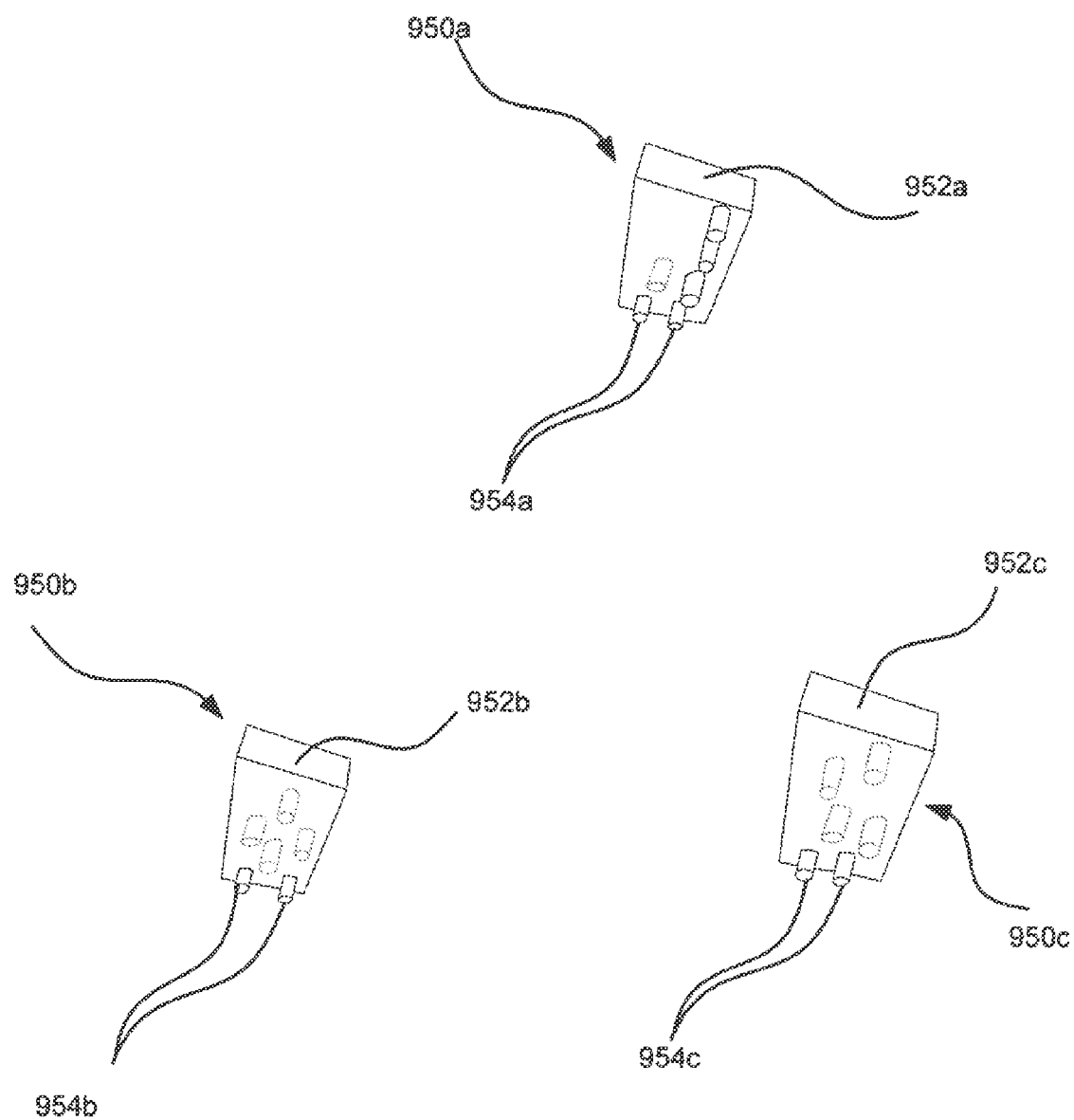
FIG. 44 is a perspective view of objects used to interact with the interactive input system of FIG. 1.

An example of using method 910 to identify three input objects 950a, 950b and 950c brought into proximity with the input area 62 will now be described. As shown in FIG. 44, input object 950a comprises a body 952a and a pin set 954a having six (6) associated pins arranged in a distinct pattern, extending from body 952a. Similarly, input objects 950b and 950c comprise bodies 952b and 952c and pin sets 954b and 954c, each comprising six (6) associated pins arranged in distinct patterns and extending from its respective body.

Bodies 952a, 952b and 952c are generally rectangular in shape, however those skilled in the art will appreciate that bodies 952a to 952c may be any suitable shape such as for example a circle, a square, a star etc. The configuration of the input objects is selected so that a user can easily identify the input objects 950a, 950b and 950c on the basis of physical characteristics of the bodies 952a, 952b and 952c such as for example shape, color, size, etc. without having to know the particular distinct pattern of the pin sets 954a, 954b and 954c.

The pins associated with pin sets 954a, 954b and 954c are arranged in distinct patterns such that they are distinguishable from one another in any orientation when captured in image frames by the imaging devices. The pins associated with pin sets 954a, 954b and 954c are also arranged to provide stability for the objects 950a, 950b and 950c such that the objects do not tip over when placed on the display surface of the display panel 60. Pin sets 954a, 954b and 954c contact the display surface of the display panel 60 when the input objects 950a, 950b and 950c are placed thereon. The pins associated with pin sets 954a, 954b and 954c are dimensioned to position the bodies 952a, 952b and 952c outside of the fields of view of the imaging devices when the pins are brought into proximity with the input area 62 such that bodies 952a, 952b and 952c do not appear in the image frames captured by the imaging devices. In this embodiment, the height of each of the pins associated with pin sets 954a, 954b and 954c is 5 mm. The width of each of the pins associated with pin sets 954a, 954b and 954c is dimensioned such that the pins are readily distinguishable from a pen tool or finger. As will be appreciated, unlike a group of fingers that can move independently of one another, the orientation and distance between the pins associated with pin sets 954a, 954b and 954c remain constant.

Figure 45:
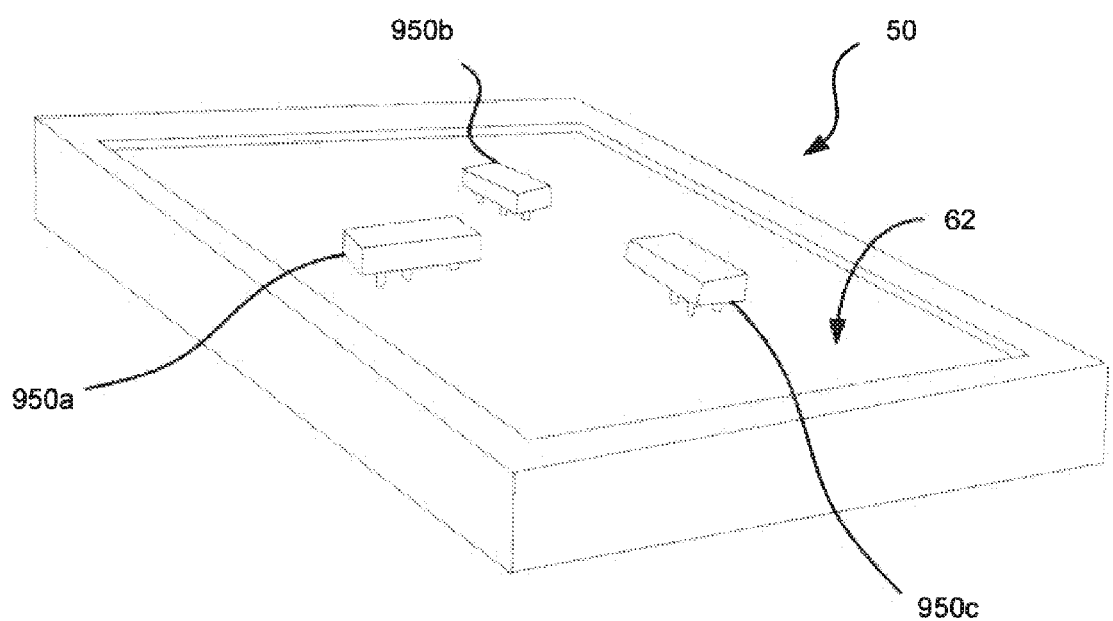
FIG. 45 is a perspective view showing three input objects brought into proximity with the input area of the interactive input system of FIG. 1.

During the method 910, when the input objects 950a, 950b and 950c are brought into proximity with the input area 62 (as shown in FIG. 45) such that pin sets 954a, 954b and 954c are within the fields of view of the imaging devices and when the imaging devices capture image frames of the input area 62

(step 912), for each imaging device, image data acquired by its image sensor 100 is processed by the DSP 106 to determine if one or more targets (e.g. pointers) is/are believed to exist in each captured image frame (step 914). As will be appreciated, in this case the pin sets 954a, 954b and 954c associated with objects 950a, 950b and 950c are determined to exist in the captured image frames (step 916), and thus pointer characteristic data is sent to the master controller 120 (step 918). The pointer characteristic data is processed to track the position of each of the pins associated with pin sets 954a, 954b and 954c (step 920). A check is then performed to determine if the identified pins maintain fixed distances from one another (step 922). In this example, since six identified pins maintain fixed distances from one another in three instances (pin set 954a, 954b and 954c), each one of the pins is identified as being part of a pin set (step 930).

Figure 46:
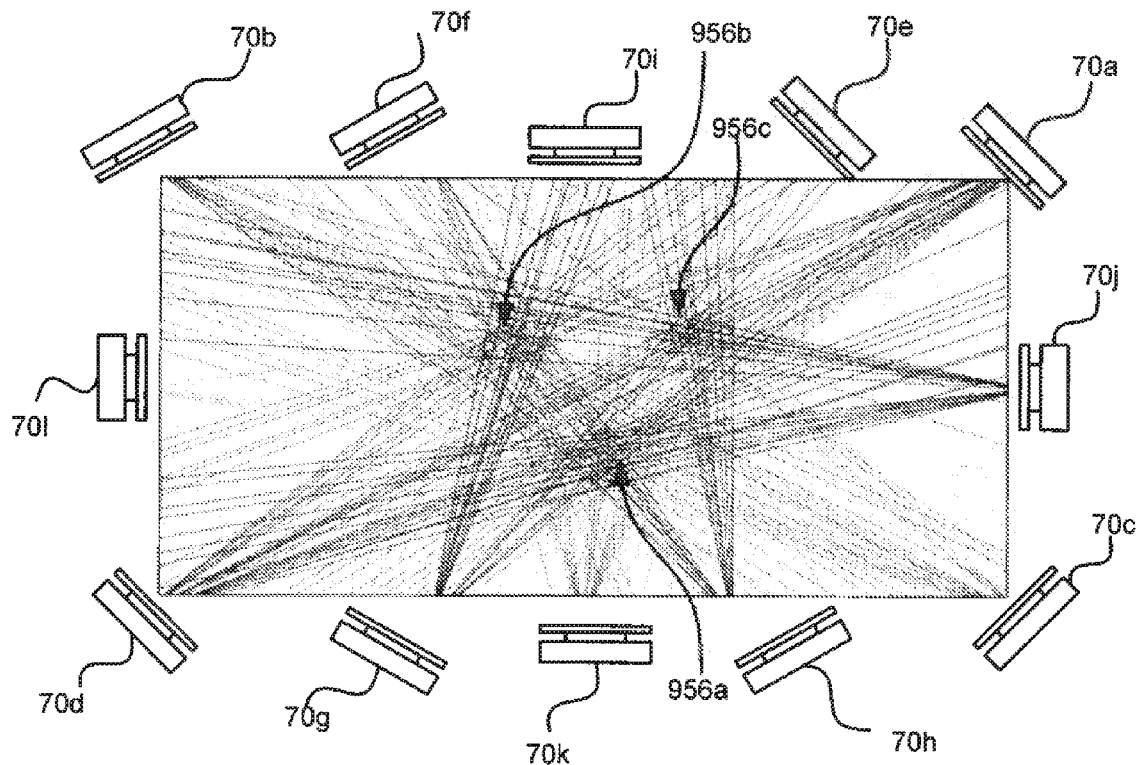
FIG. 46 depicts observation lines from imaging devices to pins associated with each of the input objects in proximity with the input area.

The position of each pin with respect to the input area 62 is determined using the pointer characteristic data. An example is shown in FIG. 46. As can be seen, each imaging device has a line of sight corresponding to the approximate location of each pin associated with pin sets 954a to 954c. In the event pin occlusion occurs, that is, if a pin in the field of view of an imaging device occludes another pin within the field of view of the imaging device, the pin occlusion is resolved in the manner as described above.

Figure 47:
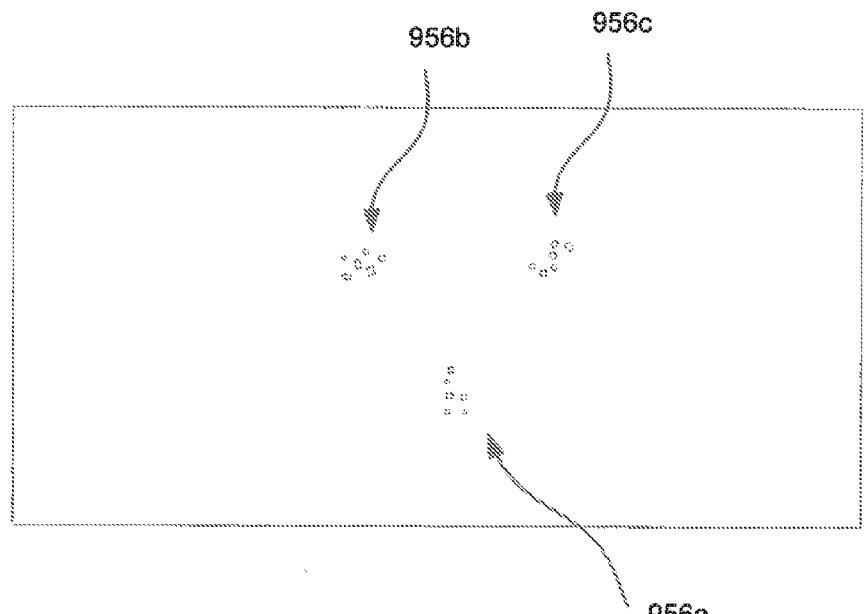
FIG. 47 depicts identified patterns of pin sets.
Figure 48:
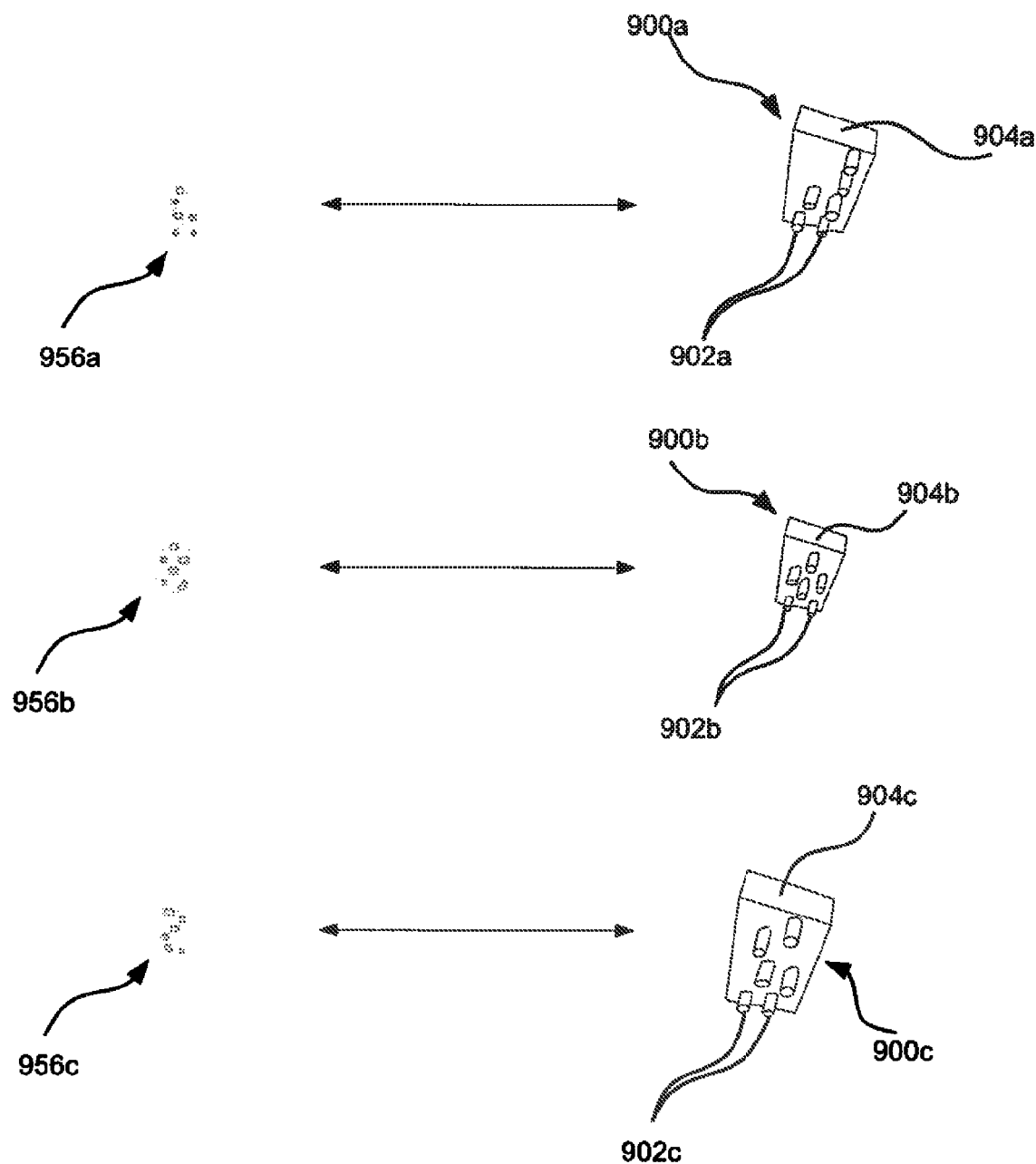
FIG. 48 depicts an association between the identified pin sets of FIG. 47 and the input objects in proximity with the input area.

The patterns of the pin sets are identified as patterns 956a, 956b and 956c, shown best in FIG. 47 (step 930), and compared with a set of predefined patterns (step 932). An input object associated with each of patterns 956a, 956b and 956c is identified using a lookup table, which is shown illustratively in FIG. 48 (step 934). The location and orientation of each input object with respect to the input area 62 is then calculated (step 936). It is assumed that an exit condition is received (step 938), and thus the method ends. The location and orientation of each input object with respect to the input area 62 is then reported to the computing device 140, which in turn records the location and orientation of each object and injects the location and orientation of each object into the active application program being run by the computing device 140. As mentioned above, the computing device 140 also updates the image data conveyed to the LCD panel 60, if required, so that the image presented on the display surface of the LCD panel 60 reflects input object activity.

Figure 49:
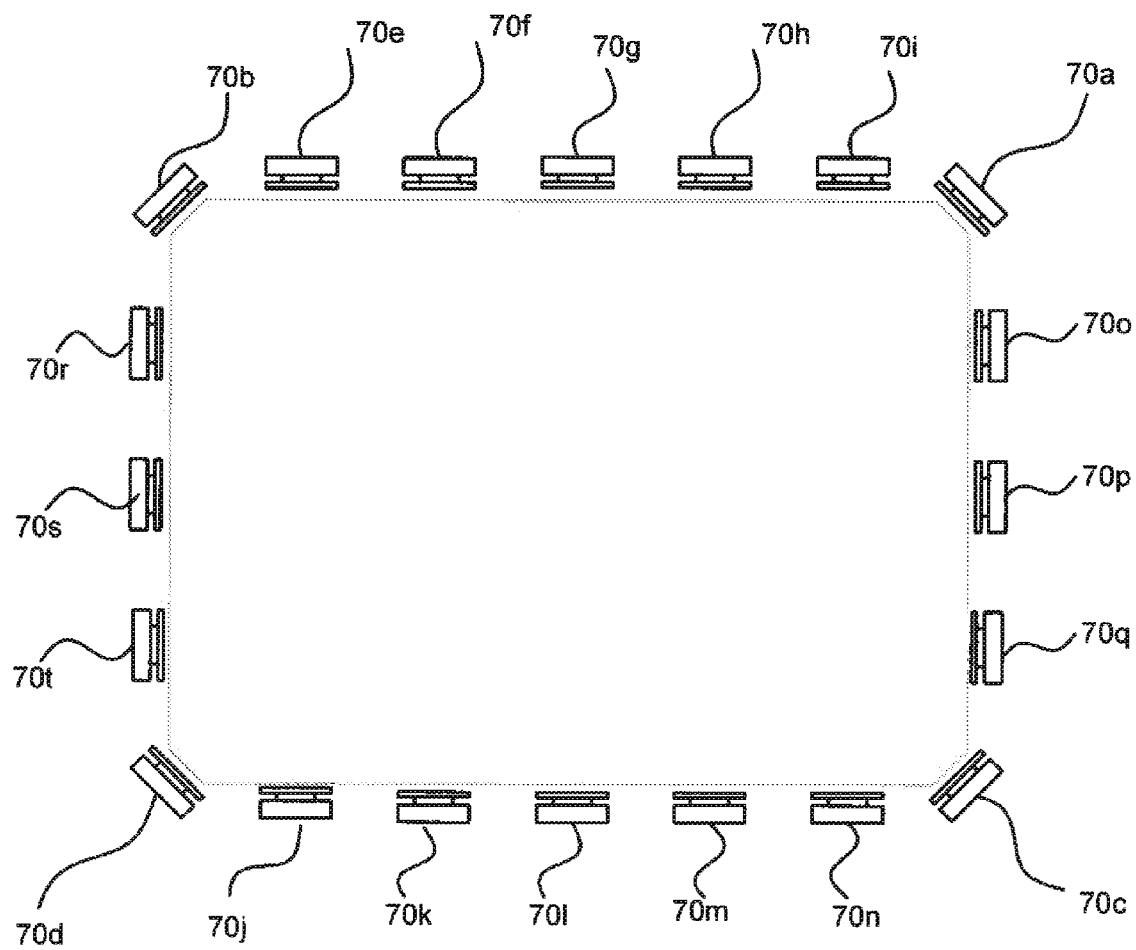
FIG. 49 is yet another alternative imaging device configuration for the interactive input system of FIG. 1.

FIG. 49 shows yet another alternative imaging device configuration for the interactive input system. In this configuration, the interactive input system employs twenty (20) imaging devices. Imaging devices 70a, 70b, 70c, 70d are positioned adjacent the corners of the input area and look generally across the entire input area. Positioned along one side of the input area extending between imaging devices 70a and 70b are imaging devices 70e, 70f, 70g, 70h and 70i. Positioned along another side of the input area extending between imaging devices 70c and 70d are imaging devices 70j, 70k, 70l, 70m and 70n. Positioned along another side of the input area extending between imaging devices 70a and 70c are imaging devices 70o, 70p and 70q. Positioned along another side the input area extending between imaging devices 70b and 70d are imaging devices 70r, 70s and 70t. As will be appreciated, in this embodiment the imaging devices 70e to 70t are in rows extending parallel to the sides of the display panel 60.

Although the interactive input system is described above as utilizing specific imaging device configurations, those skilled in the art will appreciate that still other imaging device configuration may be used.

Figure 50A:
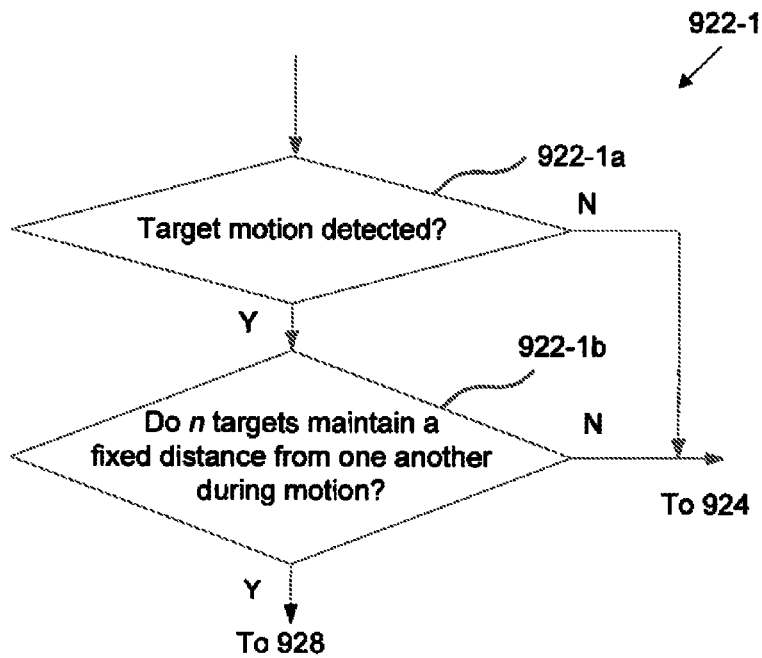
FIGS. 50a and 50b are flowcharts showing further embodiments of a step performed during the method of identifying one or more input objects of FIG. 43.

Although method 910 is described as identifying pointers as part of a pin set based on n pointers maintaining fixed positions from one another (step 922), those skilled in the art will appreciate that other criteria may be used. Turning to FIG. 50A, a flowchart showing another embodiment of step 922 of method 910 is illustrated and identified generally as step 922-1. In this embodiment, a check is performed to determine if target motion is detected (step 922-1a). If no target motion is detected, the method continues to step 924 wherein the targets are identified as pen tools or fingers. If target motion is detected, a check is performed to determine if the n targets maintain a fixed distance from one another during motion (step 922-1b). If the n targets do not maintain a fixed distance from one another during motion, the method continues to step 924 wherein the targets are identified as pen tools or fingers. If the n targets maintain a fixed distance from one another during motion, the targets are identified as being part of a pin set, and thus the method continues to step 928.

Figure 50B:
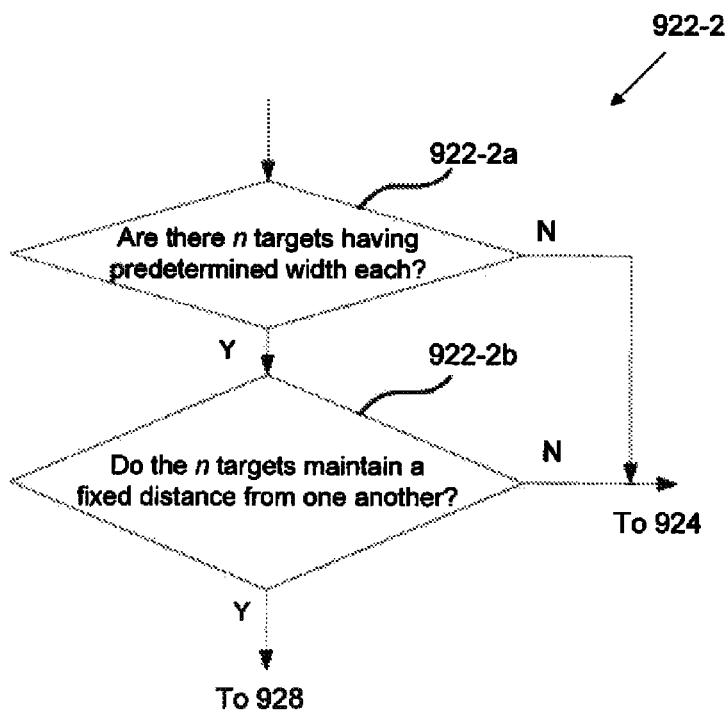

Turning to FIG. 50B, a flowchart showing yet another embodiment of step 922 of method 910 is illustrated and identified generally as step 922-2. In this embodiment, a check is performed to determine if there are n targets each having a predetermined width (step 922-2a). If there are not n targets each having a predetermined width, the method continues to step 924 wherein the targets are identified as pen tools or fingers. If there are n targets each having a predetermined width, a check is performed to determine if the n targets maintain a fixed distance from one another (step 922-2b). If the n targets do not maintain a fixed distance from one another, the method continues to step 924 wherein the targets are identified as pen tools or fingers. If the n targets maintain a fixed distance from one another, the targets are identified as being part of a pin set, and thus the method continues to step 928.

In yet another embodiment, the width of the targets may be compared to a threshold, and if the width of the targets is less than the threshold, the targets are then identified as being part of a pin set. In this embodiment, a uniform pin diameter such as for example ¼" may be used. In another embodiment, the pins may comprise a retro-reflective tip wherein a pointer is identified as being part of a pin set in the event the intensity of the pointer in the captured image frames is greater than a threshold value. Similarly, in another embodiment the pins may comprise light emitting sources rather than retro-reflective tips.

Although method 910 is described as identifying a target as part of a pin set based on n targets maintaining a fixed position from one another during movement, wherein n is set to a value of six (6) those skilled in the art will appreciate that the value n may be set to any suitable value such as for example 5 or 7.

Figure 51:
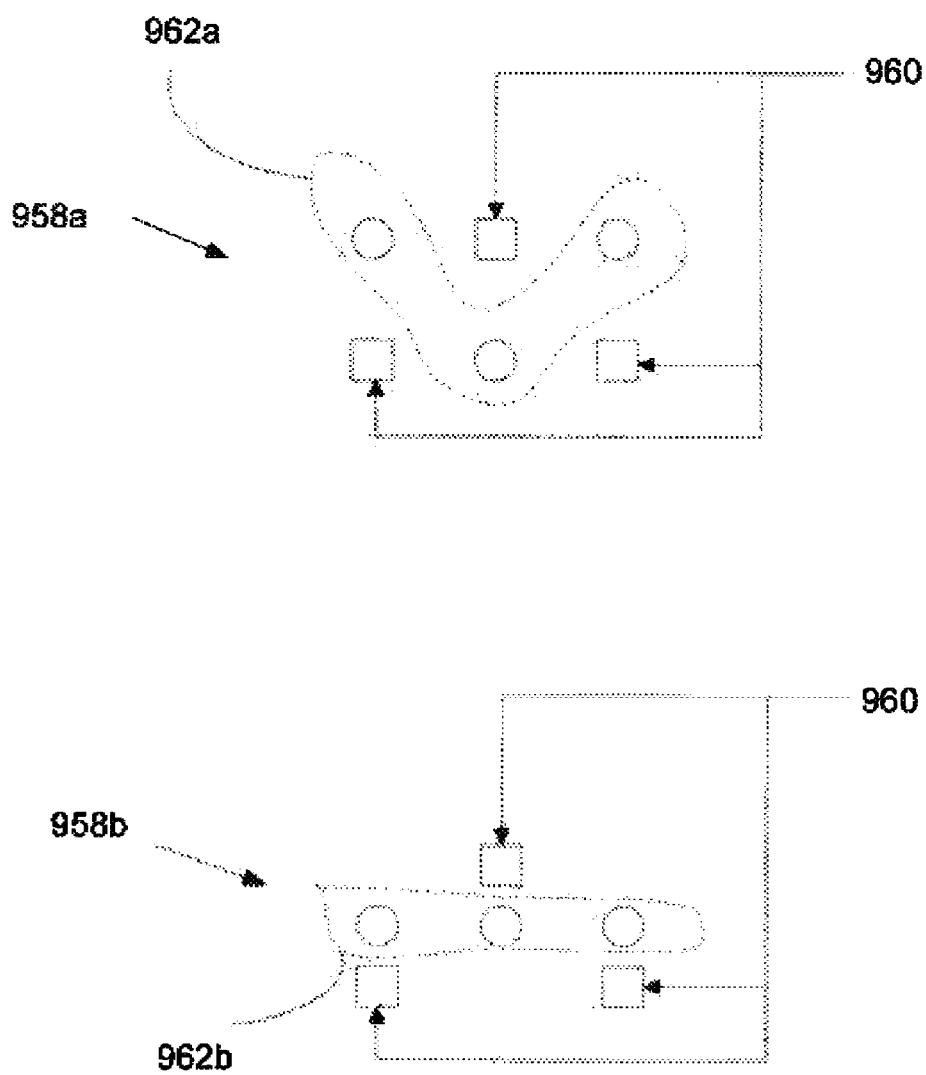
FIG. 51 depicts alternative patterns of pin sets.

Although embodiments are described above wherein input objects comprising a pin set having six (6) associated pins arranged in a distinct pattern are used to interact with the interactive input system, those skilled in the art will appreciate that alternative input objects may be used. For example, an input object may comprise a pin set having any number of associated pins arranged in a distinct pattern. It will be appreciated that larger the input object is, the greater the number of associated pins there may be. In another embodiment, two or more input objects may each comprise a pin set having six (6) associated pins arranged in two distinct sub-patterns, wherein each of the distinct sub-patterns comprises for example three (3) pins. In this embodiment, one of the distinct sub-patterns is common to all input objects while the other of the distinct sub-patterns is unique for each input object. An example is shown in FIG. 51. Two pin sets 958a and 958b each having six (6) associated pins arranged in two distinct sub-patterns are shown. A distinct sub-pattern 960, common to both pin sets 958a and 958b, is represented by square pins. Unique sub-patterns 962a and 962b associated with pin sets 958a and 958b, respectively, are represented by round pins. It will be appreciated that the pins arranged in each of the distinct sub-patterns may be same type of pin such as for example a round pin or a square pin.

Rather than pins, an input object may comprise a number of bumps or legs. The input objects may be made of any suitable material such as for example plastic, wood, etc. The input objects may be any shape such as for example a shape representing a letter in the alphabet (A-shaped, B-shaped, etc.) or a shape representing a digit (1-shaped, 2-shaped, etc.)

Although embodiments are described above wherein predefined patterns are used to identify an input object, those skilled in the art will appreciate that input objects may be identified during use and associated with an object identifier. For example, in the event the pattern of a pin set is not identified, a user may select to input the pattern into memory associated with the interactive input system, wherein it will be stored for future use in input object identification.

In another embodiment, a user configurable parameter may be used to permit a user to add newly identified patterns during use. In this embodiment, the interactive input system is able to use predetermined patterns associated with known input objects, as well as new patterns associated with new input objects, to identify input objects.

Although the interactive input system is described as comprising an LCD or plasma display panel, those of skill in the art will appreciate that other display panels such as for example flat panel display devices, light emitting diode (LED) panels, cathode ray tube (CRT) devices etc. may be employed. Alternatively, the interactive input system may comprise a display surface on which an image projected by a projector within or exterior of the housing is employed.

In the embodiments described above, the imaging devices comprise CMOS image sensors configured for a pixel sub-array. Those of skill in the art will appreciate that the imaging devices may employ alternative image sensors such as for example, line scan sensors to capture image data. Those of skill in the art will also appreciate that the communication protocol employed by the imaging devices and master controller described above is exemplary and that other suitable communication protocols may be employed.

In the embodiments shown and described above, the interactive input system is in the form of a table. Those of skill in the art will appreciate that the table make take other forms and that the rectangular housing described and illustrated in exemplary only. Also, the interactive input system need not be in table form and thus, may take other forms and orientations.

Although embodiments of the interactive input system have been shown and described above, those of skill in the art will appreciate that further variations and modifications may be made without departing from the scope thereof as defined by the appended claims.

What is claimed is:

1. A method comprising:
    capturing image frames of an input area using a plurality of imaging devices, each imaging device having a field of view encompassing at least a portion of the input area;
    processing captured image frames to identify a plurality of targets therein;
    analyzing the identified plurality of targets to determine when the targets represent a plurality of physical projections extending from a body of a user manipulatable input object, the body of the user manipulatable input object being outside of the fields of view of the imaging devices and not appearing in captured image frames; and
    when the targets represent the plurality of physical projections extending from the body of the user manipulatable input object, identifying a pattern of the projections thereby to identify the user manipulatable input object.

2. The method of claim 1, wherein during said analyzing, the location of each of said projections is resolved and wherein during said identifying, the pattern of the projections is identified based on the resolved locations.

3. The method of claim 2, further comprising analyzing the identified pattern to determine an orientation of the input object with respect to the input area.

4. The method of claim 3, further comprising calculating the location of the input object with respect to the input area.

5. The method of claim 2, further comprising calculating the location of the input object with respect to the input area.

6. The method of claim 1, further comprising calculating the location of the input object with respect to the input area.

7. The method of claim 1, wherein said identifying comprises comparing the pattern to a set of predefined patterns.

8. The method of claim 7, further comprising calculating the location of the input object with respect to the input area.

9. The method of claim 8, further comprising analyzing the identified pattern to determine an orientation of the input object with respect to the input area.

10. The method of claim 2, wherein said analyzing comprises examining a configuration of said targets to determine if said targets represent the plurality of projections of said input object.

11. The method of claim 10, wherein said examining comprises determining if said targets are fixed distances from one another.

12. The method of claim 10, wherein said examining comprises determining if said targets remain fixed distances from one another during movement of said input object.

13. The method of claim 10, wherein said examining comprises determining if said targets have predetermined widths.

14. The method of claim 13, wherein said predetermined widths are widths below a threshold.

15. The method of claim 10, further comprising calculating the location of the input object with respect to the input area.

16. The method of claim 15, further comprising analyzing the identified pattern to determine an orientation of the input object with respect to the input area.

17. The method of claim 1, wherein said analyzing comprises examining a configuration of said targets to determine if said targets represent the plurality of projections of said input object.

18. The method of claim 17, wherein said examining comprises determining if said targets are fixed distances from one another.

19. The method of claim 17, wherein said examining comprises determining if said targets remain fixed distances from one another during movement of said input objects.

20. The method of claim 17, wherein said examining comprises determining if said targets have predetermined widths.

21. An interactive input system comprising:
    a plurality of imaging devices having at least partially overlapping fields of view encompassing an input area and configured to capture image frames; and
    processing structure configured to process image frames captured by the imaging devices to identify a plurality of targets, analyze the identified plurality of targets to determine when the targets represent a plurality of physical projections extending from a body of a user manipulatable input object, the body of the user manipulatable input object being outside of the fields of view of the imaging devices and not appearing in captured image frames, and when the targets represent the plurality of physical projections extending from the body of the user manipulatable input object, identify a pattern of the projections thereby to identify the user manipulatable input object.

22. The interactive input system of claim 21, wherein the processing structure is configured to analyze the identified pattern to determine an orientation of the input object with respect to the input area.

23. The interactive input system of claim 21, wherein the processing structure is configured to calculate the location of the object with respect to the input area.

24. The interactive input system of claim 21, wherein the processing structure is configured to compare the pattern to a pattern set.

25. The interactive input system of claim 21, wherein the processing structure, during the analyzing, is configured to examine a configuration of said targets to determine if said targets represent the plurality of projections of said input object.

26. The interactive input system of claim 25, wherein said processing structure, during the examining, is configured to determine if said targets are fixed distances from one another.

27. The interactive input system of claim 25, wherein said processing structure, during said examining, is configured to determine if said targets remain fixed distances from one another during movement of said input object.

28. The interactive input system of claim 25, wherein said processing structure, during said examining, is configured to determine if said targets have predetermined widths.

29. A non-transitory computer readable medium embodying a computer program for execution by a computing device to perform a method of identifying at least one input object, the computer program comprising:

program code for processing image data from captured image frames to identify a plurality of targets;

program code for analyzing the plurality of targets to determine when the targets represent a plurality of physical projections extending from a body of a user manipulatable input object, the body of the user manipulatable input object being outside of fields of view of imaging devices capturing the image frames and not appearing in captured image frames; and program code for identifying a pattern of the projections thereby to identify the user manipulatable input object when the targets represent the plurality of physical projections extending from the body of the user manipulatable input object.

30. The interactive input system of claim 21, further comprising said input object and wherein said projections are pins have predetermined widths.

31. The interactive input system of claim 30, wherein said pins are arranged in subgroups, the pins of each subgroup having different shapes.

32. The interactive input system of claim 30, wherein said body has a geometric shape.

* * * * *